United States Patent
Bailey et al.

(10) Patent No.: US 9,749,356 B2
(45) Date of Patent: Aug. 29, 2017

(54) SYSTEMS AND METHODS FOR DETECTING AND SCORING ANOMALIES

(71) Applicant: NuData Security Inc., Vancouver (CA)

(72) Inventors: Christopher Everett Bailey, Langley (CA); Randy Lukashuk, Errington (CA); Gary Wayne Richardson, Port Moody (CA)

(73) Assignee: NuData Security Inc., Vancouver (CA)

( * ) Notice: Subject to any disclaimer, the term of this patent is extended or adjusted under 35 U.S.C. 154(b) by 0 days.

(21) Appl. No.: 15/256,600

(22) Filed: Sep. 4, 2016

(65) Prior Publication Data
US 2017/0070522 A1 Mar. 9, 2017

Related U.S. Application Data

(60) Provisional application No. 62/214,969, filed on Sep. 5, 2015.

(51) Int. Cl.
*H04L 29/06* (2006.01)
*G06F 17/30* (2006.01)
(Continued)

(52) U.S. Cl.
CPC .......... *H04L 63/1466* (2013.01); *G06F 7/08* (2013.01); *G06F 17/3033* (2013.01);
(Continued)

(58) Field of Classification Search
CPC G06F 21/577; H04L 63/1425; H04L 63/1433
(Continued)

(56) References Cited

U.S. PATENT DOCUMENTS

| | | | |
|---|---|---|---|
| 5,774,525 A | 6/1998 | Kanevsky et al. | |
| 5,940,751 A | 8/1999 | Kaplan et al. | |

(Continued)

FOREIGN PATENT DOCUMENTS

| | | |
|---|---|---|
| CA | 2426168 A1 | 5/2002 |
| JP | 2008/052727 A | 3/2008 |

(Continued)

OTHER PUBLICATIONS

Extended European Search Report from European Patent Application EP 09727261.1 dated Mar. 7, 2012.
(Continued)

*Primary Examiner* — Ellen Tran
(74) *Attorney, Agent, or Firm* — Wolf, Greenfield & Sacks, P.C.

(57) ABSTRACT

Systems and methods for detecting and scoring anomalies. In some embodiments, a method is provided, comprising acts of: identifying a plurality of attributes from a profile; for each attribute of the plurality of attributes, determining whether the digital interaction matches the profile with respect to the attribute, comprising: identifying, from the profile, at least one bucket of possible values of the attribute, the at least one bucket being indicative of anomalous behavior; identifying, from the digital interaction, a value of the attribute; and determining whether the value identified from the digital interaction falls into the at least one bucket, wherein the digital interaction is determined to match the profile with respect to the attribute if it is determined that the value identified from the digital interaction falls into the at least one bucket; and determining a penalty score.

18 Claims, 25 Drawing Sheets

Bucket 581:
0 sec < time ≤ 10 sec

Bucket 582:
10 sec < time ≤ 30 sec

Bucket 583:
30 sec < time

(51) Int. Cl.
*H04L 12/24* (2006.01)
*G06F 21/60* (2013.01)
*G06F 7/08* (2006.01)
*H04L 12/26* (2006.01)
*H04L 29/08* (2006.01)

(52) U.S. Cl.
CPC .... *G06F 17/3053* (2013.01); *G06F 17/30598* (2013.01); *G06F 17/30867* (2013.01); *G06F 21/602* (2013.01); *H04L 41/20* (2013.01); *H04L 43/12* (2013.01); *H04L 43/16* (2013.01); *H04L 63/0861* (2013.01); *H04L 63/1408* (2013.01); *H04L 63/1416* (2013.01); *H04L 63/1425* (2013.01); *H04L 67/303* (2013.01); *H04L 67/02* (2013.01)

(58) Field of Classification Search
USPC .......................................................... 726/25
See application file for complete search history.

(56) References Cited

U.S. PATENT DOCUMENTS

| | | | |
|---|---|---|---|
| 6,829,711 | B1 | 12/2004 | Kwok et al. |
| 7,523,016 | B1 | 4/2009 | Surdulescu et al. |
| 7,680,891 | B1 | 3/2010 | Pongsajapan |
| 7,945,952 | B1 | 5/2011 | Behforooz |
| 8,001,597 | B2 | 8/2011 | Crooks |
| 8,082,349 | B1 | 12/2011 | Bhargava et al. |
| 8,386,393 | B2 | 2/2013 | Michelsen et al. |
| 8,510,795 | B1 | 8/2013 | Gargi |
| 8,887,286 | B2 | 11/2014 | Dupont et al. |
| 8,898,766 | B2 | 11/2014 | Garmark et al. |
| 9,256,715 | B2 | 2/2016 | Draluk et al. |
| 9,275,215 | B2 | 3/2016 | Bailey |
| 9,378,354 | B2 | 6/2016 | Bailey |
| 9,485,118 | B1 | 11/2016 | Atlas et al. |
| 2003/0101357 | A1 | 5/2003 | Ronen et al. |
| 2004/0054924 | A1 | 3/2004 | Chuah et al. |
| 2004/0254793 | A1 | 12/2004 | Herley et al. |
| 2005/0097320 | A1 | 5/2005 | Golan et al. |
| 2005/0114705 | A1 | 5/2005 | Reshef et al. |
| 2005/0144067 | A1 | 6/2005 | Farahat et al. |
| 2005/0209974 | A1 | 9/2005 | Okunseinde |
| 2006/0206941 | A1 | 9/2006 | Collins |
| 2006/0212931 | A1 | 9/2006 | Shull et al. |
| 2006/0230039 | A1 | 10/2006 | Shull et al. |
| 2006/0282660 | A1 | 12/2006 | Varghese et al. |
| 2007/0043681 | A1 | 2/2007 | Morgan et al. |
| 2007/0124201 | A1 | 5/2007 | Hu et al. |
| 2007/0124806 | A1 | 5/2007 | Shulman et al. |
| 2007/0140131 | A1 | 6/2007 | Malloy et al. |
| 2007/0226053 | A1 | 9/2007 | Carl et al. |
| 2008/0040285 | A1 | 2/2008 | Wankmueller |
| 2008/0114885 | A1 | 5/2008 | Kulkarni et al. |
| 2008/0127302 | A1 | 5/2008 | Qvarfordt et al. |
| 2008/0133321 | A1 | 6/2008 | Pennock et al. |
| 2008/0133347 | A1 | 6/2008 | Josifovski et al. |
| 2008/0133348 | A1 | 6/2008 | Reed et al. |
| 2008/0162338 | A1* | 7/2008 | Samuels ................. G06F 21/40 705/38 |
| 2008/0189768 | A1 | 8/2008 | Callahan et al. |
| 2008/0250497 | A1 | 10/2008 | Mullarkey et al. |
| 2008/0301040 | A1 | 12/2008 | Knudson et al. |
| 2009/0012855 | A1 | 1/2009 | Jamal et al. |
| 2009/0019182 | A1 | 1/2009 | Riise et al. |
| 2009/0113294 | A1 | 4/2009 | Sanghavi et al. |
| 2009/0138723 | A1 | 5/2009 | Nyang et al. |
| 2009/0249477 | A1 | 10/2009 | Punera |
| 2009/0328163 | A1 | 12/2009 | Preece |
| 2010/0077482 | A1* | 3/2010 | Adams ................. G06F 21/564 726/24 |
| 2011/0016052 | A1 | 1/2011 | Scragg |
| 2011/0016534 | A1 | 1/2011 | Jakobsson et al. |
| 2011/0029902 | A1 | 2/2011 | Bailey |
| 2011/0047605 | A1 | 2/2011 | Sontag et al. |
| 2011/0247071 | A1 | 10/2011 | Hooks et al. |
| 2012/0096557 | A1 | 4/2012 | Britton et al. |
| 2012/0207046 | A1 | 8/2012 | DiPietro et al. |
| 2012/0210429 | A1 | 8/2012 | Stute |
| 2012/0310838 | A1 | 12/2012 | Harris et al. |
| 2013/0024339 | A1 | 1/2013 | Choudhuri et al. |
| 2013/0239206 | A1 | 9/2013 | Draluk et al. |
| 2013/0276125 | A1 | 10/2013 | Bailey |
| 2013/0339186 | A1* | 12/2013 | French ................. G06F 21/577 705/26.35 |
| 2014/0229414 | A1 | 8/2014 | Goldberg et al. |
| 2014/0317750 | A1 | 10/2014 | Bailey |
| 2014/0317751 | A1 | 10/2014 | Bailey |
| 2014/0325657 | A1 | 10/2014 | Bailey |
| 2014/0380448 | A1 | 12/2014 | Bailey |
| 2015/0033086 | A1 | 1/2015 | Sasturkar et al. |
| 2015/0106888 | A1 | 4/2015 | Cheng et al. |
| 2016/0180557 | A1 | 6/2016 | Yousaf et al. |
| 2016/0359872 | A1 | 12/2016 | Yadav et al. |

FOREIGN PATENT DOCUMENTS

| | | |
|---|---|---|
| WO | WO 01/80525 A1 | 10/2001 |
| WO | WO 2005/119648 A2 | 12/2005 |
| WO | WO 2007/136665 A2 | 11/2007 |
| WO | WO 2008/025019 A1 | 2/2008 |
| WO | WO 2008/027642 A2 | 3/2008 |
| WO | WO 2009/122302 A2 | 10/2009 |

OTHER PUBLICATIONS

Extended European Search Report from European Patent Application EP 14765198.8 dated Sep. 13, 2016.
Invitation to Pay Additional Fees for International Application No. PCT/IB2009/005645 mailed Sep. 2, 2009.
International Search Report and Written Opinion for International Application No. PCT/IB2009/005645 dated Nov. 20, 2009.
International Preliminary Report on Patentability for International Application No. PCT/IB2009/005645 mailed Oct. 14, 2010.
International Search Report and Written Opinion for International Application No. PCT/CA2014/050229 mailed Jun. 17, 2014.
International Preliminary Report on Patentability for International Application No. PCT/CA2014/050229 mailed Sep. 24, 2015.
Adverlab Blog Spot, "CAPTCHA Advertising, Part II," Jan. 8, 2007. http:/adverlab.blospot.com/2007/01/captcha-advertising-part-ii.html, retrieved on Jul. 24, 2008.
Adverlab Blog Spot, "CAPTCHA Advertising," Oct. 27, 2005. http://www.adverlab.blogspot.com/2005/10/captcha-advertising.html, retrieved on Jul. 24, 2008.
Athanasopoulos et al. "Enhanced CAPTCHAs: Using Animation to Tell Humans and Computers Apart," H. Leitol and E. Markatos (Eds): CMS 2006, LNCS 4237, pp. 97-108, 2006. IFIP international Federation for Information Processing 2006.
Chemane et al., MCDM model for selecting Internet access technologies—A case study in Mozambique. Proceedings of the International Conference on Computer as a Tool. EUROCON 2005, Belgrade, Serbia & Montenegro, Nov. 22-24, 2005. pp. 1738-1741, Nov. 22, 2005.
Delfigo Corporation. "DSGateway: Context-Based Identity Assurance," Copyright 2009. http://www.delfigosecurity.com/products, retrieved on Mar. 11, 2009.
Fischer, I. et al. "Visual CAPTCHAs for Document Authentication," 2006 IEEE 8th Workshop on Multimedia Signal Processing, MMSP '06, Victoria, Canada, Oct. 1, 2006, pp. 471-474.
Giasson, "Expand your ad network with an interactive video ad unit that generates unprecedented user engagement—and protects websites and services from hackers." Leap Marketing NuCaptcha Concept Videos. Leap Marketing Technologies. Available at http://microsoft.leapmaketing.com/. Last accessed Feb. 23, 2009. 3 pages.
Godin, S., Seth's Blog, "Commercializing Captcha," Dec. 1, 2006. http://sethgodin.typepad.com/seths_blog/2006/12/commercializing.html, retrived on May 17, 2012.

(56) References Cited

OTHER PUBLICATIONS

JY's Weblog, "Ads in Captchas," May 1, 2007. http://jy.typepad.com/jy/2007/01/ads_in_captchas.html.
Kearns, D., "Start-up Measures Users' Trustworthiness for Authentication into Sites," Network World, Jan. 21, 2009. http://www.networkworld.com/newsletters/dir/2009/011909id2.html, retrieved on Mar. 11, 2009.
Liao, W.-H., et al. "Embedding Information within Dynamic Visual Patterns," 2004 IEEE International Conference on Multimedia and Expo: Jun. 27-30, 2004, Taipei, Taiwan, IEEE Operations Center, Piscataway, NJ, vol. 2, Jun. 27, 2004, pp. 895-898.
Naone, E., Technology Review, "The Captcha Arms Race," Mar./Apr. 2009.
Schultz, "Reputation scoring changes the enterprise security game." ComputerWorld. Apr. 3, 2009. 3 pages.
Teleport Jobs Webmaster Tools, "Free CAPTCHA," Copyright 2004-2007. http://www.teleportjobs.com/captcha.asp, retrieved on Jul. 24, 2008.
U.S. Appl. No. 12/935,927, filed Oct. 1, 2010, Bailey.
U.S. Appl. No. 14/218,824, filed Mar. 18, 2014, Bailey.
U.S. Appl. No. 14/218,839, filed Mar. 18, 2014, Bailey.
U.S. Appl. No. 14/481,698, filed Sep. 9, 2014, Bailey.
U.S. Appl. No. 13/834,733, filed Mar. 15, 2013, Bailey.
U.S. Appl. No. 14/218,806, filed Mar. 18, 2014, Bailey.
U.S. Appl. No. 15/256,607, filed Sep. 4, 2016, Bailey et al.
U.S. Appl. No. 15/256,610, filed Sep. 4, 2016, Bailey et al.
U.S. Appl. No. 15/256,611, filed Sep. 4, 2016, Bailey et al.
U.S. Appl. No. 15/256,597, filed Sep. 4, 2016, Bailey et al.
U.S. Appl. No. 15/256,603, filed Sep. 4, 2016, Bailey et al.
U.S. Appl. No. 15/411,805, filed Jan. 20, 2017, Bailey et al.
U.S. Appl. No. 15/256,612, filed Sep. 4, 2016, Bailey et al.
U.S. Appl. No. 15/256,613, filed Sep. 4, 2016, Bailey et al.
U.S. Appl. No. 15/256,616, filed Sep. 4, 2016, Bailey et al.
U.S. Appl. No. 15/256,617, filed Sep. 4, 2016, Bailey et al.
International Search Report and Written Opinion for International Application No. PCT/IB/2016/001957 dated Jun. 13, 2017.
Fusco et al., "NET-Fli: On-the-fly Compression, Archiving and Indexing of Streaming Network Traffic". Proceedings of the Proceedings of the Very Large Database(VLDB) Endowment. 2010;3(1-2):1382-93.
Kompella et al., On Scalable Attack Detection in the Network. IEEE/ACM Transactions on Networking 2007;15(1):14-25.
Yen et al., "Traffic Aggregation for Malware Detection." Proceedings of the 5th International Conference on Detection of Intrusions and Malware, and Vulnerability Assessment. DIMVA. 2008:207-27.

\* cited by examiner

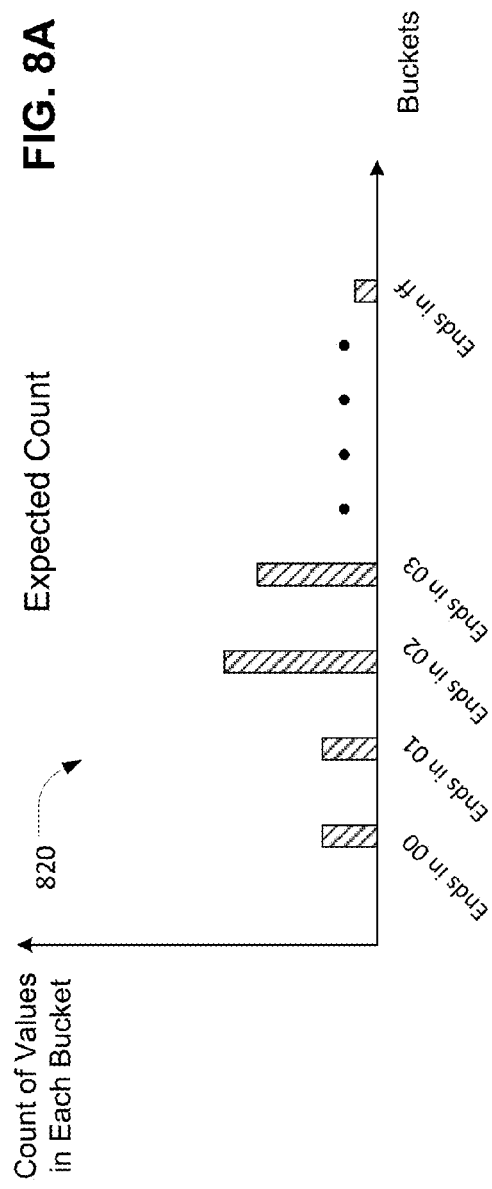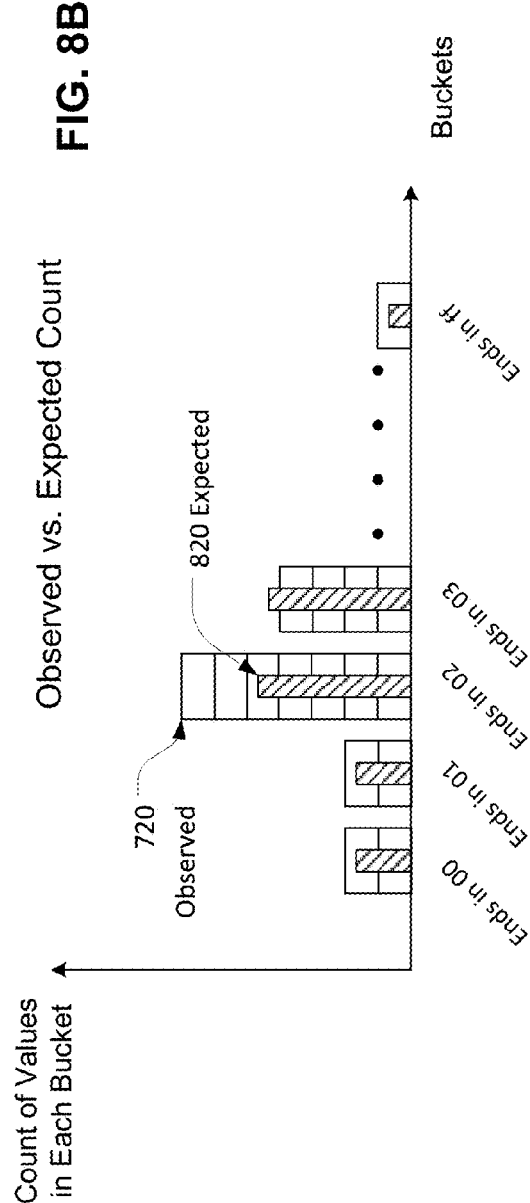

SYSTEMS AND METHODS FOR DETECTING AND SCORING ANOMALIES

RELATED APPLICATION

This application claims the benefit under 35 U.S.C. §119 of U.S. Provisional Patent Application No. 62/214,969, filed on Sep. 5, 2015, which is hereby incorporated by reference in its entirety.

This application is filed on the same day as application Ser. No. 15/256,612, entitled "SYSTEMS AND METHODS FOR MATCHING AND SCORING SAMENESS," application Ser. No. 15/256,607, entitled "SYSTEMS AND METHODS FOR DETECTING AND PREVENTING SPOOFING." Each of these applications is hereby incorporated by reference in its entirety.

BACKGROUND

A large organization with an online presence often receives tens of thousands requests per minute to initiate digital interactions. A security system supporting multiple large organizations may handle millions of digital interactions at the same time, and the total number of digital interactions analyzed by the security system each week may easily exceed one billion.

As organizations increasingly demand real time results, a security system have to analyze a large amount of data and accurately determine whether a digital interaction is legitimate, all within fractions of a second. This presents tremendous technical challenges, especially given the large overall volume of digital interactions handled by the security system.

SUMMARY

In accordance with some embodiments, a computer-implemented method is provided for analyzing a plurality of digital interactions, the method comprising acts of: (A) identifying a plurality of values of an attribute, each value of the plurality of values corresponding respectively to a digital interaction of the plurality of digital interactions; (B) dividing the plurality of values into a plurality of buckets; (C) for at least one bucket of the plurality of buckets, determining a count of values from the plurality of values that fall within the at least one bucket; (D) comparing the count of values from the plurality of values that fall within the at least one bucket against historical information regarding the attribute; and (E) determining whether the attribute is anomalous based at least in part on a result of the act (D).

In accordance with some embodiments, a computer-implemented method is provided for analyzing a digital interaction, the method comprising acts of: identifying a plurality of attributes from a profile; for each attribute of the plurality of attributes, determining whether the digital interaction matches the profile with respect to the attribute, comprising: identifying, from the profile, at least one bucket of possible values of the attribute, the at least one bucket being indicative of anomalous behavior; identifying, from the digital interaction, a value of the attribute; and determining whether the value identified from the digital interaction falls into the at least one bucket, wherein the digital interaction is determined to match the profile with respect to the attribute if it is determined that the value identified from the digital interaction falls into the at least one bucket; and determining a penalty score based at least in part on a count of attributes with respect to which the digital interaction matches the profile.

In accordance with some embodiments, a computer-implemented method is provided for analyzing a digital interaction, the method comprising acts of: determining whether the digital interaction is suspicious; in response to determining that the digital interaction is suspicious, deploying a security probe of a first type to collect first data from the digital interaction; analyzing first data collected from the digital interaction by the security probe of the first type to determine if the digital interaction continues to appear suspicious; if the first data collected from the digital interaction by the security probe of the first type indicates that the digital interaction continues to appear suspicious, deploying a security probe of a second type to collect second data from the digital interaction; and if the first data collected from the digital interaction by the security probe of the first type indicates that the digital interaction no longer appears suspicious, deploying a security probe of a third type to collect third data from the digital interaction.

In accordance with some embodiments, a system is provided, comprising at least one processor and at least one computer-readable storage medium having stored thereon instructions which, when executed, program the at least one processor to perform any of the above methods.

In accordance with some embodiments, at least one computer-readable storage medium having stored thereon instructions which, when executed, program at least one processor to perform any of the above methods.

BRIEF DESCRIPTION OF DRAWINGS

FIG. 8A shows an illustrative expected histogram 820 representing a distribution of attribute values among a plurality of buckets, in accordance with some embodiments.

FIG. 8B shows a comparison between the illustrative histogram 720 of FIG. 7B and the illustrative expected histogram 820 of FIG. 8A, in accordance with some embodiments.

DETAILED DESCRIPTION

Figure 1A:
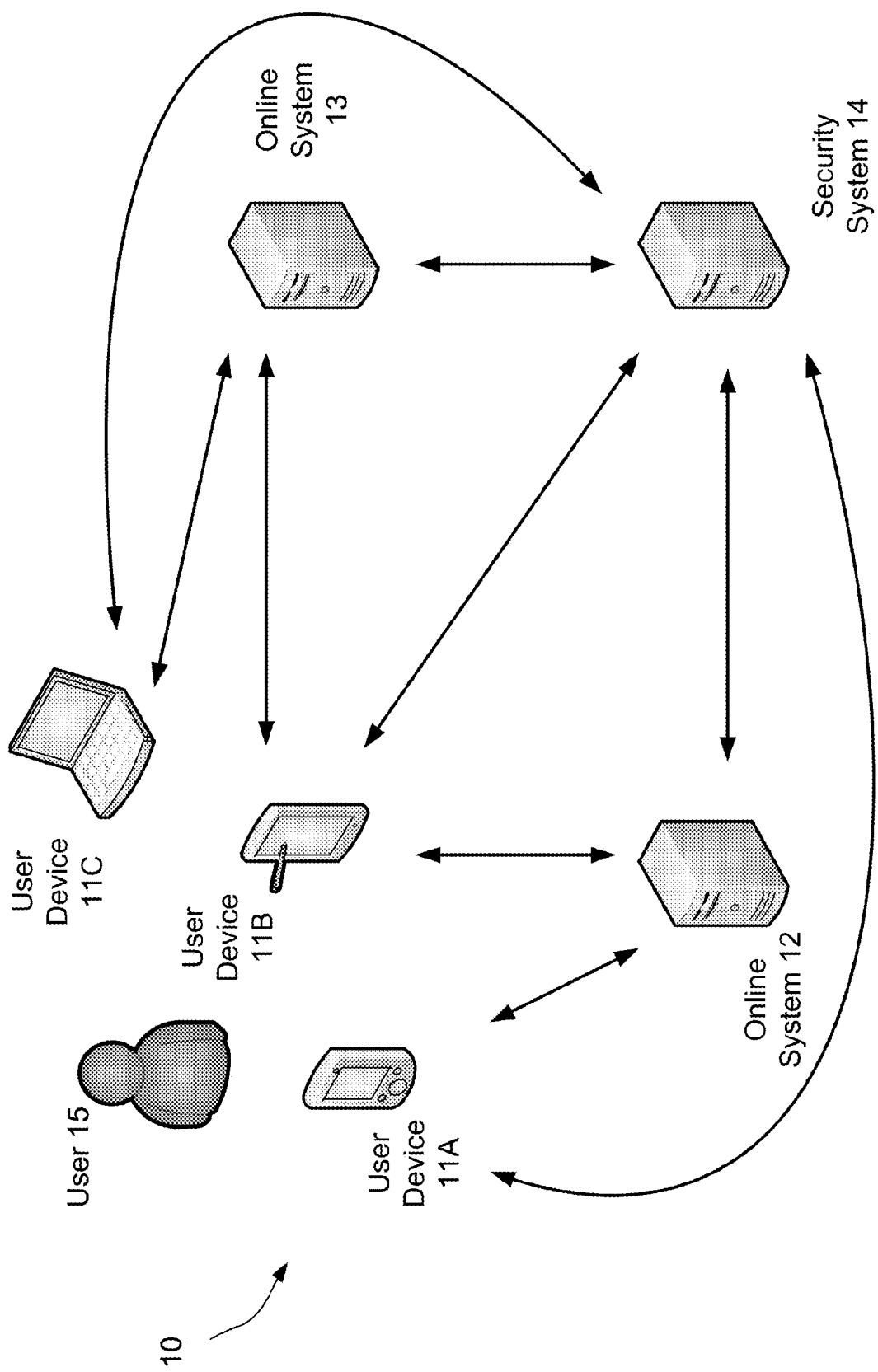
FIG. 1A shows an illustrative system 10 via which digital interactions may take place, in accordance with some embodiments.

Aspects of the present disclosure relate to systems and methods for detecting and scoring anomalies.

In a distributed attack on a web site or application, an attacker may coordinate multiple computers to carry out the attack. For example, the attacker may launch the attack using a "botnet." In some instances, the botnet may include a network of virus-infected computers that the attacker may control remotely.

The inventors have recognized and appreciated various challenges in detecting web attacks. For instance, in a distributed attack, the computers involved may be located throughout the world, and may have different characteristics. As a result, it may be difficult to ascertain which computers are involved in the same attack. Additionally, in an attempt to evade detection, a sophisticated attacker may modify the behavior of each controlled computer slightly so that no consistent behavior profile may be easily discernible across the attack. Accordingly, in some embodiments, anomaly detection techniques are provided with improved effectiveness against an attack participated by computers exhibiting different behaviors.

I. Dynamically Generated Fuzzy Profiles

Some security systems use triggers that trip on certain observed behaviors. For example, a trigger may be a pattern comprising an e-commerce user making a high-value order and shipping to a new address, or a new account making several orders with different credit card numbers. When one of these suspicious patterns is detected, an alert may be raised with respect to the user or account, and/or an action may be taken (e.g., suspending the transaction or account). However, the inventors have recognized and appreciated that a trigger-based system may produce false positives (e.g., a trigger tripping on a legitimate event) and/or false negatives (e.g., triggers not tripped during an attack or being tripped too late, when significant damage has been done).

Accordingly, in some embodiments, anomaly detection techniques are provided with reduced false positive rate and/or false negative rate. For example, one or more fuzzy profiles may be created. When an observation is made from a digital interaction, a score may be derived for each fuzzy profile, where the score is indicative of an extent to which the observation matches the fuzzy profile. In some embodiments, such scores may be derived in addition to, or instead of, Boolean outputs of triggers as described above, and may provide a more nuanced set of data points for a decision logic that determines what, if any, action is to be taken in response to the observation.

The inventors have recognized and appreciated that, although many attacks exhibit known suspicious patterns, it may take time for such patterns to emerge. For instance, an attacker may gain control of multiple computers that are seemingly unrelated (e.g., computers that are associated with different users, different network addresses, different geographic locations, etc.), and may use the compromised computers to carry out an attack simultaneously. As a result, damage may have been done by the time any suspicious pattern is detected.

The inventors have recognized and appreciated that a security system may be able to flag potential attacks earlier by looking for anomalies that emerge in real time, rather than suspicious patterns that are defined ahead of time. For instance, in some embodiments, a security system may monitor digital interactions taking place at a particular web site and compare what is currently observed against what was observed previously at the same web site. As one example, the security system may compare a certain statistic (e.g., a count of digital interactions reporting a certain browser type) from a current time period (e.g., 30 minutes, one hour, 90 minutes, two hours, etc.) against the same statistic from a past time period (e.g., the same time period a day ago, a week ago, a month ago, a year ago, etc.). If the current value of the statistic deviates significantly from the past value of the statistic (e.g., by more than a selected threshold amount), an anomaly may be reported. In this manner, anomalies may be defined dynamically, based on activity patterns at the particular web site. Such flexibility may reduce false positive and/or false negative errors. Furthermore, the security system may be able to detect attacks that do not exhibit any known suspicious pattern, and such detection may be possible before significant damage has been done.

II. Techniques for Efficient Processing and Representation of Data

The inventors have recognized and appreciated that a security system for detecting and scoring anomalies may process an extremely large amount of data. For instance, a security system may analyze digital interactions for multiple large organizations. The web site of each organization may handle hundreds of digital interactions per second, so that the security system may receive thousands, tens of thousands, or hundreds of thousands of requests per second to detect anomalies. In some instances, a few megabytes of data may be captured from each digital interaction (e.g., URL being accessed, user device information, keystroke recording, etc.) and, in evaluating the captured data, the security system may retrieve and analyze a few megabytes of historical, population, and/or other data. Thus, the security system may analyze a few gigabytes of data per second just to support 1000 requests per second. Accordingly, in some embodiments, techniques are provided for aggregating data to facilitate efficient storage and/or analysis.

Some security systems perform a security check only when a user takes a substantive action such as changing one or more access credentials (e.g., account identifier, password, etc.), changing contact information (e.g., email address, phone number, etc.), changing shipping address, making a purchase, etc. The inventors have recognized and appreciated that such a security system may have collected little information by the time the security check is initiated. Accordingly, in some embodiments, a security system may begin to analyze a digital interaction as soon as an entity arrives at a web site. For instance, the security system may begin collecting data from the digital interaction before the entity even attempts to log into a certain account. In some embodiments, the security system may compare the entity's behaviors against population data. In this manner, the security system may be able to draw some inferences as to whether the entity is likely a legitimate user, or a bot or human fraudster, before the entity takes any substantive action. Various techniques are described herein for performing such analyses in real time for a high volume of digital interactions.

In some embodiments, a number of attributes may be selected for a particular web site, where an attribute may be a question that may be asked about a digital interaction, and a value for that attribute may be an answer to the question. As one example, a question may be, "how much time elapsed between viewing a product to checking out?" An answer may be a value (e.g., in seconds or milliseconds) calculated based on a timestamp of a request for a product details page and a timestamp of a request for a checkout page. As another example, an attribute may include an anchor type that is observable from a digital interaction. For instance, a security system may observe that data packets received in connection with a digital interaction indicate a certain source network address and/or a certain source device identifier. Additionally, or alternatively, the security system may observe that a certain email address is used to log in and/or a certain credit card is charged in connection with the digital interaction. Examples of anchor types include, but are not limited to, account identifier, email address (e.g., user name and/or email domain), network address (e.g., IP address, sub address, etc.), phone number (e.g., area code and/or subscriber number), location (e.g., GPS coordinates, continent, country, territory, city, designated market area, etc.), device characteristic (e.g., brand, model, operating system, browser, device fingerprint, etc.), device identifier, etc.

In some embodiments, a security system may maintain one or more counters for each possible value (e.g., Chrome, Safari, etc.) of an attribute (e.g., browser type). For instance, a counter for a possible attribute value (e.g., Chrome) may keep track of how many digital interactions with that particular attribute value (e.g., Chrome) are observed within some period of time (e.g., 30 minutes, one hour, 90 minutes, two hours, etc.). Thus, to determine if there is an anomaly associated with an attribute, the security system may simply examine one or more counters. For instance, if the current time is 3:45 pm, the security system may compare a counter keeping track of the number of digital interactions reporting a Chrome browser since 3:00 pm, against a counter keeping track of the number of digital interactions reporting a Chrome browser between 3:00 pm and 4:00 pm on the previous day (or a week ago, a month ago, a year ago, etc.). This may eliminate or at least reduce on-the-fly processing of raw data associated with the attribute values, thereby improving responsiveness of the security system.

The inventors have recognized and appreciated that as the volume of digital interactions processed by a security system increases, the collection of counters maintained by the security system may become unwieldy. Accordingly, in some embodiments, possible values of an attribute may be divided into a plurality of buckets. Rather than maintaining one or more counters for each attribute value, the security system may maintain one or more counters for each bucket of attribute values. For instance, a counter may keep track of a number of digital interactions with any network address from a bucket B of network addresses, as opposed to a number of digital interactions with a particular network address Y. Thus, multiple counters (e.g., a separate counter for each attribute value in the bucket B) may be replaced with a single counter (e.g., an aggregate counter for all attribute values in the bucket B).

In this manner, a desired balance between precision and efficiency may be achieved by selecting an appropriate number of buckets. For instance, a larger number of buckets may provide a higher resolution, but more counters may be maintained and updated, whereas a smaller number of buckets may reduce storage requirement and speed up retrieval and updates, but more information may be lost.

The inventors have recognized and appreciated that it may be desirable to spread attribute values roughly evenly across a plurality of buckets. Accordingly, in some embodiments, a hash function may be applied to attribute values and a modulo operation may be applied to divide the resulting hashes into a plurality of buckets, where there may be one bucket for each residue of the modulo operation. An appropriate modulus may be chosen based on how many buckets are desired, and an appropriate hash function may be chosen to spread the attribute values roughly evenly across possible hashes. Examples of suitable hash functions include, but are not limited to, MD5, MD6, SHA-1, SHA-2, SHA-3, etc.

For example, there may be tens of thousands of possible user agents. The inventors have recognized and appreciated that it may not be important to precisely keep track of which user agents have been seen. Therefore, it may be sufficient to apply a hash-modding technique to divide the tens of thousands of possible user agents into, say, a hundred or fewer buckets. In this manner, if multiple user agents have been seen, there may be a high probability of multiple buckets being hit, which may provide sufficient information for anomaly detection.

III. Dynamically Deployed Security Probes

Some security systems flag all suspicious digital interactions for manual review, which may cause delays in sending acknowledgements to users. Moderate delays may be acceptable to organizations selling physical goods over the Internet, because for each order there may be a time window during which the ordered physical goods are picked from a warehouse and packaged for shipment, and a manual review may be conducted during that time window. However, many digital interactions involve sale of digital goods (e.g., music, game, etc.), transfer of funds, etc. For such digital interactions, a security system may be expected to respond to each request in real time, for example, within hundreds or tens of milliseconds. Such quick responses may improve user experience. For instance, a user making a transfer or ordering a song, game, etc. may wish to receive real time confirmation that the transaction has gone through. Accordingly, in some embodiments, techniques are provided for automatically investigating suspicious digital interactions, thereby improving response time of a security system.

In some embodiments, if a digital interaction matches one or more fuzzy profiles, a security system may scrutinize the digital interaction more closely, even if there is not yet sufficient information to justify classifying the digital interaction as part of an attack. The security system may scrutinize a digital interaction in a non-invasive manner so as to reduce user experience friction.

As an example, a security system may observe an anomalously high percentage of traffic at a retail web site involving a particular product or service, and may so indicate in a fuzzy profile. A digital interaction with an attempted purchase of that product or service may be flagged as matching the fuzzy profile, but that pattern alone may not be sufficiently suspicious, as many users may purchase that product or service for legitimate reasons. To prevent a false positive, one approach may be to send the flagged digital interaction to a human operator for review. Another approach may be to require one or more verification tasks (e.g., captcha challenge, security question, etc.) before approving the attempted purchase. The inventors have recognized and appreciated that both of these approaches may negatively impact user experience.

Accordingly, in some embodiments, a match with a fuzzy profile may trigger additional analysis that is non-invasive. For example, the security system may collect additional data from the digital interaction in a non-invasive manner and may analyze the data in real time, so that by the time the digital interaction progresses to a stage with potential for damage (e.g., charging a credit card), the security system may have already determined whether the digital interaction is likely to be legitimate.

In some embodiments, one or more security probes may be deployed dynamically to obtain information from a digital interaction. For instance, a security probe may be deploy only when a security system determines that there is sufficient value in doing so (e.g., using an understanding of user behavior). As an example, a security probe may be deployed when a level of suspicion associated with the digital interaction is sufficiently high to warrant an investigation (e.g., when the digital interaction matches a fuzzy profile comprising one or more anomalous attributes, or when the digital interaction represents a significant deviation from an activity pattern observed in the past for an anchor value, such as a device identifier, that is reported in the digital interaction).

The inventors have recognized and appreciated that by reducing a rate of deployment of security probes for surveillance, it may be more difficult for an attacker to detect the surveillance and/or to discover how the surveillance is conducted. As a result, the attacker may not be able to evade the surveillance effectively.

In some embodiments, multiple security probes may be deployed, where each probe may be designed to discover different information. For example, information collected by a probe may be used by a security system to inform the decision of which one or more other probes to deploy next. In this manner, the security system may be able to gain an in-depth understanding into network traffic (e.g., web site and/or application traffic). For example, the security system may be able to: classify traffic in ways that facilitate identification of malicious traffic, define with precision what type of attack is being observed, and/or discover that some suspect behavior is actually legitimate. In some embodiments, a result may indicate not only a likelihood that certain traffic is malicious, but also a likely type of malicious traffic. Therefore, such a result may be more meaningful than just a numeric score.

The inventors have recognized and appreciated that some online behavior scoring systems use client-side checks to collect information. In some instances, such checks are enabled in a client during many interactions, which may give an attacker clear visibility into how the online behavior scoring system works (e.g., what information is collected, what tests are performed, etc.). As a result, an attacker may be able to adapt and evade detection. Accordingly, in some embodiments, techniques are provided for obfuscating client-side functionalities. Used alone or in combination with dynamic probe deployment (which may reduce the number of probes deployed to, for example, one in hundreds of thousands of digital interactions), client-side functionality obfuscation may reduce the likelihood of malicious entities detecting surveillance and/or discovering how the surveillance is conducted. For instance, client-side functionality obfuscation may make it difficult for a malicious entity to test a probe's behavior in a consistent environment.

IV. Further Descriptions

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

FIG. 1A shows an illustrative system 10 via which digital interactions may take place, in accordance with some embodiments. In this example, the system 10 includes user devices 11A-C, online systems 12 and 13, and a security system 14. A user 15 may use the user devices 11A-C to engage in digital interactions. For instance, the user device 11A may be a smart phone and may be used by the user 15 to check email and download music, the user device 11B may be a tablet computer and may be used by the user 15 to shop and bank, and the user device 11C may be a laptop computer and may be used by the user 15 to watch TV and play games.

It should be appreciated that the user 15 may engage in other types of digital interactions in addition to, or instead of, those mentioned above, as aspects of the present disclosure are not limited to the analysis of any particular type of digital interactions. Also, digital interactions are not limited to interactions that are conducted via an Internet connection. For example, a digital interaction may involve an ATM transaction over a leased telephone line.

Furthermore, it should be appreciated that the particular combination of user devices 11A-C is provided solely for purposes of illustration, as the user 15 may use any suitable device or combination of devices to engage in digital interactions, and the user may use different devices to engage in a same type of digital interactions (e.g., checking email).

In some embodiments, a digital interaction may involve an interaction between the user 15 and an online system, such as the online system 12 or the online system 13. For instance, the online system 12 may include an application server that hosts a backend of a banking app used by the user 15, and the online system 13 may include a web server that hosts a retailer's web site that the user 15 visits using a web browser. It should be appreciated that the user 15 may interact with other online systems (not shown) in addition to, or instead of the online systems 12 and 13. For example, the user 15 may visit a pharmacy's web site to have a prescription filled and delivered, a travel agent's web site to book a trip, a government agency's web site to renew a license, etc.

In some embodiments, behaviors of the user 15 may be measured and analyzed by the security system 14. For instance, the online systems 12 and 13 may report, to the security system 14, behaviors observed from the user 15. Additionally, or alternatively, the user devices 11A-C may report, to the security system 14, behaviors observed from the user 15. As one example, a web page downloaded from the web site hosted by the online system 13 may include software (e.g., a JavaScript snippet) that programs the browser running on one of the user devices 11A-C to observe and report behaviors of the user 15. Such software may be provided by the security system 14 and inserted into the web page by the online system 13. As another example, an application running on one of the user devices 11A-C may be programmed to observe and report behaviors of the user 15. The behaviors observed by the application may include interactions between the user 15 and the application, and/or interactions between the user 15 and another application. As another example, an operating system running on one of the user devices 11A-C may be programmed to observe and report behaviors of the user 15.

It should be appreciated that software that observes and reports behaviors of a user may be written in any suitable language, and may be delivered to a user device in any suitable manner. For example, the software may be delivered by a firewall (e.g., an application firewall), a network operator (e.g., Comcast, Sprint, etc.), a network accelerator (e.g., Akamai), or any device along a communication path between the user device and an online system, or between the user device and a security system.

Although only one user (i.e., the user 15) is shown in FIG. 1A, it should be appreciated that the security system 14 may be programmed to measure and analyze behaviors of many users across the Internet. Furthermore, it should be appreciated that the security system 14 may interact with other online systems (not shown) in addition to, or instead of the online systems 12 and 13. The inventors have recognized and appreciated that, by analyzing digital interactions involving many different users and many different online systems, the security system 14 may have a more comprehensive and accurate understanding of how the users behave. However, aspects of the present disclosure are not limited to the analysis of measurements collected from different online systems, as one or more of the techniques described herein may be used to analyze measurements collected from a single online system. Likewise, aspects of the present disclosure are not limited to the analysis of measurements collected from different users, as one or more of the techniques described herein may be used to analyze measurements collected from a single user.

Figure 1B:
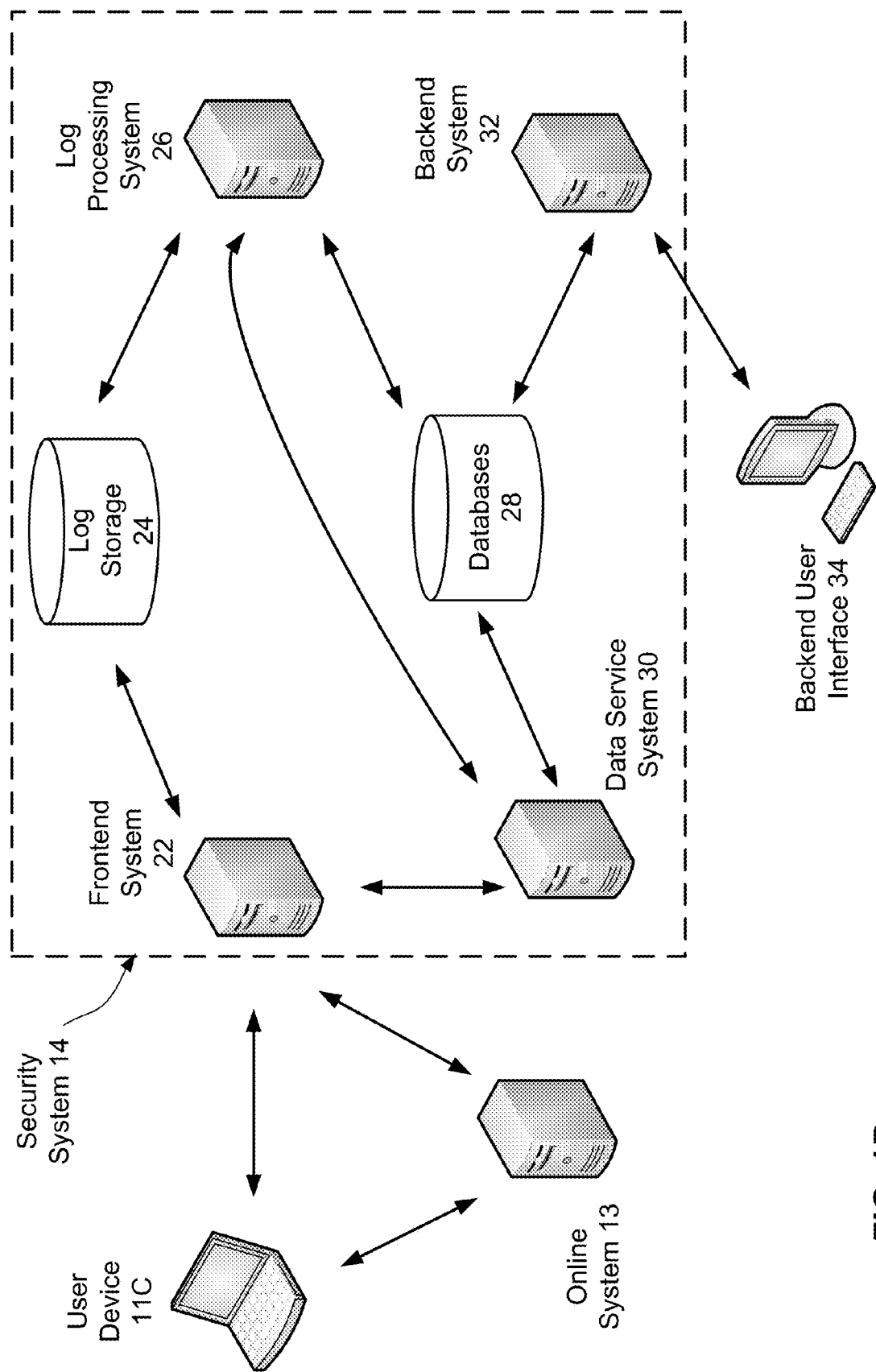
FIG. 1B shows an illustrative security system 14 for processing data collected from digital interactions, in accordance with some embodiments.

FIG. 1B shows an illustrative implementation of the security system 14 shown in FIG. 1A, in accordance with some embodiments. In this example, the security system 14 includes one or more frontend systems and/or one or more backend systems. For instance, the security system 14 may include a frontend system 22 configured to interact with user devices (e.g., the illustrative user device 11C shown in FIG. 1A) and/or online systems (e.g., the illustrative online system 13 shown in FIG. 1A). Additionally, or alternatively, the security system 14 may include a backend system 32 configured to interact with a backend user interface 34. In some embodiments, the backend user interface 34 may include a graphical user interface (e.g., a dashboard) for displaying current observations and/or historical trends regarding individual users and/or populations of users. Such an interface may be delivered in any suitable manner (e.g., as a web application or a cloud application), and may be used by any suitable party (e.g., security personnel of an organization).

In the example shown in FIG. 1B, the security system 14 includes a log storage 24. The log storage 24 may store log files comprising data received by the frontend system 22 from user devices (e.g., the user device 11C), online systems (e.g., the online system 13), and/or any other suitable sources. A log file may include any suitable information. For instance, in some embodiments, a log file may include keystrokes and/or mouse clicks recorded from a digital interaction over some length of time (e.g., several seconds, several minutes, several hours, etc.). Additionally, or alternatively, a log file may include other information of interest, such as account identifier, network address, user device identifier, user device characteristics, URL accessed, Stocking Keeping Unit (SKU) of viewed product, etc.

In some embodiments, the log storage 24 may store log files accumulated over some suitable period of time (e.g., a few years), which may amount to tens of billions, hundreds of billions, or trillions of log files. Each log file may be of any suitable size. For instance, in some embodiments, about 60 kilobytes of data may be captured from a digital interaction per minute, so that a log file recording a few minutes of user behavior may include a few hundred kilobytes of data, whereas a log file recording an hour of user behavior may include a few megabytes of data. Thus, the log storage 24 may store petabytes of data overall.

The inventors have recognized and appreciated it may be impractical to retrieve and analyze log files from the log storage 24 each time a request is received to examine a digital interaction for anomaly. For instance, the security system 14 may perform expected to respond to a request to detect anomaly within 100 msec, 80 msec, 60 msec, 40 msec, 20 msec, or less. The security system 14 may be unable to identify and analyze all relevant log files from the log storage 24 within such a short window of time. Accordingly, in some embodiments, a log processing system 26 may be provided to filter, transform, and/or route data from the log storage 24 to one or more databases 28.

The log processing system 26 may be implemented in any suitable manner. For instance, in some embodiments, the log processing system 26 may include one or more services configured to retrieve a log file from the log storage 24, extract useful information from the log file, transform one or more pieces of extracted information (e.g., adding latitude and longitude coordinates to an extracted address), and/or store the extracted and/or transformed information in one or more appropriate databases (e.g., among the one or more databases 28).

In some embodiments, the one or more services may include one or more services configured to route data from log files to one or more queues, and/or one or more services configured to process the data in the one or more queues. For instance, each queue may have a dedicated service for processing data in that queue. Any suitable number of instances of the service may be run, depending on a volume of data to be processed in the queue.

The one or more databases 28 may be accessed by any suitable component of the security system 14. As one example, the backend system 32 may query the one or more databases 28 to generate displays of current observations and/or historical trends regarding individual users and/or populations of users. As another example, a data service system 30 may query the one or more databases 28 to provide input to the frontend system 22.

Figure 2A:
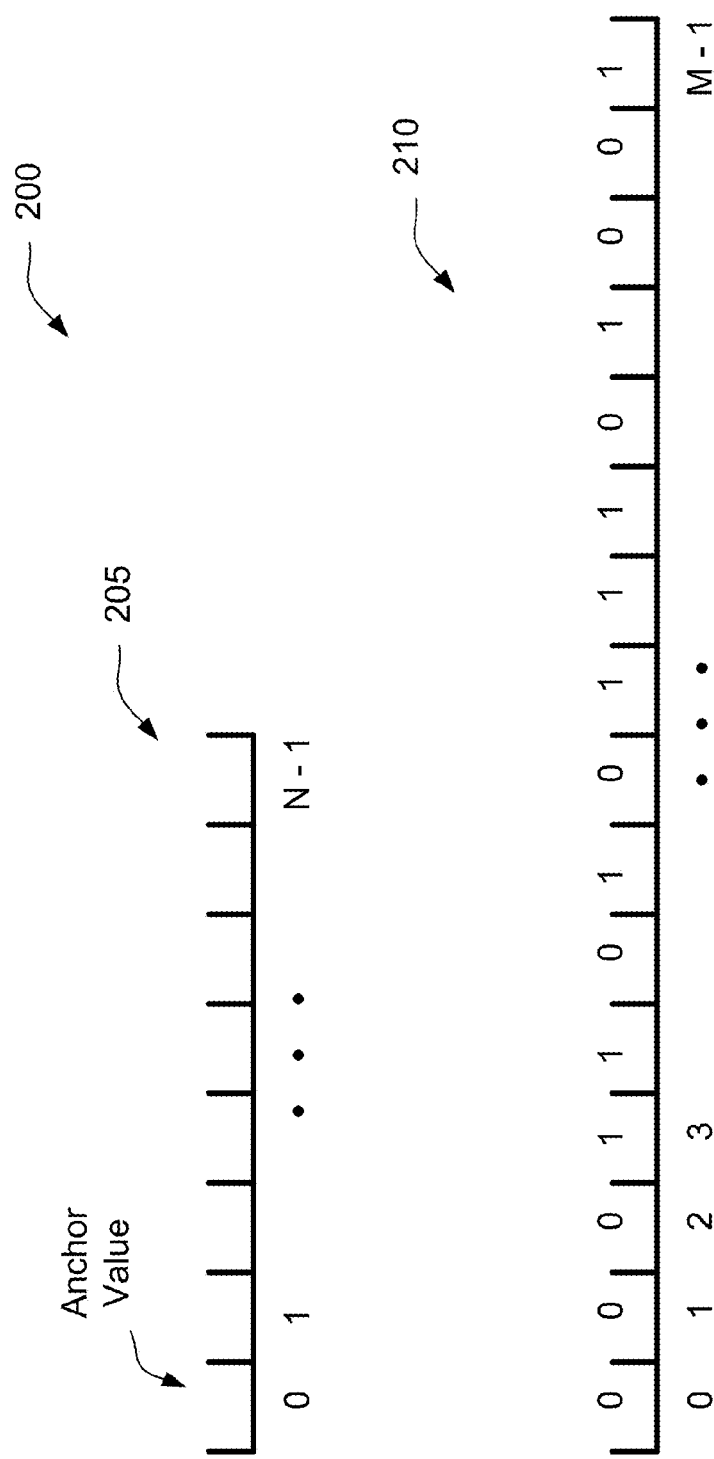
FIG. 2A shows an illustrative data structure 200 for recording observations from a digital interaction, in accordance with some embodiments.

The inventors have recognized and appreciated that some database queries may be time consuming. For instance, if the frontend system 22 were to query the one or more databases 28 each time a request to detect anomaly is received, the frontend system 22 may be unable to respond to the request within 100 msec, 80 msec, 60 msec, 40 msec, 20 msec, or less. Accordingly, in some embodiments, the data service system 30 may maintain one or more data sources separate from the one or more databases 28. An example of a data source maintained by the data service system 30 is shown in FIG. 2A and discussed below.

In some embodiments, a data source maintained by the data service system 30 may have a bounded size, regardless of how much data is analyzed to populate the data source. For instance, if there is a burst of activities from a certain account, an increased amount of data may be stored in the one or more databases 28 in association with that account. The data service system 30 may process the data stored in the one or more databases 28 down to a bounded size, so that the frontend system 22 may be able to respond to requests in constant time.

Various techniques are described herein for processing incoming data. For instance, in some embodiments, all possible network addresses may be divided into a certain number of buckets. Statistics may be maintained on such buckets, rather than individual network addresses. In this manner, a bounded number of statistics may be analyzed, even if an actual number of network addresses observed may fluctuate over time. One or more other techniques may also be used in addition to, or instead of bucketing, such as maintaining an array of a certain size.

In some embodiments, the data service system 30 may include a plurality of data services (e.g., implemented using a service-oriented architecture). For example, one or more data services may access the one or more databases 28 periodically (e.g., every hour, every few hours, every day, etc.), and may analyze the accessed data and populate one or more first data sources used by the frontend system 22. Additionally, or alternatively, one or more data services may receive data from the log processing system 26, and may use the received data to update one or more second data sources used by the frontend system 22. Such a second data source may supplement the one or more first data sources with recent data that has arrived since the last time the one or more first data sources were populated using data accessed from the one or more databases 28. In various embodiments, the one or more first data sources may be the same as, or different from, the one or more second data sources, or there may be some overlap.

Although details of implementation are shown in FIG. 1B and discussed above, it should be appreciated that aspects of the present disclosure are not limited to the use of any particular component, or combination of components, or to any particular arrangement of components. Furthermore, each of the frontend system 22, the log processing system 26, the data service system 30, and the backend system 32 may be implemented in any suitable manner, such as using one or more parallel processors operating at a same location or different locations.

Figure 1C:
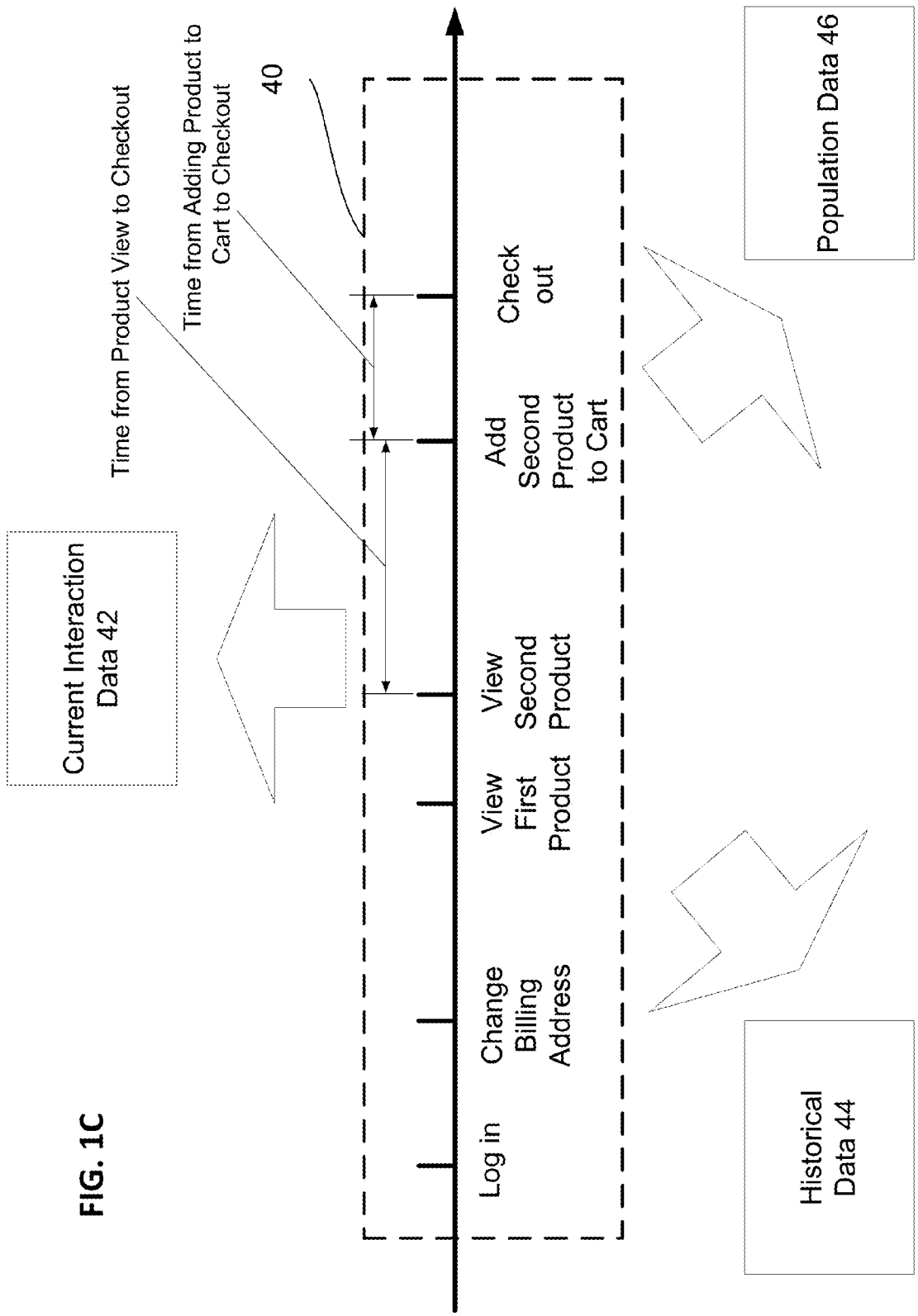
FIG. 1C shows an illustrative flow 40 within a digital interaction, in accordance with some embodiments.

FIG. 1C shows an illustrative flow 40 within a digital interaction, in accordance with some embodiments. In this example, the flow 40 may represent a sequence of activities conducted by a user on a merchant's web site. For instance, the user may log into the web site, change billing address, view a product details page of a first product, view a product details page of a second product, add the second product to a shopping cart, and then check out.

In some embodiments, a security system may receive data captured from the digital interaction throughout the flow 40. For instance, the security system may receive log files from a user device and/or an online system involved in the digital interaction (e.g., as shown in FIG. 1B and discussed above).

The security system may use the data captured from the digital interaction in any suitable manner. For instance, as shown in FIG. 1B, the security system may process the captured data and populate one or more databases (e.g., the one or more illustrative databases 28 shown in FIG. 1B). Additionally, or alternatively, the security system may populate one or more data sources adapted for efficient access. For instance, the security system may maintain current interaction data 42 in a suitable data structure (e.g., the illustrative data structure 220 shown in FIG. 2B). As one example, the security system may keep track of different network addresses observed at different points in the flow 40 (e.g., logging in and changing billing address via a first network address, viewing the first and second products via a second network address, and adding the second product to the cart and checking out via a third network address). As another example, the security system may keep track of different credit card numbers used in the digital interaction (e.g., different credit cards being entered in succession during checkout). The data structure may be maintained in any suitable manner (e.g., using the illustrative process 230 shown in FIG. 2C) and by any suitable component of the security system (e.g., the illustrative frontend system 22 and/or the illustrative data service system 30).

In some embodiments, the security system may maintain historical data 44, in addition to, or instead of the current interaction data 42. In some embodiments, the historical data 44 may include log entries for user activities observed during one or more prior digital interactions. Additionally, or alternatively, the historical data 44 may include one or more profiles associated respectively with one or more anchor values (e.g., a profile associated with a particular device identifier, a profile associated with a particular network address, etc.). However, it should be appreciated that aspects of the present disclosure are not limited to the use of any particular type of historical data, or to any historical data at all. Moreover, any historical data used may be stored in any suitable manner.

In some embodiments, the security system may maintain population data 46, in addition to, or instead of the current interaction data 42 and/or the historical data 44. For instance, the security system may update, in real time, statistics such as breakdown of web site traffic by user agent, geographical location, product SKU, etc. As one example, the security system may use a hash-modding method to divide all known browser types into a certain number of buckets (e.g., 10 buckets, 100 buckets, etc.). For each bucket, the security system may calculate a percentage of overall web site traffic that falls within that bucket. As another example, the security system may use a hash-modding method to divide all known product SKUs into a certain number of buckets (e.g., 10 buckets, 100 buckets) and calculate respective traffic percentages. Additionally, or alternatively, the security system may calculate respective traffic percentages for combinations of buckets (e.g., a combination of a bucket of browser types, a bucket of product SKUs, etc.).

In some embodiments, a security system may perform anomaly detection processing on an on-going basis and may continually create new fuzzy profiles and/or update existing fuzzy profiles. For instance, the security system may compare a certain statistic (e.g., a count of digital interactions reporting Chrome as browser type) from a current time period (e.g., 9:00 pm-10:00 pm today) against the same statistic from a past time period (e.g., 9:00 pm-10:00 pm yesterday, a week ago, a month ago, a year ago, etc.). If the current value of the statistic deviates significantly from the past value of the statistic (e.g., by more than a selected threshold amount), an anomaly may be reported, and the corresponding attribute (e.g., browser type) and attribute value (e.g., Chrome) may be stored in a fuzzy profile.

In some embodiments, the security system may render any one or more aspects of the current interaction data 42, the historical data 44, and/or the population data 46 (e.g., via the illustrative backend user interface 34 shown in FIG. 1B). For instance, the security system may render breakdown of web site traffic (e.g., with actual traffic measurements, or percentages of overall traffic) using a stacked area chart.

FIG. 1C also shows examples of time measurements in the illustrative flow 40. In some embodiments, the security system may receive data captured throughout the flow 40, and the received data may include log entries for user activities such as logging into the web site, changing billing address, viewing the product details page of the first product, viewing the product details page of the second product, adding the second product to the shopping cart, checking out, etc. The log entries may include timestamps, which may be used by the security system to determine an amount of time that elapsed between two points in the digital interaction. For instance, the security system may use the appropriate timestamps to determine how much time elapsed between viewing the second product and adding the second product to the shopping cart, between adding the second product to the shopping cart and checking out, between viewing the second product to checking out, etc.

The inventors have recognized and appreciated that certain timing patterns may be indicative of illegitimate digital interactions. For instance, a reseller may use bots to make multiple purchases of a product that is on sale, thereby circumventing a quantity restriction (e.g., one per customer) imposed by a retail web site. Such a bot may be programmed to step through an order quickly, to maximize the total number of orders completed during a promotional period. The resulting timing pattern may be noticeably different from that of a human customer browsing through the web site and taking time to read product details before making a purchase decision. Therefore, a timing pattern such as a delay between product view and checkout may be a useful attribute to monitor in digital interactions.

It should be appreciated that aspects of the present disclosure are not limited to the analysis of online purchases, as one or more of the techniques described herein may be used to analyze other types of digital interactions, including, but not limited to, opening a new account, checking email, transferring money, etc. Furthermore, it should be appreciated that aspects of the present disclosure are not limited to monitoring any particular timing attribute, or any timing attribute at all. In some embodiments, other attributes, such as various anchor types observed from a digital interaction, may be monitored in addition to, or instead of, timing attributes.

FIG. 2A shows an illustrative data structure 200 for recording observations from a digital interaction, in accordance with some embodiments. For instance, the data structure 200 may be used by a security system (e.g., the illustrative security system 14 shown in FIG. 1A) to record distinct anchor values of a same type that have been observed in a certain context. However, that is not required, as in some embodiments the data structure 200 may be used to record other distinct values, instead of, or in addition to, anchor values.

In some embodiments, the data structure 200 may be used to store up to N distinct anchor values of a same type (e.g., N distinct credit card numbers) that have been seen in a digital interaction. For instance, in some embodiments, the data structure 200 may include an array 205 of a certain size N. Once the array has been filled, a suitable method may be used to determine whether to discard a newly observed credit card number, or replace one of the stored credit card numbers with the newly observed credit card number. In this manner, only a bounded amount of data may be analyzed in response to a query, regardless of an amount of raw data that has been received.

In some embodiments, the number N of distinct values may be chosen to provide sufficient information without using an excessive amount of storage space. For instance, a security system may store more distinct values (e.g., 8-16) if precise values are useful for detecting anomalies, and fewer distinct values (e.g., 2-4) if precise values are less important. In some embodiments, N may be 8-16 for network addresses, 4-8 for credit card numbers, and 2-4 for user agents. The security system may use the network addresses to determine if there is a legitimate reason for multiple network addresses being observed (e.g., a user traveling and connecting to a sequence of access points along the way), whereas the security system may only look for a simple indication that multiple user agents have been observed.

It should be appreciated that aspects of the present disclosure are not limited to the use of an array to store distinct values. Other data structures, such as linked list, tree, etc., may also be used.

The inventors have recognized and appreciated that it may be desirable to store additional information in the data structure 200, beyond N distinct observed values. For instance, it may be desirable to store an indication of how many distinct values have been observed overall, and how such values are distributed. Accordingly, in some embodiments, possible values may be divided into a plurality of M buckets, and a bit string 210 of length M may be stored in addition to, or instead of, N distinct observed values. Each bit in the bit string 210 may correspond to a respective bucket, and may be initialized to 0. Whenever a value in a bucket is observed, the bit corresponding to that bucket may be set to 1.

Possible values may be divided into buckets in any suitable manner. For instance, in some embodiments, a hash function may be applied to possible values and a modulo operation (with modulus M) may be applied to divide the resulting hashes into M buckets. The modulus M may be chosen to achieve a desired balance between precision and efficiency. For instance, a larger number of buckets may provide a higher resolution (e.g., fewer possible values being lumped together and becoming indistinguishable), but the bit string 210 may take up more storage space, and it may be computationally more complex to update and/or access the bit string 210.

It should be appreciated that aspects of the present disclosure are not limited to the use of hash-modding to divide possible values into buckets, as other methods may also be suitable. For instance, in some embodiments, one or more techniques based on Bloom filters may be used.

Figure 2B:
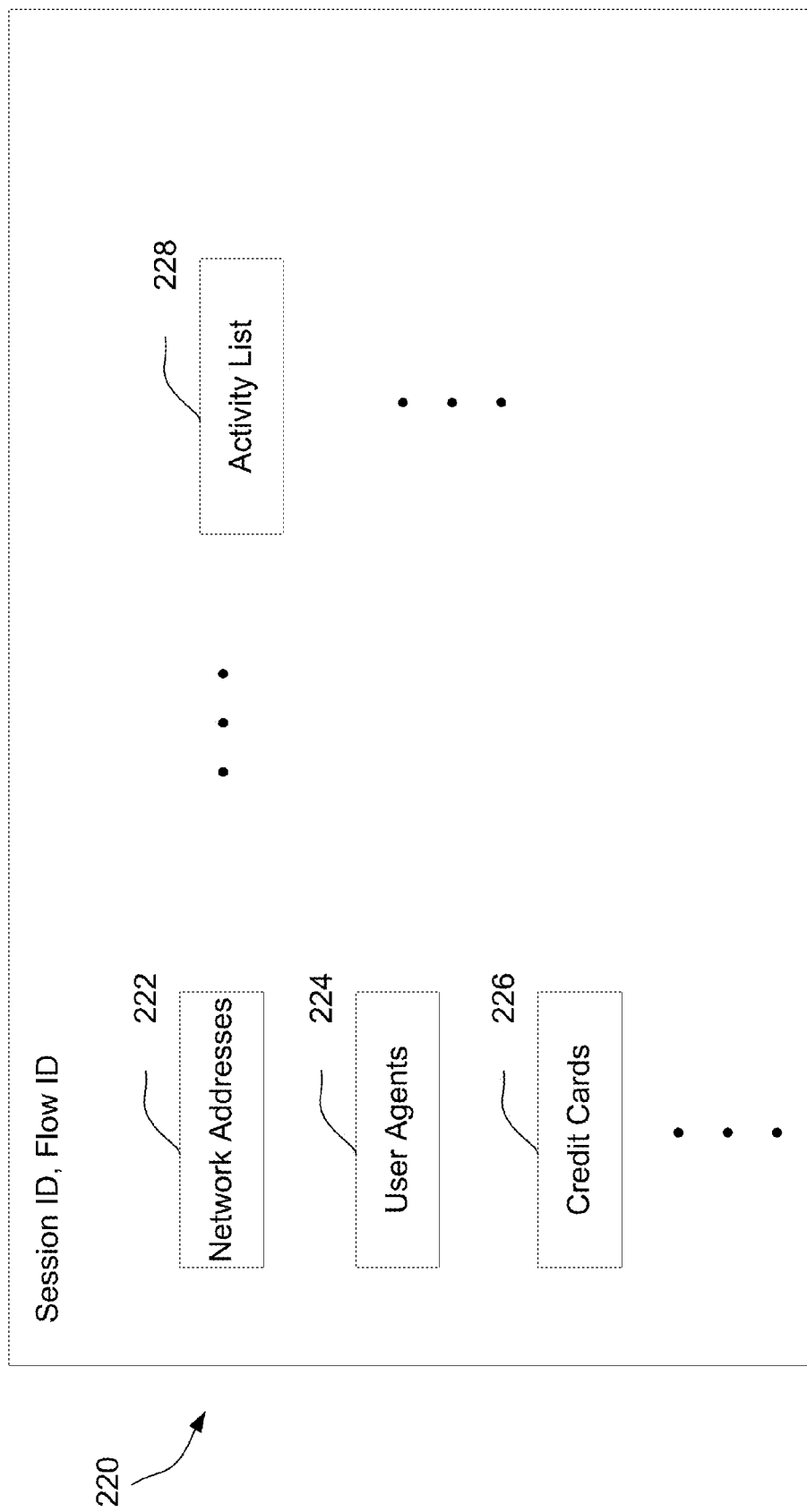
FIG. 2B shows an illustrative data structure 220 for recording observations from a digital interaction, in accordance with some embodiments.

FIG. 2B shows an illustrative data structure 220 for recording observations from a digital interaction, in accordance with some embodiments. For instance, the data structure 220 may be used by a security system (e.g., the illustrative security system 14 shown in FIG. 1A) to record distinct anchor values that have been observed in a certain context. However, that is not required, as in some embodiments the data structure 220 may be used to record other distinct values, instead of, or in addition to, anchor values.

In the example shown in FIG. 2B, the data structure 220 may be indexed by a session identifier and a flow identifier. The session identifier may be an identifier assigned by a web server for a web session. The flow identifier may identifier a flow (e.g., the illustrative flow 40 shown in FIG. 1C), which may include a sequence of activities. The security system may use the session and flow identifiers to match a detected activity to the digital interaction. However, it should be appreciated that aspects of the present disclosure are not limited to the use of a session identifier and a flow identifier to identify a digital interaction.

In some embodiments, the data structure 220 may include a plurality of components, such as components 222, 224, 226, and 228 shown in FIG. 2B. Each of the components 222, 224, 226, and 228 may be similar to the illustrative data structure 200 shown in FIG. 2A. For instance, the component 222 may store up to a certain number of distinct network addresses observed from the digital interaction, the component 224 may store up to a certain number of distinct user agents observed from the digital interaction, the component 226 may store up to a certain number of distinct credit card numbers observed from the digital interaction, etc.

In some embodiments, the data structure 220 may include a relatively small number (e.g., 10, 20, 30, etc.) of components such as 222, 224, 226, and 228. In this manner, a relatively small amount of data may be stored for each on-going digital interaction, while still allowing a security system to conduct an effective sameness analysis.

In some embodiments, the component 228 may store a list of lists of indices, where each list of indices may correspond to an activity that took place in the digital interaction. For instance, with reference to the illustrative flow 40 shown in FIG. 1C, a first list of indices may correspond to logging in, a second list of indices may corresponding to changing billing address, a third list of indices may correspond to viewing the first product, a fourth list of indices may correspond to viewing the second product, a fifth list of indices may correspond to adding the second product to the shopping cart, and a sixth list of indices may correspond to checking out.

In some embodiments, each list of indices may indicate anchor values observed from the corresponding activity. For instance, a list [1, 3, 2, . . . ] may indicate the first network address stored in the component 222, the third user agent stored in the component 224, the second credit card stored in the component 226, etc. This may provide a compact representation of the anchor values observed from each activity.

In some embodiments, if an anchor value stored in a component is replaced by another anchor value, one or more lists of indices including the anchor value being replaced may be updated. For instance, if the first network address stored in the component 222 is replaced by another network address, the list [1, 3, 2, . . . ] may be updated as [φ, 3, 2, . . . ], where φ is any suitable default value (e.g., N+1, where N is the capacity of the component 222).

In some embodiments, a security system may use a list of lists of indices to determine how frequently an anchor value has been observed. For instance, the security system may count a number of lists in which the index 1 appears at the first position. This may indicate a number of times the first network address stored in the component 222 has been observed.

It should be appreciated that the components 222, 224, 226, and 228 shown in FIG. 2B and discussed above solely for purposes of illustration, as aspects of the present disclosure are not limited to storing any particular information about a current digital interaction, or to any particular way of representing the stored information. For instance, other types of component data structures may be used in addition to, or instead of, the illustrative data structure 200 shown in FIG. 2A.

Figure 2C:
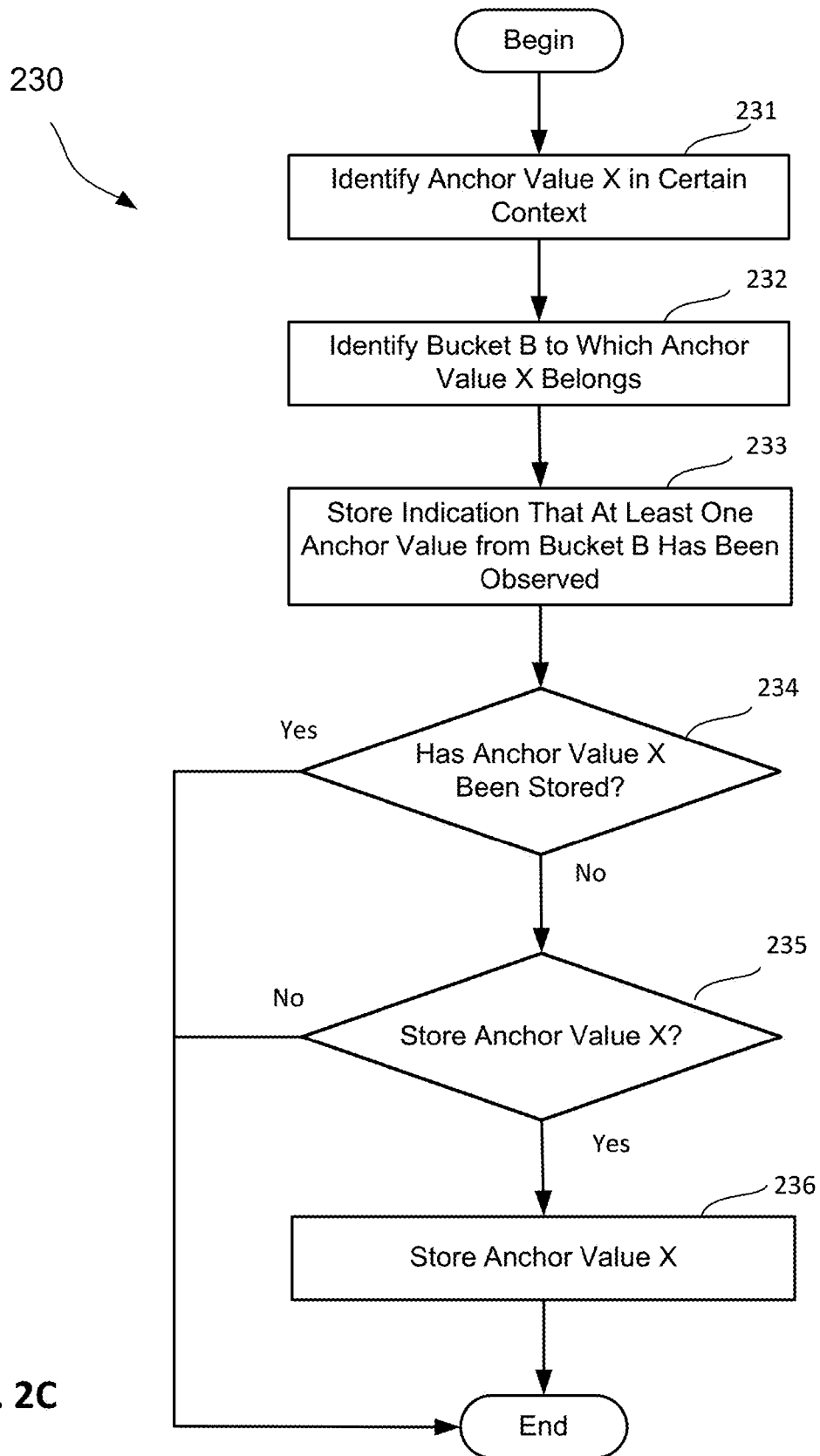
FIG. 2C shows an illustrative process 230 for recording observations from a digital interaction, in accordance with some embodiments.

FIG. 2C shows an illustrative process 230 for recording observations from a digital interaction, in accordance with some embodiments. For instance, the process 230 may be performed by a security system (e.g., the illustrative security system 14 shown in FIG. 1A) to record distinct values of a same type (e.g., N distinct credit card numbers) that have been observed in a certain context (e.g., in a certain digital interaction). The distinct values may be recorded in a data structure such as the illustrative data structure 200 shown in FIG. 2A.

At act 231, the security system may identify an anchor value X in a certain context. For instance, in some embodiments, the anchor value X may be observed from a certain digital interaction. In some embodiments, the security system may access a record of the digital interaction, and may identify from the record a data structure associated with a type T of the anchor value X. For instance, if the anchor value X is a credit card number, the security system may identify, from the record of the digital interaction, a data structure for storing credit card numbers observed from the digital interaction.

At act 232, the security system may identify a bucket B to which the anchor value X belongs. For instance, in some embodiments, a hash-modding operation may be performed to map the anchor value X to the bucket B as described above in connection with FIG. 2A.

At act 233, the security system may store an indication that at least one anchor value from the bucket B has been observed in connection with the digital interaction. For instance, the security system may operate on the data structure identified at act 231. With reference with the example shown in FIG. 2A, the security system may identify, in the illustrative bit string 210, a position that corresponds to the bucket B identified at act 232 and write 1 into that position.

At act 234, the security system may determine whether the anchor value X has already been stored in connection with the relevant context. For instance, the security system may check if the anchor value X has already been stored in the data structure identified at act 231. With reference to the example shown in FIG. 2A, the security system may look up the anchor value X in the illustrative array 205. This lookup may be performed in any suitable manner. For instance, if the array 205 is sorted, the security system may perform a binary search to determine if the anchor value X is already stored in the array 205.

If it is determined at act 234 that the anchor value X has already been stored, the process 230 may end. Although not shown, the security system may, in some embodiments, increment one or more counters for the anchor value X prior to ending the process 230.

If it is determined at act 234 that the anchor value X has not already been stored, the security system may proceed to act 235 to determine whether to store the anchor value X. With reference to the example shown in FIG. 2A, the security system may, in some embodiments, store the anchor value X if the array 205 is not yet full. If the array 205 is full, the security system may determine whether to replace one of the stored anchor values with the anchor value X.

As one example, the security system may store in the array 205 the first N distinct anchor values of the type T observed from the digital interaction, and may discard every subsequently observed anchor value of the type T. As another example, the security system may replace the oldest stored anchor value with the newly observed anchor value, so that the array 205 stores the last N distinct values of the type T observed in the digital interaction. As another example, the security system may store in the array 205 a suitable combination of N anchor values of the type T, such as one or more anchor values observed near a beginning of the digital interaction, one or more anchor values most recently observed from the digital interaction, one or more anchor values most frequently observed from the digital interaction (e.g., based on respective counters stored for anchor values, or lists of indices such as the illustrative component 228 shown in FIG. 2B), and/or one or more other anchor values of interest (e.g., one or more credit card numbers previously involved in credit card cycling attacks).

Figure 3:
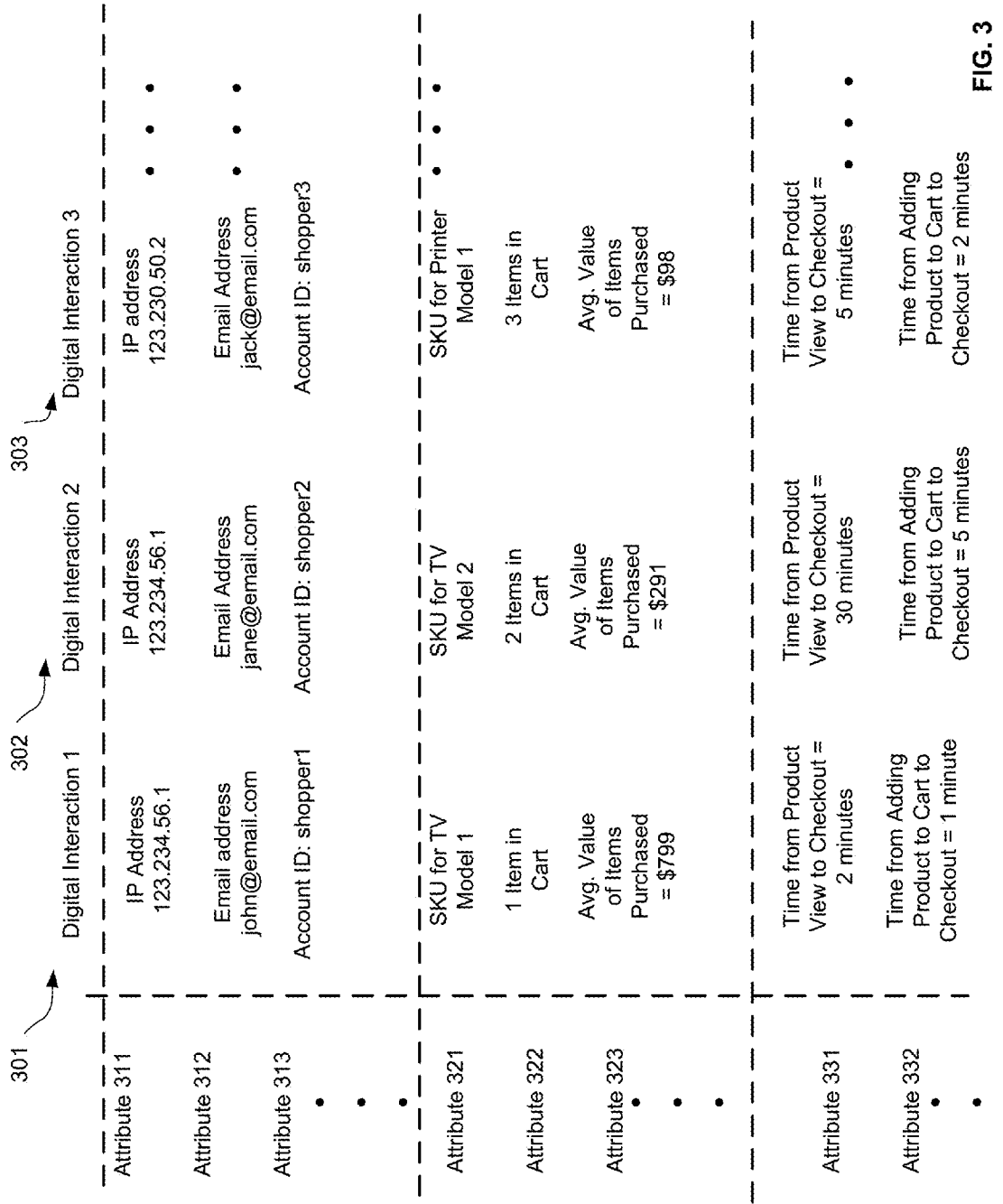
FIG. 3 shows illustrative attributes that may be monitored by a security system, in accordance with some embodiments.

FIG. 3 shows illustrative attributes that may be monitored by a security system, in accordance with some embodiments. In this example, a security system (e.g., the illustrative security system 14 shown in FIG. 1B) monitors a plurality of digital interactions, such as digital interactions 301, 302, 303, etc. These digital interactions may take place via a same web site. However, that is not required, as one or more of the techniques described herein may be used to analyze digital interactions taking place across multiple web sites.

In the example shown in FIG. 3, the security system monitors different types of attributes. For instance, the security system may record one or more anchor values for each digital interaction, such as network address (attribute 311), email address (attribute 312), account identifier (attribute 313), etc.

The security system may identify an anchor value from a digital interaction in any suitable matter. As one example, the digital interaction may include an attempt to log in, and an email address may be submitted to identify an account associated with the email address. However, that is not required, as in some embodiments a separate account identifier may be submitted and an email address on record for that account may be identified. As another example, the digital interaction may include an online purchase. A phone number may be submitted for scheduling a delivery, and a credit card number may be submitted for billing. However, that is not required, as in some embodiments a phone number and/or a credit card number may be identified from a record of the account from which the online purchase is made. As another example, the security system may examine data packets received in connection with the digital interaction and extract, from the data packets, information such as a source network address and a source device identifier.

It should be appreciated that the examples described above are merely illustrative, as aspects of the present disclosure are not limited to the use of any particular anchor type, or any particular method for identifying an anchor value. Examples of anchor types include, but are not limited to the following.

User information
    account identifier
    real name, social security number, driver's license number, passport number, etc.
    email address
        user name, country of user registration, date of user registration, etc.
        email domain, DNS, server status/type/availability/capabilities/software/etc., network details, domain registrar and associated details (e.g., country of domain registrant, contact information of domain registrant, etc.), age of domain, country of domain registration, etc.
    phone number
        subscriber number, country prefix, country of number, area code, state/province/parish/etc. of area code or number location, if the number is activated, if the number is forwarded, billing type (e.g. premium rate), ownership details (e.g., personal, business, and associated details regarding email, domain, network address, etc.), hardware changes, etc.
    location
        GPS coordinates, continent, country, territory, state, province, parish, city, time zone, designated market area, metropolitan statistical area, postal code, street name, street number, apartment number, address type (e.g., billing, shipping, home, etc.), etc.
    payment
        plain text or hash of number of credit card, payment card, debit card, bank card, etc., card type, primary account number (PAN), issuer identification number (IIN), IIN details (e.g., name, address, etc.), date of issue, date of expiration, etc.

Device information
    brand, model, operating system, user agent, installed components, rendering artifacts, browser capabilities, installed software, available features, available external hardware (e.g. displays, keyboards, network and available associated data), etc.
    device identifier, cookie/HTML storage, other device-based storage, secure password storage (e.g., iOS Keychain), etc.
    device fingerprint (e.g., from network and environment characteristics)

Network information
    network address (e.g., IP address, sub address, etc.), network identifier, network access identifier, mobile station equipment identity (IMEI), media access control address (MAC), subscriber identity module (SIM), etc.
    IP routing type (e.g. fixed connection, aol, pop, super-pop, satellite, cache proxy, international proxy, regional proxy, mobile gateway, etc.), proxy type (e.g., anonymous, distorting, elite/concealing, transparent, http, service provider, socks/socks http, web, etc.), connection type (e.g., anonymized, VPN, Tor, etc.), network speed, network operator, autonomous system number (ASN), carrier, registering organization of network address, organization NAICS code, organization ISIC code, if the organization is a hosting facility, etc.

Returning to FIG. 3, the security system may monitor one or more transaction attributes in addition to, or instead of, one or more anchor types. The security system may identify transaction attribute values from a digital interaction in any suitable matter. As one example, the digital interaction may include a purchase transaction, and the security system may identify information relating to the purchase transaction, such as the a SKU for a product being purchased (attribute 321), a count of items in a shopping cart at time of checkout (attribute 322), an average value of items being purchased (attribute 323), etc.

Alternatively, or additionally, the security system may monitor one or more timing attributes, such as time from product view to checking out (attribute 331), time from adding a product to cart to checking out (attribute 332), etc. Illustrative techniques for identifying timing attribute values are discussed in connection with FIG. 2.

It should be appreciated that the attributes shown in FIG. 3 and discussed above are provided solely for purposes of illustration, as aspects of the present disclosure are not limited to the use of any particular attribute or combination of attributes. For instance, in some embodiments, a digital interaction may include a transfer of funds, instead of, or in addition to, a purchase transaction. Examples of transaction attributes for a transfer of funds include, but are not limited to, amount being transferred, name of recipient institution, recipient account number, etc.

Figure 4:
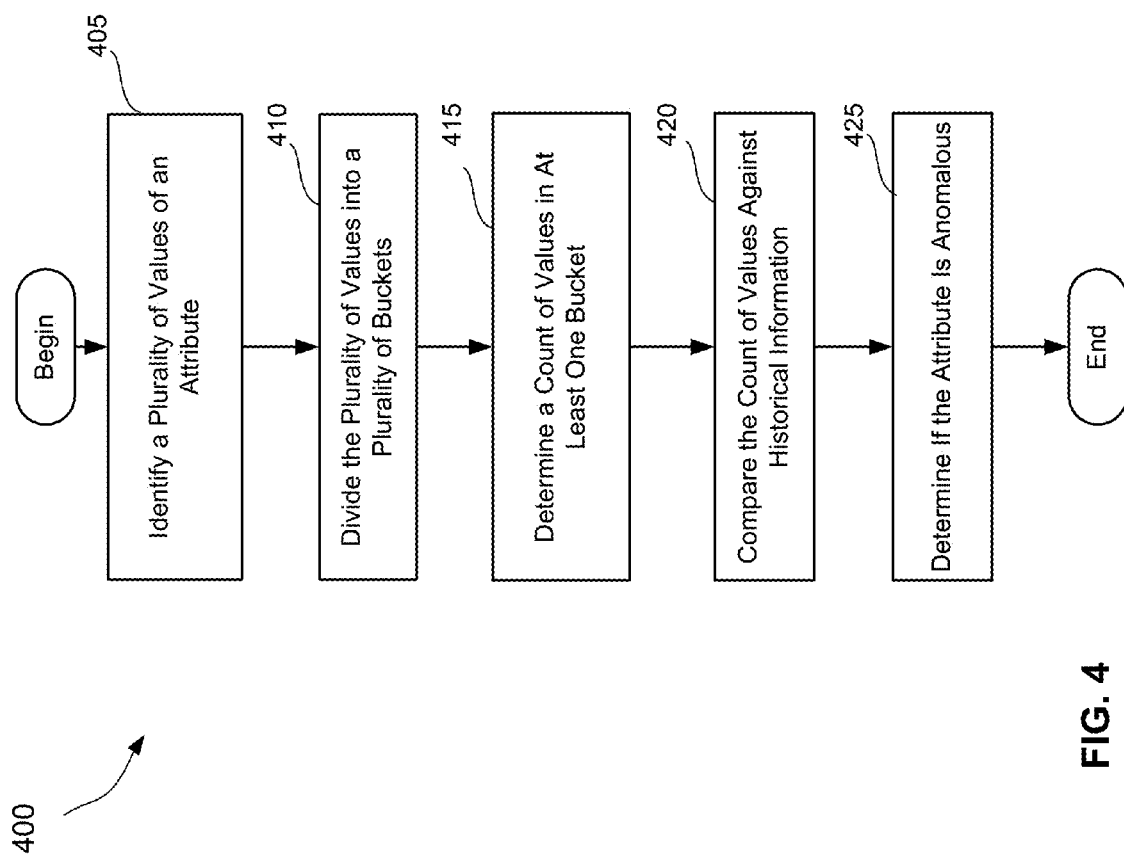
FIG. 4 shows an illustrative process 400 for detecting anomalies, in accordance with some embodiments.

FIG. 4 shows an illustrative process 400 for detecting anomalies, in accordance with some embodiments. For instance, the process 400 may be performed by a security system (e.g., the illustrative security system 14 shown in FIG. 1B) to monitor digital interactions taking place at a particular web site. The security system may compare what is currently observed against what was observed previously at the same web site to determine whether there is any anomaly.

At act 405, the security system may identify a plurality of values of an attribute. As discussed in connection with FIG. 3, the security system may monitor any suitable attribute, such as an anchor type (e.g., network address, email address, account identifier, etc.), a transaction attribute (e.g., product SKU, number of items in shopping cart, average value of items purchased, etc.), a timing attribute (e.g., time from product view to checkout, time from adding product to shopping cart to checkout, etc.), etc.

In some embodiments, the security system may identify each value of the attribute from a respective digital interaction. For instance, the security system may monitor digital interactions taking place within a current time period (e.g., 30 minutes, one hour, 90 minutes, two hours, etc.), and may identify a value of the attribute from each digital interaction. However, it should be appreciated that aspects of the present disclosure are not limited to monitoring every digital interaction taking place within some time period. For instance, in some embodiments, digital interactions may be sampled (e.g., randomly) and attribute values may be identified from the sampled digital interactions.

The inventors have recognized and appreciated that it may be impractical to maintain statistics on individual attribute values. For instance, there may be billions of possible network addresses. It may be impractical to maintain a counter for each possible network address to keep track of how many digital interactions are reporting that particular network address. Accordingly, in some embodiments, possible values of an attribute may be divided into a plurality of buckets. Rather than maintaining a counter for each attribute value, the security system may maintain a counter for each bucket of attribute values. For instance, a counter may keep track of a number of digital interactions with any network address from a bucket B of network addresses, as opposed to a number of digital interactions with a particular network address Y. Thus, multiple counters (e.g., a separate counter for each attribute value in the bucket B) may be replaced with a single counter (e.g., an aggregate counter for all attribute values in the bucket B).

In this manner, a desired balance between precision and efficiency may be achieved by selecting an appropriate number of buckets. For instance, a larger number of buckets may provide a higher resolution, but more counters may be maintained and updated, whereas a smaller number of buckets may reduce storage requirement and speed up retrieval and updates, but more information may be lost.

Returning to the example of FIG. 4, the security system may, at act 410, divide the attribute values identified at act 405 into a plurality of buckets. In some embodiments, each bucket may be a multiset. For instance, if two different digital interactions report the same network address, that network address may appear twice in the corresponding bucket.

At act 415, the security system may determine a count of the values that fall within a particular bucket. In some embodiments, a count may be determined for each bucket of the plurality of buckets. However, that is not required, as in some embodiments the security system may only keep track of one or more buckets of interest.

Various techniques may be used to divide attribute values into buckets. As one example, the security system may divide numerical attribute values (e.g., time measurements) into a plurality of ranges. As another example, the security system may use a hash-modding technique to divide numerical and/or non-numerical attribute values into buckets. Other techniques may also be used, as aspects of the present disclosure are not limited to any particular technique for dividing attribute values into buckets.

Figure 5:
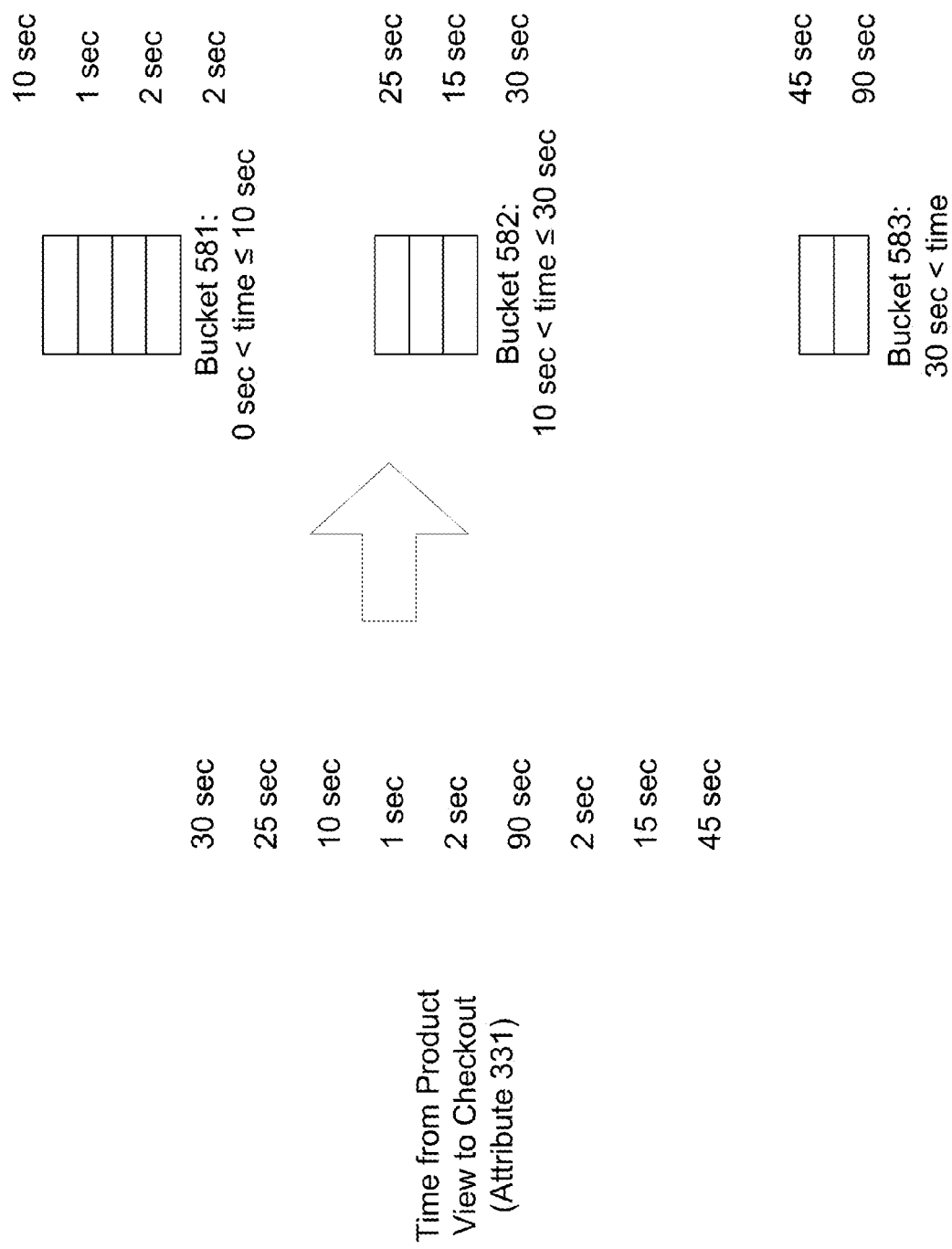
FIG. 5 shows an illustrative technique for dividing a plurality of numerical attribute values into a plurality of ranges, in accordance with some embodiments.

FIG. 5 shows an illustrative technique for dividing a plurality of numerical attribute values into a plurality of ranges, in accordance with some embodiments. For instance, the illustrative technique shown in FIG. 5 may be used by a security system to divide values of the illustrative attribute 331 (time from product view to checkout) shown in FIG. 3 into a plurality of buckets.

In the example shown in FIG. 5, the plurality of buckets include three buckets corresponding respectively to three ranges of time measurements. For instance, bucket 581 may correspond to a range between 0 and 10 seconds, bucket 582 may correspond to a range between 10 and 30 seconds, and bucket 583 may correspond to a range of greater than 30 seconds.

In some embodiments, thresholds for dividing numeric measurements into buckets may be chosen based on observations from population data. For instance, the inventors have recognized and appreciated that the time from product view to checkout is rarely less than 10 seconds in a legitimate digital interaction, and therefore a high count for the bucket 581 may be a good indicator of an anomaly. In some embodiments, buckets may be defined based on a population mean and a population standard deviation. For instance, there may be a first bucket for values that are within one standard deviation of the mean, a second bucket for values that are between one and two standard deviations away from the mean, a third bucket for values that are between two and three standard deviations away from the mean, and a fourth bucket for values that are more than three standard deviations away from the mean. However, it should be appreciated that aspects of the present disclosure are not limited to the use of population mean and population standard deviation to define buckets. For instance, in some embodiments, a bucket may be defined based on observations from known fraudsters, and/or a bucket may be defined based on observations from known legitimate users.

In some embodiments, the security system may identify a plurality of values of the attribute 331 from a plurality of digital interactions. For instance, the security system may identify from each digital interaction an amount of time that elapsed between viewing a product details page for a product and checking out (e.g., as discuss in connection with FIGS. 1C and 3). In the example shown in FIG. 5, nine digital interactions are monitored, and nine values of the attribute 331 (time from product view to checkout) are obtained. It should be appreciated that aspects of the present disclosure are not limited to monitoring any particular number of digital interactions. For instance, in some embodiments, some or all of the digital interactions taking place during a certain period of time may be monitored, and the number of digital interactions may fluctuate depending on a traffic volume at one or more relevant web sites.

In the example shown in FIG. 5, the nine values are divided into the buckets 581-583 based on the corresponding ranges, resulting in four values (i.e., 10 seconds, 1 second, 2 seconds, and 2 seconds) in the bucket 581, three values (i.e., 25 seconds, 15 seconds, and 30 seconds) in the bucket 582, and two values (i.e., 45 seconds and 90 seconds) in the bucket 583. In this manner, numerical data collected by the security system may be quantized to reduce a number of possible values for a particular attribute, for example, from thousands or more of possible values (3600 seconds, assuming time is recorded up to one hour) to three possible values (three ranges). This may allow the security system to analyze the collected data more efficiently. However, it should be appreciated that aspects of the present disclosure are not limited to the use of any particular quantization technique, or any quantization technique at all.

Figure 7B:
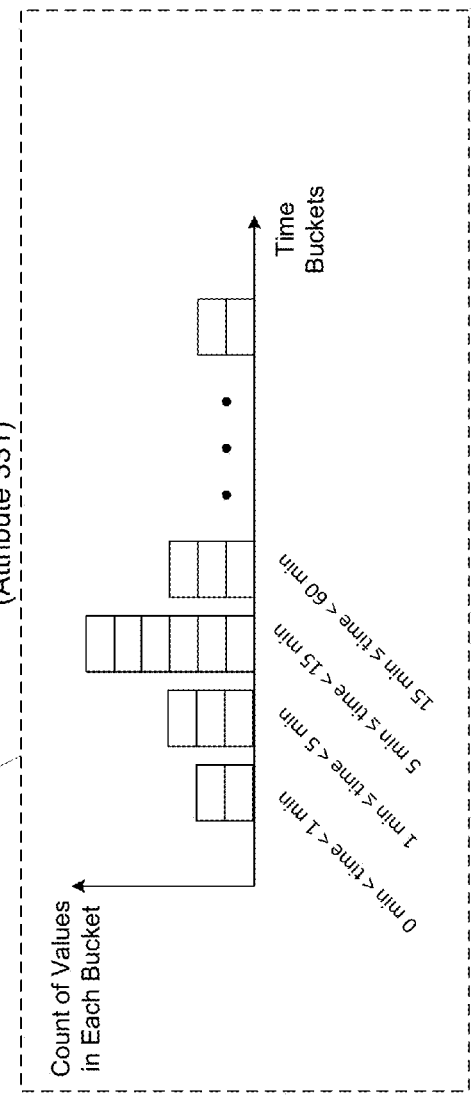
FIG. 7B shows an illustrative histogram 720 representing a distribution of attribute values among a plurality of buckets, in accordance with some embodiments.
Figure 7A:
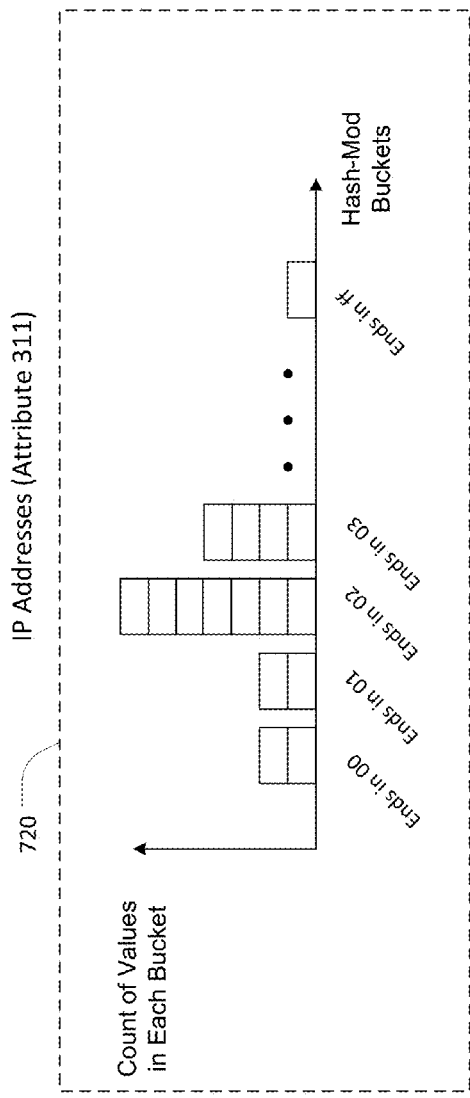
FIG. 7A shows an illustrative histogram 700 representing a distribution of numerical attribute values among a plurality of buckets, in accordance with some embodiments.

FIG. 7A shows an illustrative histogram 700 representing a distribution of numerical attribute values among a plurality of buckets, in accordance with some embodiments. For instance, the histogram 700 may represent a result of dividing a plurality of time attribute values into a plurality of ranges, as discussed in connection with act 415 of FIG. 4. The time attribute values may be values of the illustrative attribute 331 (time from product view to checkout) shown in FIG. 3.

In the example of FIG. 7A, the histogram 700 includes a plurality of bars, where each bar may correspond to a bucket, and each bucket may correspond to a range of time attribute values. The height of each bar may represent a count of values that fall into the corresponding bucket. For instance, the count for the second bucket (between 1 and 5 minutes) may higher than the count for the first bucket (between 0 and 1 minute), while the count for the third bucket (between 5 and 15 minutes) may be the highest, indicating that a delay between product view and checkout most frequently falls between 5 and 15 minutes.

In some embodiments, a number M of buckets may be selected to provide an appropriate resolution to analyze measured values for an attribute, while managing storage requirement. For instance, more buckets may provide higher resolution, but more counters may be stored. Moreover, the buckets may correspond to ranges of uniform length, or variable lengths. For instance, in some embodiments, smaller ranges may be used where attribute values tend to cluster (e.g., smaller ranges below 15 minutes), and/or larger ranges may be used where attribute values tend to be sparsely distributed (e.g., larger ranges above 15 minutes). As an example, if a bucket has too many values (e.g., above a selected threshold number), the bucket may be divided into two or more smaller buckets. As another example, if a bucket has too few values (e.g., below a selected threshold number), the bucket may be merged with one or more adjacent buckets. In this manner, useful information about distribution of the attribute values may be made available, without storing too many counters.

Figure 6:
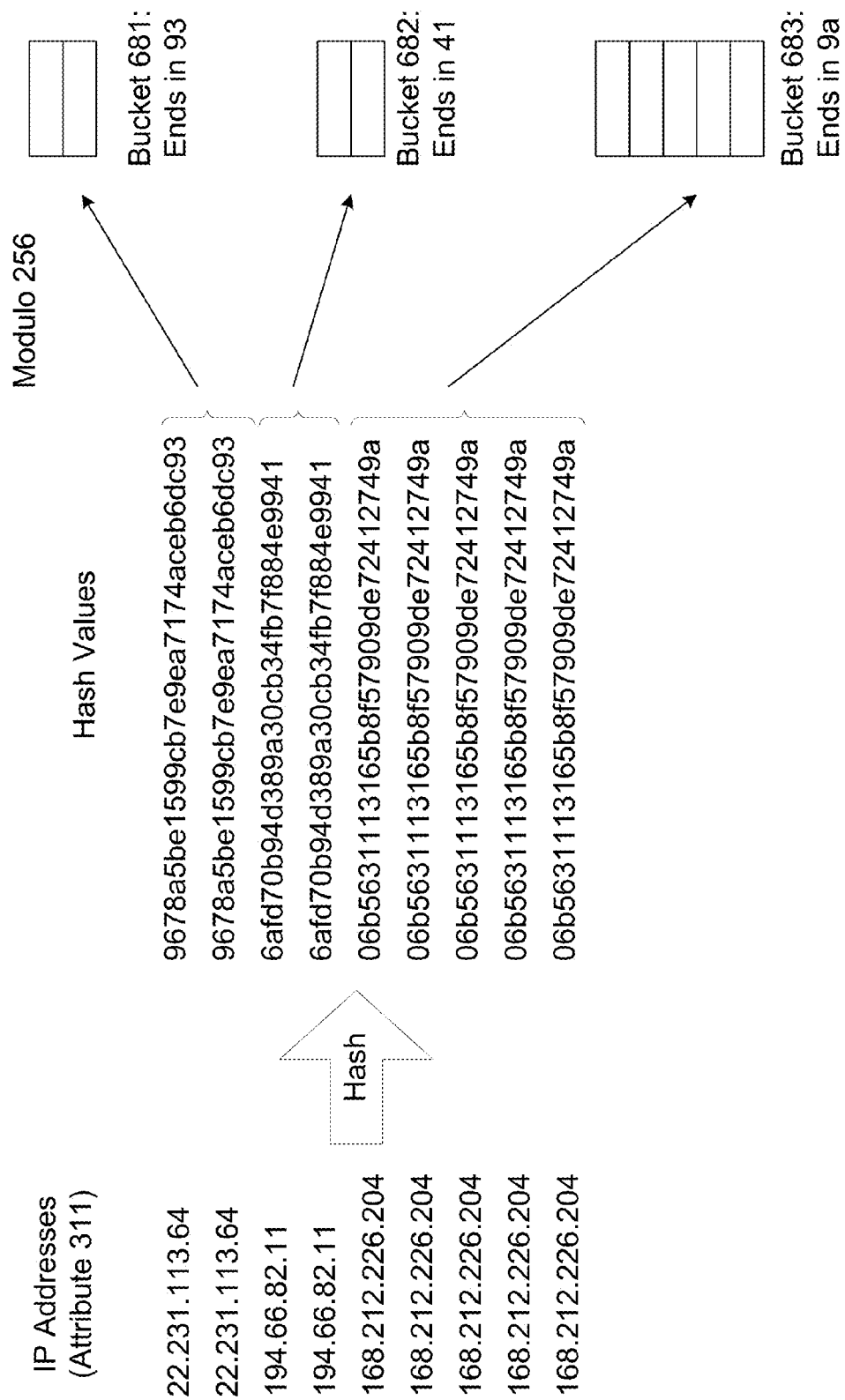
FIG. 6 shows an illustrative hash-modding technique for dividing numerical and/or non-numerical attribute values into buckets, in accordance with some embodiments.

FIG. 6 shows an illustrative hash-modding technique for dividing numerical and/or non-numerical attribute values into buckets, in accordance with some embodiments. For instance, the illustrative technique shown in FIG. 6 may be used by a security system to divide values of the illustrative attribute 311 (IP addresses) shown in FIG. 3 into a plurality of buckets.

In some embodiments, a hash-modding technique may involve hashing an input value and performing a modulo operation on the resulting hash value. In the example is shown in FIG. 6, nine digital interactions are monitored, and nine values of the attribute 311 (IP address) are obtained. These nine IP addresses may be hashed to produce nine hash values, respectively. The following values may result from extracting two least significant digits from each hash value: 93, 93, 41, 41, 9a, 9a, 9a, 9a, 9a. This extraction process may be equivalent to performing a modulo operation (i.e., mod 256) on the hash values.

In some embodiments, each residue of the modulo operation may correspond to a bucket of attribute values. For instance, in the example shown in FIG. 6, the residues 93, 41, and 9a correspond, respectively, to buckets 681-683. As a result, there may be two attribute values in each of the bucket 681 and the bucket 682, and five attribute values in the bucket 683.

FIG. 7B shows an illustrative histogram 720 representing a distribution of attribute values among a plurality of buckets, in accordance with some embodiments. For instance, the histogram 720 may represent a result of dividing a plurality of attribute values into a plurality of buckets, as discussed in connection with act 415 of FIG. 4. The attribute values may be values of the illustrative attribute 311 (IP addresses) shown in FIG. 3. Each attribute value may be converted into a hash value, and a modulo operation may be applied to map each hash value to a residue, as discussed in connection with FIG. 6.

In the example of FIG. 7B, the histogram 720 includes a plurality of bars, where each bar may correspond to a bucket, and each bucket may correspond to a residue of the modulo operation. The height of each bar may represent a count of values that fall into the corresponding bucket. For instance, the count for the third bucket (residue "02") is higher than the count for the first bucket (residue "00") and the count for the second bucket (residue "01"), indicating that one or more IP addresses that hash-mod to "02" are frequently observed.

In some embodiments, a modulus M of the modulo operation (which determines how many buckets there are) may be selected to provide an appropriate resolution to analyze measured values for an attribute, while managing storage requirement. For instance, more buckets may provide higher resolution, but more counters may be stored. Moreover, in some embodiments, buckets may be further divided and/or merged. As one example, if a bucket has too many values (e.g., above a selected threshold number), the bucket may be divided into smaller buckets. For instance, the bucket for hash values ending in "00" may be divided into 16 buckets for hash values ending, respectively, in "000,"

"100," . . . , "f00"), or into two buckets, the first for hash values ending in "000," "100," . . . , or "700," the second for hash values ending in "800," "900," . . . , or "f00." As another example, if a bucket has too few values (e.g., below a selected threshold number), the bucket may be merged with one or more other buckets. In this manner, useful information about distribution of the attribute values may be made available, without storing too many counters.

Returning to the example of FIG. 4, the security system may, at act 420, compare the count determined in act 415 against historical information. In some embodiments, the historical information may include an expected count for the same bucket, and the security system may compare the count determined in act 415 against the expected count.

The determination at act 415 and the comparison at act 420 may be performed for any number of one or more buckets. For instance, in some embodiments, a histogram obtained at act 415 (e.g., the illustrative histogram 720 shown in FIG. 7B) may be compared against an expected histogram obtained from historical information.

FIG. 8A shows an illustrative expected histogram 820 representing a distribution of attribute values among a plurality of buckets, in accordance with some embodiments. The expected histogram 820 may be calculated in similar manner as the illustrative histogram 720 of FIG. 7B, except that attribute values used to calculate the expected histogram 820 may be obtained from a plurality of past digital interactions, such as digital interactions from a past period of time during which there is no known attack (or no known large-scale attack) on one or more relevant web site. Thus, the expected histogram 820 may represent an acceptable pattern.

Figure 9:
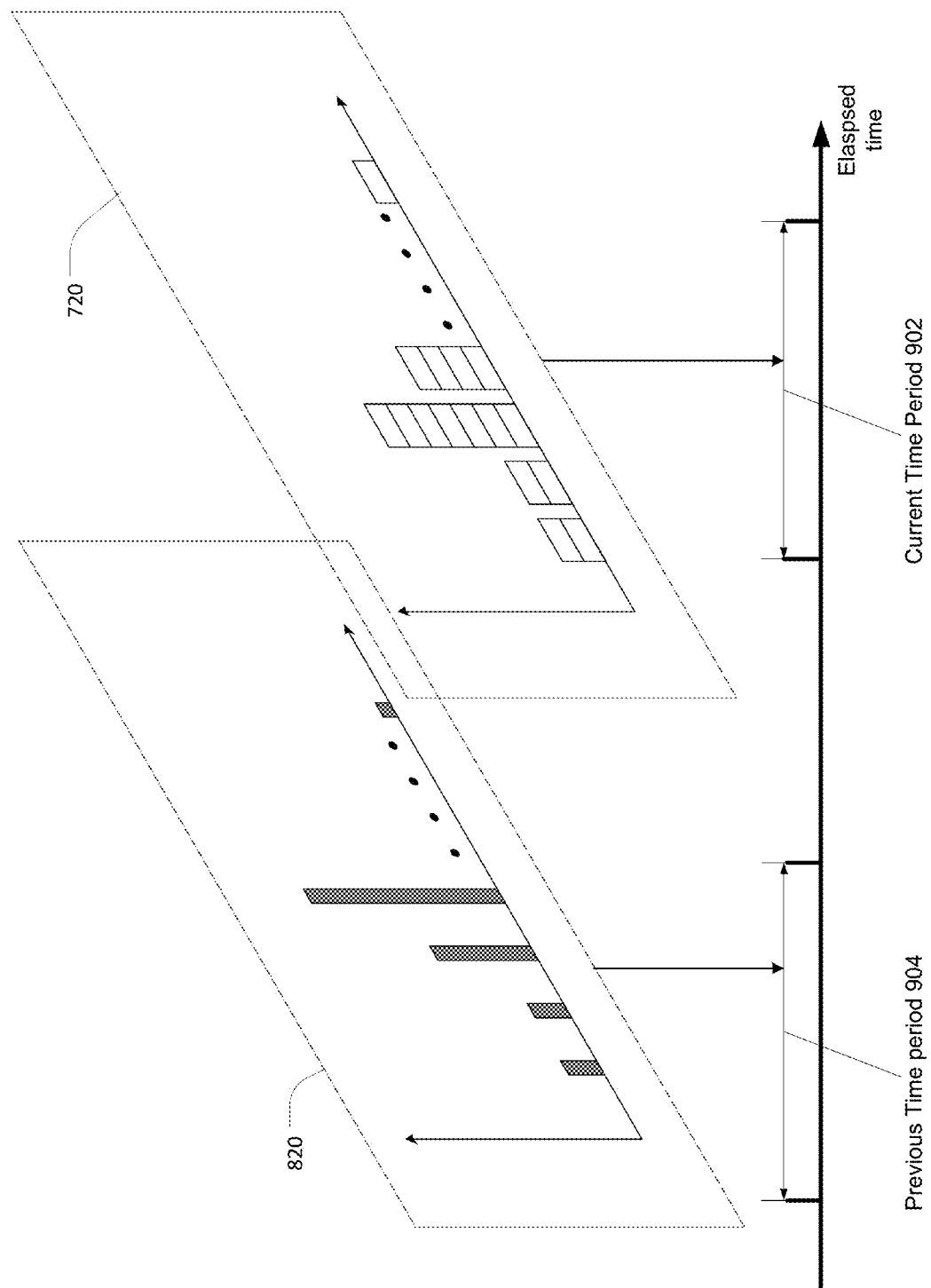
FIG. 9 shows illustrative time periods 902 and 904, in accordance with some embodiments.

FIG. 8B shows a comparison between the illustrative histogram 720 of FIG. 7B and the illustrative expected histogram 820 of FIG. 8A, in accordance with some embodiments. FIG. 9 shows illustrative time periods 902 and 904, in accordance with some embodiments. For instance, attribute values that are used to calculate the illustrative histogram 720 of FIG. 7B may be obtained from digital interactions taking place during the time period 902, whereas attribute values that are used to calculate the illustrative expected histogram 820 of FIG. 8A may be obtained from digital interactions taking place during the time period 904. In some embodiments, the security system may perform anomaly detection processing on a rolling basis. Whenever anomaly detection processing is performed, the time period 902 may be near a current time, whereas the time period 904 may be in the past.

In some embodiments, the time periods 902 and 904 may have a same length (e.g., 30 minutes, one hour, 90 minutes, 2 hours, etc.), and/or at a same time of day, so that the comparison between the histogram 720 and the expected histogram 820 may be more meaningful. In some embodiments, multiple comparisons may be made using different expected histograms, such as expected histograms for a time period of a same length from an hour ago, two hours ago, etc., and/or a same time period from a day ago, a week ago, a month ago, a year ago, etc. For instance, if a significant deviation is detected between the histogram 720 and an expected histogram (e.g., a day ago), the security system may compare the histogram 720 against an expected histogram that is further back in time (e.g., a week ago, a month ago, a year ago, etc.). This may allow the security system to take into account cyclical patterns (e.g., higher traffic volume on Saturdays, before Christmas, etc.)

Returning to the example of FIG. 4, the security system may, at act 425, determine if the there is any anomaly associated with the attribute in question (e.g., time from product view to checkout, IP address, etc.). For instance, with reference to FIG. 8A, the third bar (residue "02") in the histogram 720 may exceed the third bar in the expected histogram 820 by a significant amount (e.g., more than a selected threshold amount). Thus, the security system may infer a possible attack from an IP address that hash-mods into "02." The security system may store the attribute (e.g., IP address) and the particular bucket exhibiting an anomaly (e.g., residue "02") in a fuzzy profile. As discussed in connection with FIG. 14, incoming digital interactions may be analyzed against the fuzzy profile, and one or more security measures may be imposed on matching digital interactions (e.g., digital interactions involving IP addresses that hash-mod into "02"). For example, one or more security probes may be deployed to investigate the matching digital interactions.

The inventors have recognized and appreciated that the illustrative techniques discussed in connection with FIG. 4 may provide flexibility in anomaly detection. For instance, the expected histogram 820 may be customized for a web site, by using only digital interactions taking place on that web site. Moreover, expected histograms may evolve over time. For instance, on any given day, the security system may use digital interactions from the day before (or a week ago, a month ago, a year ago, etc.) to calculate an expected histogram. In this manner, expected histograms may follow trends on the web site and remain up-to-date.

The inventors have recognized and appreciated that the illustrative techniques discussed in connection with FIG. 4 may facilitate detection of unknown anomalies. As one example, an unexpected increase in traffic from a few IP addresses may be an indication of coordinated attack from computer resources controlled by an attacker. As another example, an unexpected spike in a product SKU being ordered from a web site may be an indication of a potential pricing mistake and resellers ordering large quantities for that particular product SKU. A security system that merely looks for known anomalous patterns may not be able to detect such emergent anomalies.

Although details of implementation are shown in FIGS. 4-9 and discussed above, it should be appreciated that aspects of the present disclosure are not limited to such details. For instance, in some embodiments, the security system may compute a normalized count for a bucket, which may be a ratio between a count for the individual bucket and a total count among all buckets. The normalized count may then be compared against an expected normalized count, in addition to, or instead of, comparing the count against an expected count as described in connection with FIG. 8B.

The inventors have recognized and appreciated that normalization may be used advantageously to reduce false positives. For instance, during traditional holiday shopping seasons, or during an advertised sales special, there may be an increase of shopping web site visits and checkout activities. Such an increase may lead to an increase of absolute counts across multiple buckets. A comparison between a current absolute count for an individual bucket and an expected absolute count (e.g., an absolute count for that bucket observed a week ago) may show that the current absolute count exceeds the expected absolute count by more than a threshold amount, which may lead to a false positive identification of anomaly. By contrast, a comparison between a current normalized count and an expected normalized count may remain reliable despite an across-the-board increase in activities.

Figure 10:
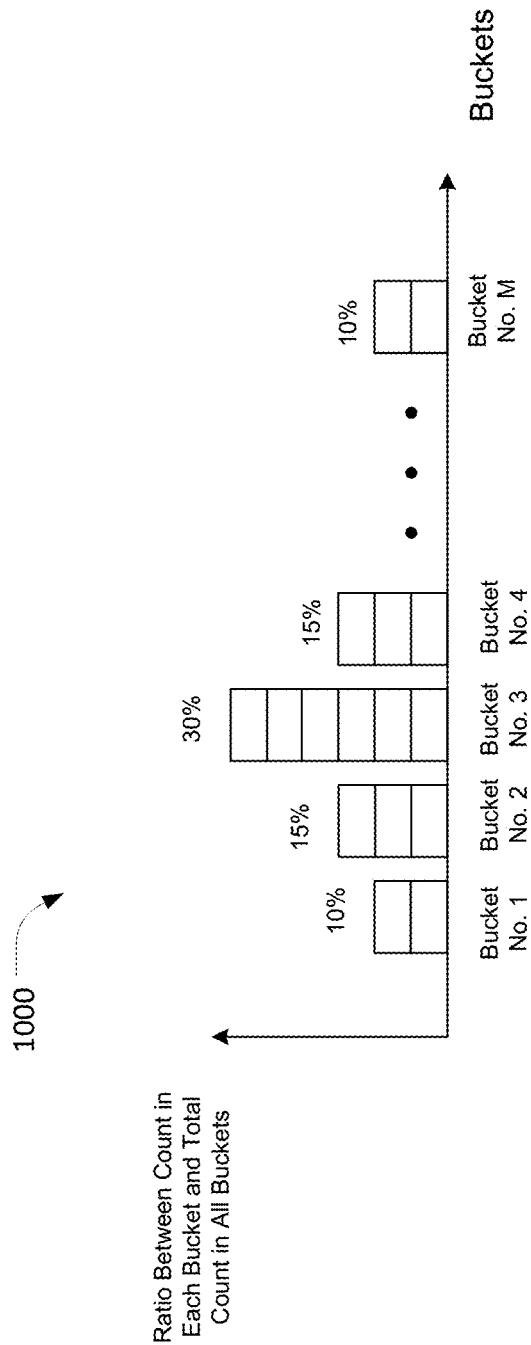
FIG. 10 shows an illustrative normalized histogram 1000, in accordance with some embodiments.

FIG. 10 shows an illustrative normalized histogram 1000, in accordance with some embodiments. In this example, each bar in the histogram 1000 corresponds to a bucket, and a height of the bar corresponds to a normalized count obtained by dividing an absolute count for the bucket by a sum of counts from all buckets. For instance, the first bucket may account for 10% of all digital interactions, the second bucket 15%, the third bucket 30%, the fourth bucket 15%, etc.

In some embodiments, a normalized histogram may be used at acts 415-420 of the illustrative process 400 of FIG. 4, instead of, or in addition to, a histogram with absolute counts. For instance, with increased sales activities during a holiday shopping season, an absolute count in a bucket may increase significantly from a week or a month ago, but a normalized count may remain roughly the same. If, on the other hand, an attack is taking place via digital interactions originating from a small number of IP addresses, a bucket to which one or more of the malicious IP addresses are mapped (e.g., via hash-modding) may account for an increased percentage of all digital interactions.

The inventors have recognized and appreciated that it may be beneficial to examine how histograms for an attribute evolve over time. For instance, more digital interactions may be expected from a certain time zone during daytime for that time zone, and a deviation from that pattern may indicate an anomaly. Accordingly, in some embodiments, an array of histograms may be built, where each histogram may correspond to a separate window of time.

Figure 11:
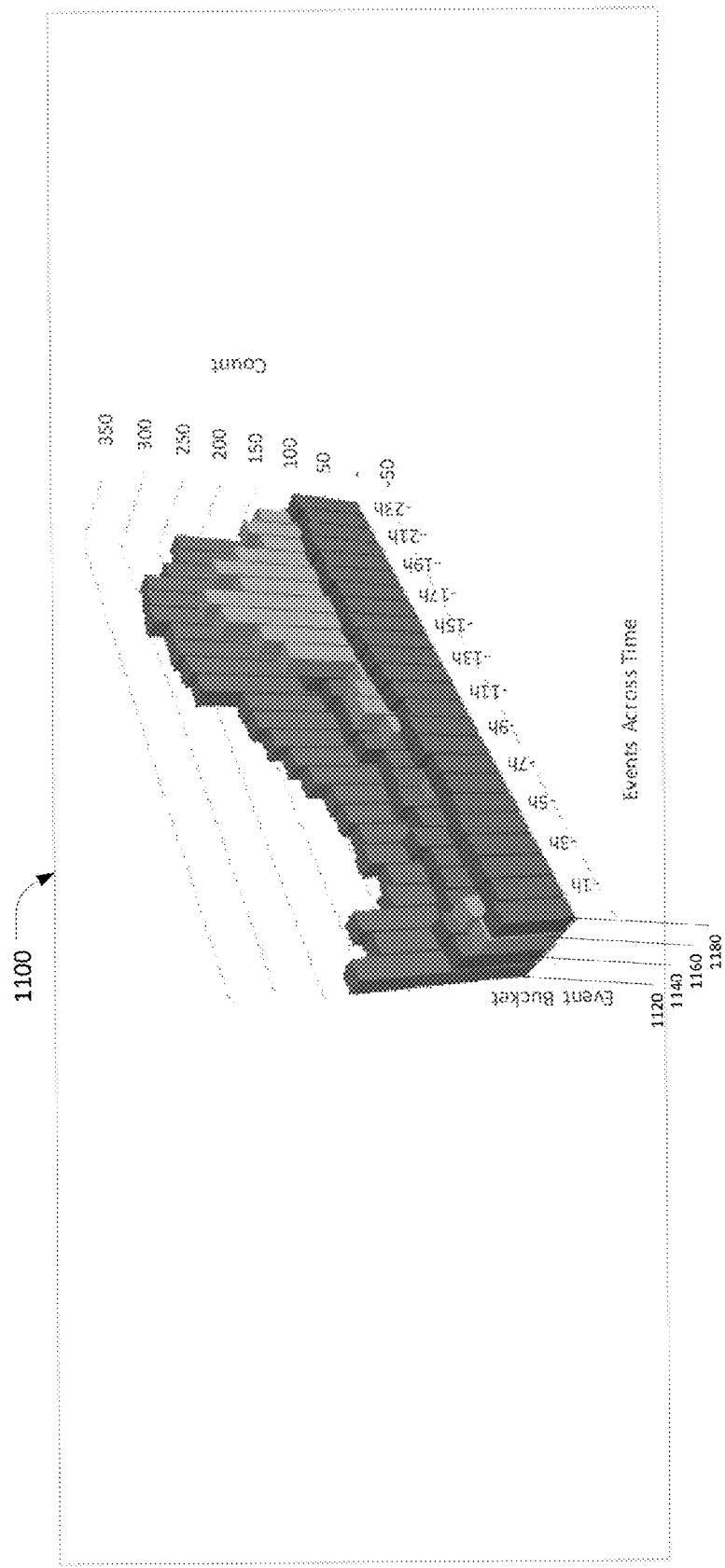
FIG. 11 shows an illustrative array 1100 of histograms over time, in accordance with some embodiments.

FIG. 11 shows an illustrative array 1100 of histograms over time, in accordance with some embodiments. In this example, the array 1100 includes 24 histograms, each corresponding to a one-hour window. For instance, there may be a histogram for a current time, a histogram for one hour prior, a histogram for two hours prior, etc. These histograms may show statistics for a same attribute, such as IP address.

In the example shown in FIG. 11, there are four buckets for the attribute. For instance, the attribute may be IP address, and an IP address may be mapped to one of the four buckets based on a time zone associated with the IP address. For instance, buckets 1120, 1140, 1160, and 1180 may correspond, respectively, to Eastern, Central, Mountain, and Pacific.

The illustrative array 1100 shows peak activity levels in the bucket 1120 at hour markers -18, -19, and -20, which may be morning hours for the Eastern time zone. The illustrative array 1100 also shows peak activity levels in the bucket 1160 at hours markers -16, -17, and -19, which may be morning hours for the Mountain time zone. These may be considered normal patterns. Although not shown, a pike of activities at nighttime may indicate an anomaly.

Although a particular time resolution (i.e., 24 one-hour windows) is used in the example of FIG. 11, it should be appreciated that aspects of the present disclosure are not limited to any particular time resolution. One or more other time resolutions may be used additionally, or alternatively, such as 12 five-minute windows, seven one-day windows, 14 one-day windows, four one-week windows, etc. Furthermore, aspects of the present disclosure are not limited to the use of an array of histograms.

The inventors have recognized and appreciated that digital interactions associated with an attack may exhibit anomaly in multiple attributes. Accordingly, in some embodiments, a profile may be generated with a plurality of attributes to increase accuracy and/or efficiency of anomaly detection. For instance, a plurality of attributes may be monitored, and the illustrative process 400 of FIG. 4 may be performed for each attribute to determine if that attribute is anomalous (e.g., by building a histogram, or an array of histograms as discussed in connection with FIG. 11). In this manner, risk assessment may be performed in multiple dimensions, which may improve accuracy.

In some embodiments, one or more attributes may be selected so that a detected anomaly in any of the one or more attributes may be highly indicative of an attack. However, the inventors have recognized and appreciated that, while anomalies in some attributes may be highly indicative of attacks, such anomalies may rarely occur, so that it may not be worthwhile to expend time and resources (e.g., storage, processor cycles, etc.) to monitor those attributes. Accordingly, in some embodiments, an attribute may be selected only if anomalies in that attribute are observed frequently in known attacks (e.g., in higher than a selected threshold percentage of attacks).

The inventors have further recognized and appreciated that anomalies in one attribute may be correlated with anomalies in another attribute. For instance, there may be a strong correlation between time zone and language, so that an observation of an anomalous time zone value may not provide a lot of additional information if a corresponding language value is already known to be anomalous, or vice versa. Accordingly, in some embodiments, the plurality of attributes may be selected to be pairwise independent.

Figure 12:
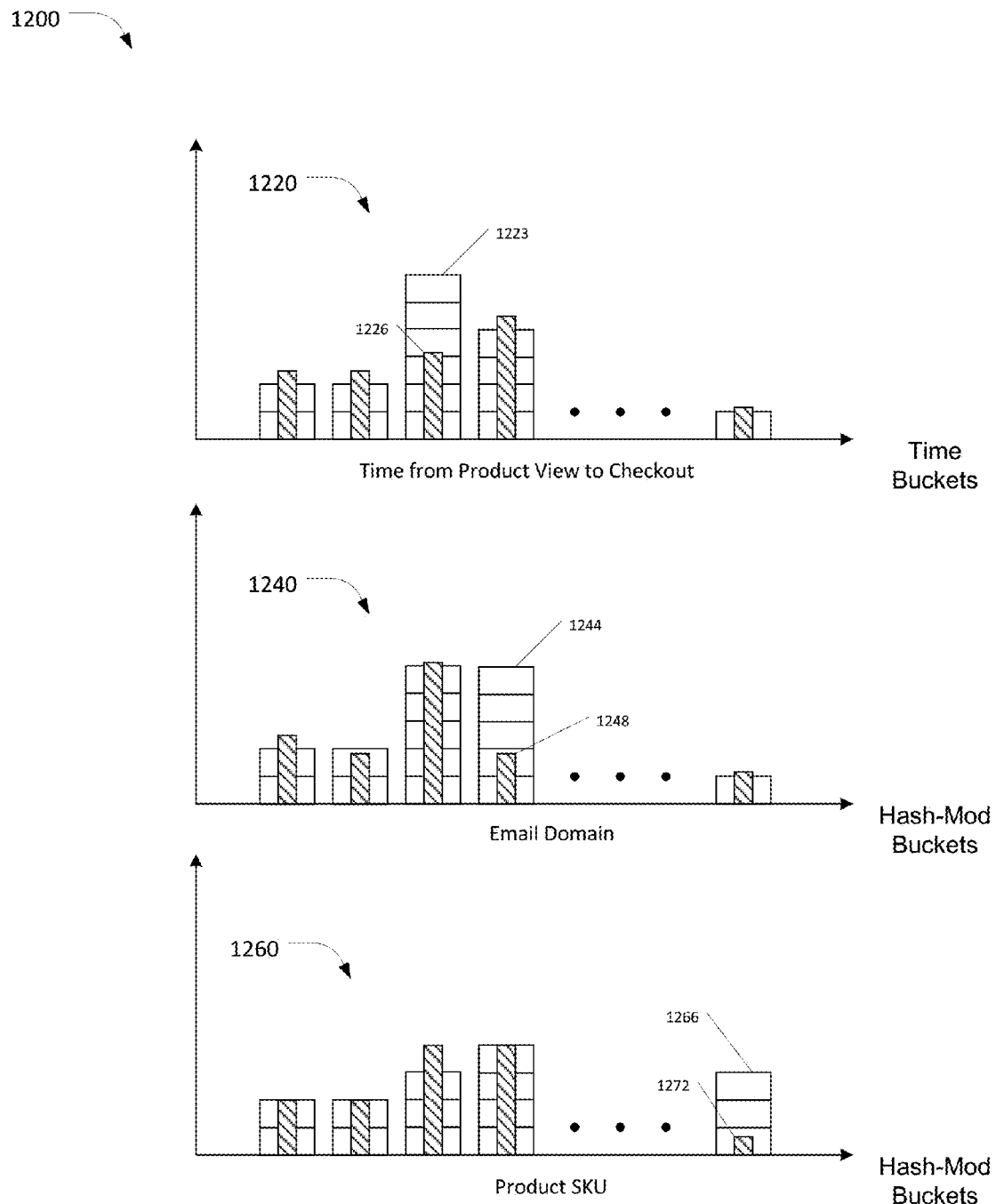
FIG. 12 shows an illustrative profile 1200 with multiple anomalous attributes, in accordance with some embodiments.

FIG. 12 shows an illustrative profile 1200 with multiple anomalous attributes, in accordance with some embodiments. In this example, the illustrative profile includes at least three attributes—time from product view to checkout, email domain, and product SKU. Three illustrative histograms 1220, 1240, and 1260 may be built for these attributes, respectively. For instance, each of the histograms 1220, 1240, and 1260 may be built based on recent digital interactions at a relevant web site, using one or more of the techniques described in connection with FIGS. 4-7B.

In the example of FIG. 12, the histograms 1220, 1240, and 1260 are compared against three expected histograms, respectively. In some embodiments, an expected histogram may be calculated based on historical data. As one example, each bar in an expected histogram may be calculated as a moving average over some length of time. As another example, an expected histogram may be a histogram calculated from digital interactions that took place in a past period of time, for instance, as discussed in connection with FIGS. 8A-9.

In the example of FIG. 12, each of the histograms 1220, 1240, and 1260 has an anomalous value. For instance, the third bucket for the histogram 1220 may show a count 1223 that is substantially higher (e.g., more than a threshold amount higher) than an expected count 1226 in the corresponding expected histogram, the fourth bucket for the histogram 1240 may show a count 1244 that is substantially higher (e.g., more than a threshold amount higher) than an expected count 1248 in the corresponding expected histogram, and the last bucket for the histogram 1260 shows a count 1266 that is substantially higher (e.g., more than a threshold amount higher) than an expected count 1272 in the corresponding expected histogram. In some embodiments, different thresholds may be used to determine anomaly for different attributes, as some attributes may have counts that tend to fluctuate widely over time, while other attributes may have counts that tend to stay relatively stable.

Although a particular combination of attributes is shown in FIG. 12 and described above, it should be appreciated that aspects of the present disclosure are not so limited. Any suitable one or more attributes may be used in a fuzzy profile for anomaly detection.

The inventors have recognized and appreciated that when information is collected from a digital interaction, not all of the collected information may be useful for anomaly detection. For instance, if a particular operating system has a certain vulnerability that is exploited in an attack, and the vulnerability exists in all versions of the operating system, a stronger anomalous pattern may emerge if all digital interactions involving that operating system are analyzed together, regardless of version number. If, by contrast, digital interactions are stratified by version number, each version number may deviate from a respective expected pattern only moderately, which may make the attack more difficult to detect.

Accordingly, in some embodiments, an entropy reduction operation may be performed on an observation from a digital interaction to remove information that may not be relevant for assessing a level of risk associated with the digital interaction. In this manner, less information may be processed, which may reduce storage requirement and/or improve response time of a security system.

Figure 13:
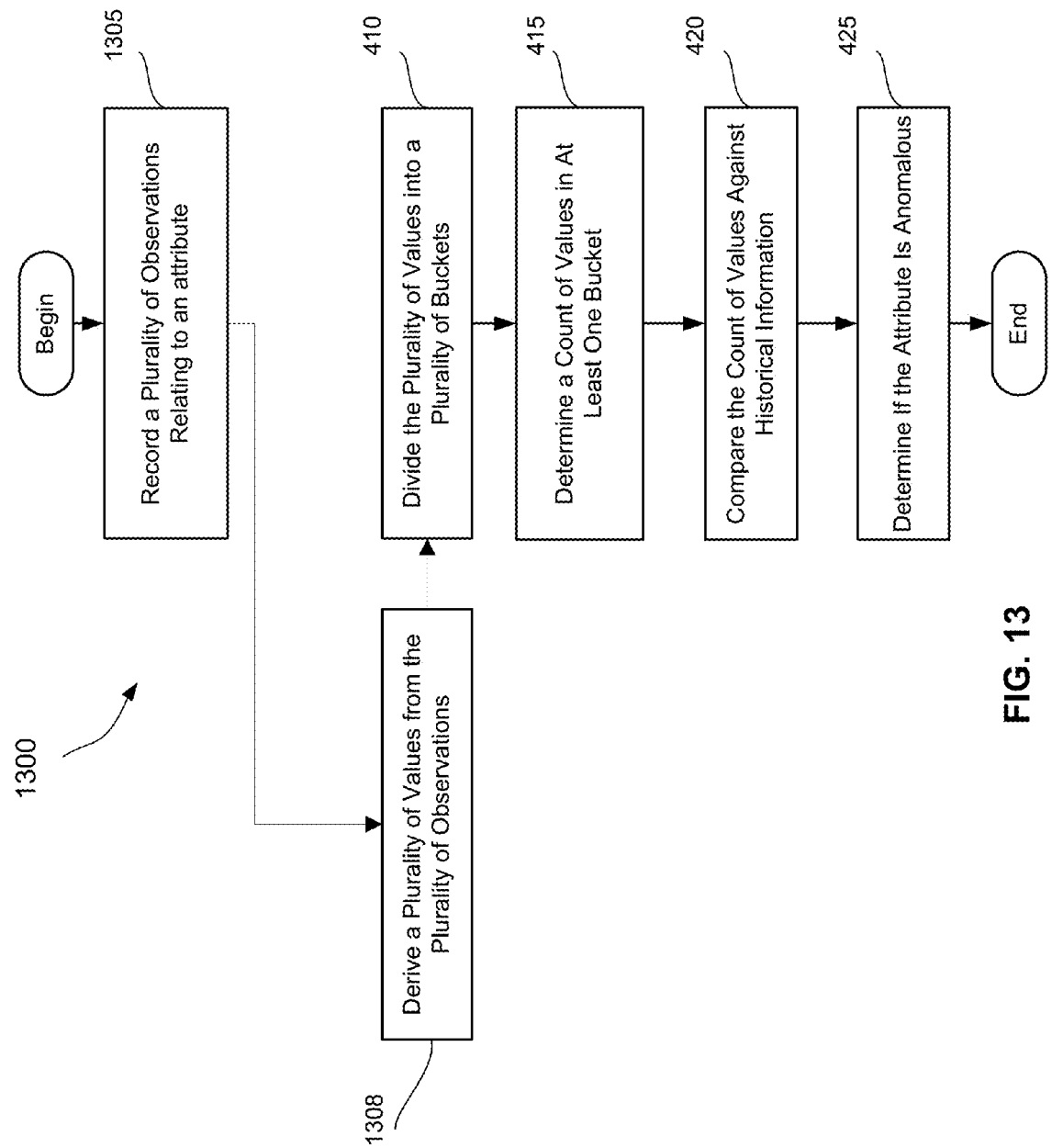
FIG. 13 shows an illustrative process 1300 for detecting anomalies, in accordance with some embodiments.

FIG. 13 shows an illustrative process 1300 for detecting anomalies, in accordance with some embodiments. Like the illustrative process 400 of FIG. 4, the process 1300 may be performed by a security system (e.g., the illustrative security system 14 shown in FIG. 1B) to monitor digital interactions taking place at a particular web site. The security system may compare what is currently observed against what was observed previously at the same web site to determine whether there is any anomaly.

At act 1305, the security system may record a plurality of observations relating to an attribute. As discussed in connection with FIG. 3, the security system may monitor any suitable attribute, such as an anchor type (e.g., network address, email address, account identifier, etc.), a transaction attribute (e.g., product SKU, number of items in shopping cart, average value of items purchased, etc.), a timing attribute (e.g., time from product view to checkout, time from adding product to shopping cart to checkout, etc.), etc.

In some embodiments, the security system may record each observation from a respective digital interaction. Instead of dividing the observations into a plurality of buckets, the security system may, at act 1308, perform an entropy reduction operation on each observation, thereby deriving a plurality of attribute values. The plurality of attribute values are then divided into buckets, for instance, as discussed in connection with act 410 of FIG. 4. The remainder of the process 1300 may proceed as described in connection with FIG. 4.

As one example of entropy reduction, two observations relating to user agent may be recorded as follows:
Mozilla/5.0 (Macintosh; Intel Mac OS X 10_11_4) AppleWebKit/537.36 (KHTML, like Gecko) Chrome/52.0.2743.116 Safari/537.36
Mozilla/5.0 (Macintosh; Intel Mac OS X 10_11_6) AppleWebKit/537.36 (KHTML, like Gecko) Chrome/52.0.2743.116 Safari/537.36

The inventors have recognized and appreciated that the operating system Mac OS X may often be associated with attacks, regardless of version number (e.g., 10_11_6 versus 10_11_4). If hash-modded directly, the above strings may land in two different buckets. As a result, an increase in traffic (e.g., 1000 digital interactions per hour) involving the above strings may be split between the two buckets, where each bucket may show a smaller increase (e.g., about 500 digital interactions per hour), and the security system may not be sufficiently confident to flag an anomaly.

Accordingly, in some embodiments, the security system may strip the operating system version numbers from the above strings at act 1308 of the illustrative process 1300 of FIG. 13. Additionally, or alternatively, the Mozilla version numbers "5.0" may be reduced to "5," the AppleWebKit version numbers "537.36" may be reduced to "537," the Chrome version numbers "52.0.2743.116 " may be reduced to "52," and the Safari version numbers "537.36" may be reduced to "537." As a result, both of the above strings may be reduced to a common attribute value:
mozilla5macintoshintelmacosx10applewebkit537khtmllikegeckochrome52safari5

In this manner, digital interactions involving the two original strings may be aggregated into one bucket, which may accentuate anomalies and facilitate detection.

In some embodiments, entropy reduction may be performed incrementally. For instance, the security system may first strip out operating version numbers. If no discernible anomaly emerges, the security system may strip out AppleWebKit version numbers. This may continue until some discernible anomaly emerges, or all version numbers have been stripped out.

As another example of entropy reduction, an observation relating to display size may be recorded as follows:
1024×768, 1440×900

There may be two sets of display dimensions because a computer used for the digital interaction may have two displays. In some embodiments, the security system may sort the display dimensions in some appropriate order (e.g., low to high, or high to low), which may result in the following:
768, 900, 1024, 1440

The inventors have recognized and appreciated that sorting may allow partial matching. However, it should be appreciated that aspects of the present disclosure are not limited to sorting display dimensions.

In some embodiments, the security system may reduce the display dimensions, for example, by dividing the display dimensions by 100 and then rounding (e.g., using a floor or ceiling function). This may result in the following:
8, 9, 10, 14

Thus, small differences in display dimensions may be removed. Such differences may occur due to changes in window sizes. For example, a height of a task bar may change, or the task bar may only be present sometimes. Such changes may be considered unimportant for anomaly detection.

Although the inventors have recognized and appreciated various advantages of entropy reduction, it should be appreciated that aspects of the present disclosure are not limited to any particular entropy reduction technique, or to the use of entropy reduction at all.

Figure 14:
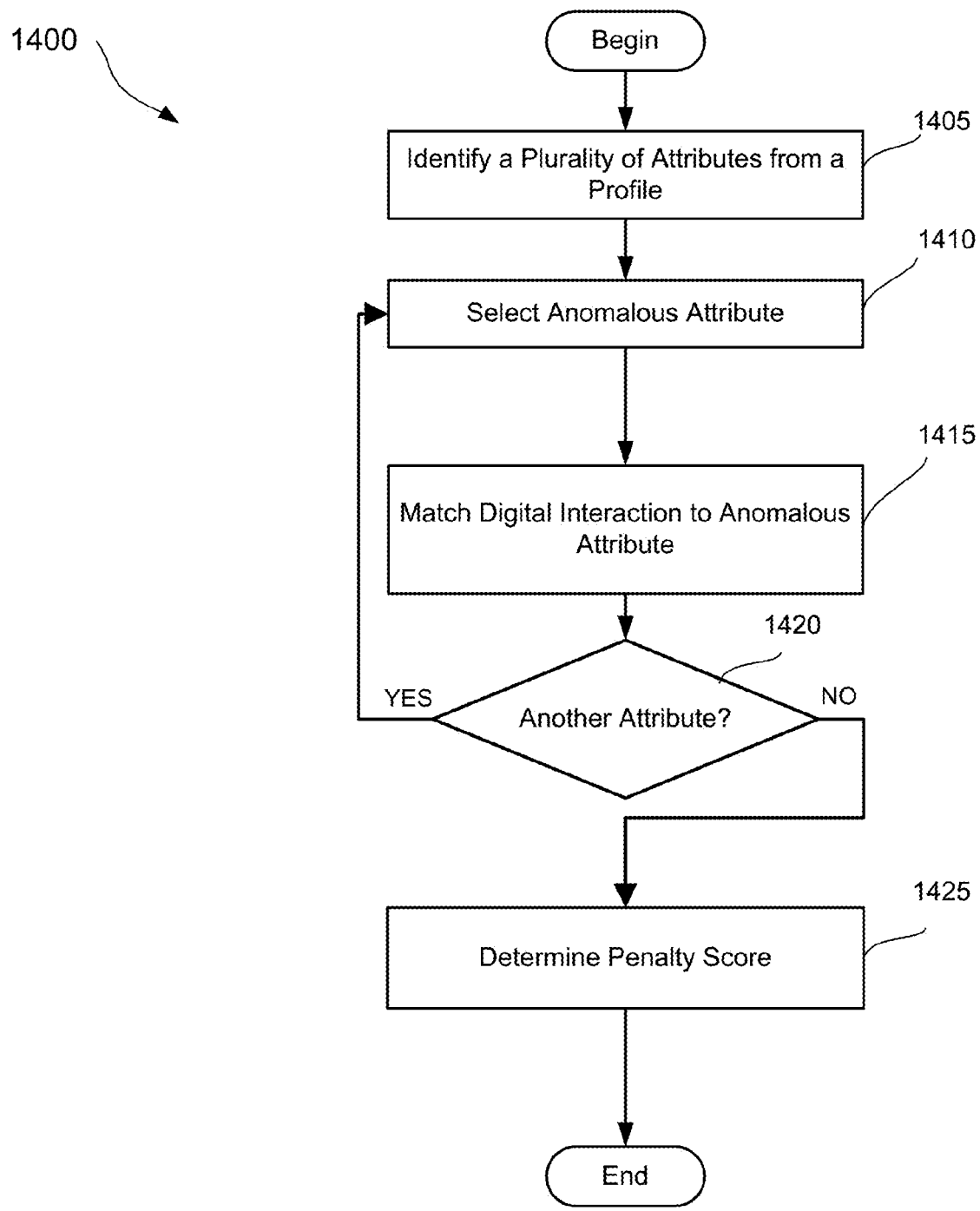
FIG. 14 shows an illustrative process 1400 for matching a digital interaction to a fuzzy profile, in accordance with some embodiments.

FIG. 14 shows an illustrative process 1400 for matching a digital interaction to a fuzzy profile, in accordance with some embodiments. For instance, the process 1400 may be performed by a security system (e.g., the illustrative security system 14 shown in FIG. 1B) to determine if a digital interaction is likely part of an attack.

In the example shown in FIG. 14, the fuzzy profile is built (e.g., using the illustrative process 400 shown in FIG. 4) for detecting illegitimate resellers. For instance, the profile may store one or more attributes that are anomalous. Additionally, or alternatively, the profile may store, for each anomalous attribute, an attribute value that is anomalous, and/or an indication of an extent to which that attribute value deviates from expectation.

In some embodiments, an anomalous attribute may be product SKU, and an anomalous attribute may be a particular hash-mod bucket (e.g., the last bucket in the illustrative histogram 1260 shown in FIG. 12). The profile may store an indication of an extent to which an observed count for that bucket (e.g., the count 1266) deviates from an expected count (e.g., the count 1272). As one example, the profile may store a percentage by which the observed count exceeds the expected count. As another example, the profile may store an amount by which the observed count exceeds the expected count. As another example, the profile may store an indication of a distance between the observed count and the expected count. For instance, the expected count may be an average count for the particular bucket over some period of time, and the expected interval may be defined based on a standard deviation (e.g., one standard deviation away from the average count, two standard deviations away, two standard deviations away, etc.).

Returning to FIG. 14, the security system may, at act 1405, identify a plurality of attributes from the fuzzy profile. In some embodiments, digital interactions with a retailer's web store may be analyzed to distinguish possible resellers from retail customers who purchase goods for their own use. A reseller profile for use in such an analysis may contain attributes such as the following.

Product SKU
Email Domain of purchaser
Browser Type
Web Session Interaction Time

At act 1410, the security system may select an anomalous attribute (e.g., product SKU) and identify one or more values that are anomalous (e.g., one or more hash-mod buckets with anomalously high counts). At act 1415, the security system may determine if the digital interaction that is being analyzed matches the fuzzy profile with respect to the anomalous attribute. For instance, the security system may identify a hash-mod bucket for a product SKU that is being purchased in the digital interaction, and determine whether that hash-mod bucket is among one or more anomalous hash-mod buckets stored in the profile for the product SKU attribute. If there is a match, the security system may so record.

At act 1420, the security system may determine if there is another anomalous attribute to be processed. If so, the security system may return to act 1410. Otherwise, the security system may proceed to act 1425 to calculate a penalty score. The penalty score may be calculated in any suitable manner. In some embodiments, the penalty score is determined on a ratio between a count of anomalous attributes with respect to which the digital interaction matches the profile, and a total count of anomalous attributes. Illustrative code for calculating the penalty score is shown below.

```
PENALTY_MIN    = 100
PENALTY_MAX    = 500
PENALTY        = 0
PARAMETERS = array(sku_histograms, domain_histograms,
browser_histograms, time_histograms)
NUM_MATCH = 0
FOREACH PARAMETERS as PARAM
   IF isAnomalous(PARAM)NUM_MATCH++
// Minimum threshold for anomaly (e.g., two out of four
match) may be set in any suitable way
// If threshold exceeded, linear interpolation between MIN
and MAX
if (NUM_MATCH >= 2)
   RATIO = NUM_MATCH / COUNT(PARAMETERS)
   PENALTY = ((PENALTY_MAX - PENALTY_MIN) * RATIO) +
   PENALTY_MIN
   triggerSignal("RESELLER", PENALTY)
END
```

Additionally, or alternatively, an attribute penalty score may be determined for a matching attribute based on an extent to which an observed count for a matching bucket deviates from an expected count for that bucket. An overall penalty score may then be calculated based on one or more attribute penalty scores (e.g., as a weighted sum).

In this example, a penalty score calculated using a reseller profile may indicate a likelihood that a reseller is involved in a digital interaction. Such a penalty score may be used in any suitable manner. For instance, the web retailer may use the penalty score to decide whether to initiate one or more actions, such as canceling an order already placed by the suspected reseller, suspend the suspected reseller's account, and/or prevent creation of a new account by an entity linked to the suspected reseller's account.

It should be appreciated the reseller profile described above in connection with FIG. 14 is provided merely for purposes of illustration. Aspects of the present disclosure are not limited to monitoring any particular attribute or combination of attributes to identify resellers, nor to the use of a reseller profile at all. In various embodiments, any suitable attribute may be monitored to detect any type of anomaly, in addition to, or instead of, reseller activity.

In some embodiments, one or more past digital interactions may be identified, using any suitable method, as part of an attack. Each such digital interaction may be associated with an anchor value (e.g., IP address, name, account ID, email address, device ID, device fingerprint, user ID, hashed credit card number, etc.), and the anchor value may in turn be associated with a behavior profile. Thus, one or more behavior profiles may be identified as being associated with the attack and may be used to build a fuzzy profile.

In some embodiments, a fuzzy profile may include any suitable combination of one or more attributes, which may, although need not, coincide with one or more attributes of the behavior profiles from which the fuzzy profile is built. For instance, the fuzzy profile may store a range or limit of values for an attribute, where the range or limit may be determined based on values of the attribute stored in the behavior profiles.

Figure 15:
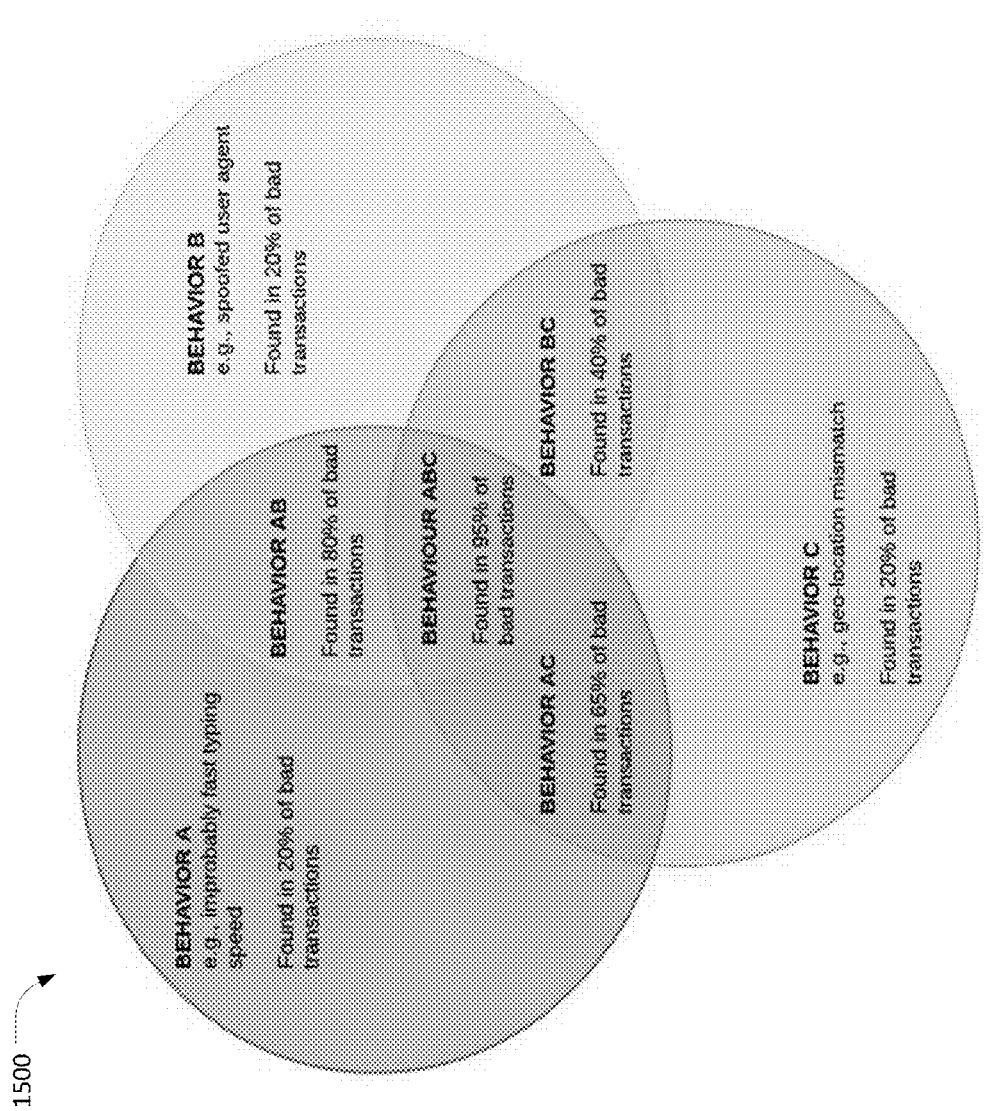
FIG. 15 shows an illustrative fuzzy profile 1500, in accordance with some embodiments.

FIG. 15 shows an illustrative fuzzy profile 1500, in accordance with some embodiments. In this example, three individual behaviors A, B, and C are observed in known malicious digital interactions. For instance, each of the behaviors A, B, and C may be observed in 20% of known malicious digital interactions (although it should be appreciated that behaviors observed at different frequencies may also be analyzed together).

The inventors have recognized and appreciated that although each of the behaviors A, B, and C, individually, may be a poor indicator of whether a digital interaction exhibiting that behavior is part of an attack, certain combinations of the behaviors A, B, and C may provide more reliable indicators. For example, if a digital interaction exhibits both behaviors A and B, there may be a high likelihood (e.g., 80%) that the digital interaction is part of an attack, whereas if a digital interaction exhibits both behaviors B and C, there may be a low likelihood (e.g., 40%) that the digital interaction is part of an attack. Thus, if a digital interaction exhibits behavior B, that the digital interaction also exhibits behavior A may greatly increase the likelihood that the digital interaction is part of an attack, whereas that the digital interaction also exhibits behavior C may increase that likelihood to a lesser extent. It should be appreciated that specific percentages are provided in the example of FIG. 1 merely for purposes of illustration, as other percentages may also be possible.

Figure 16:
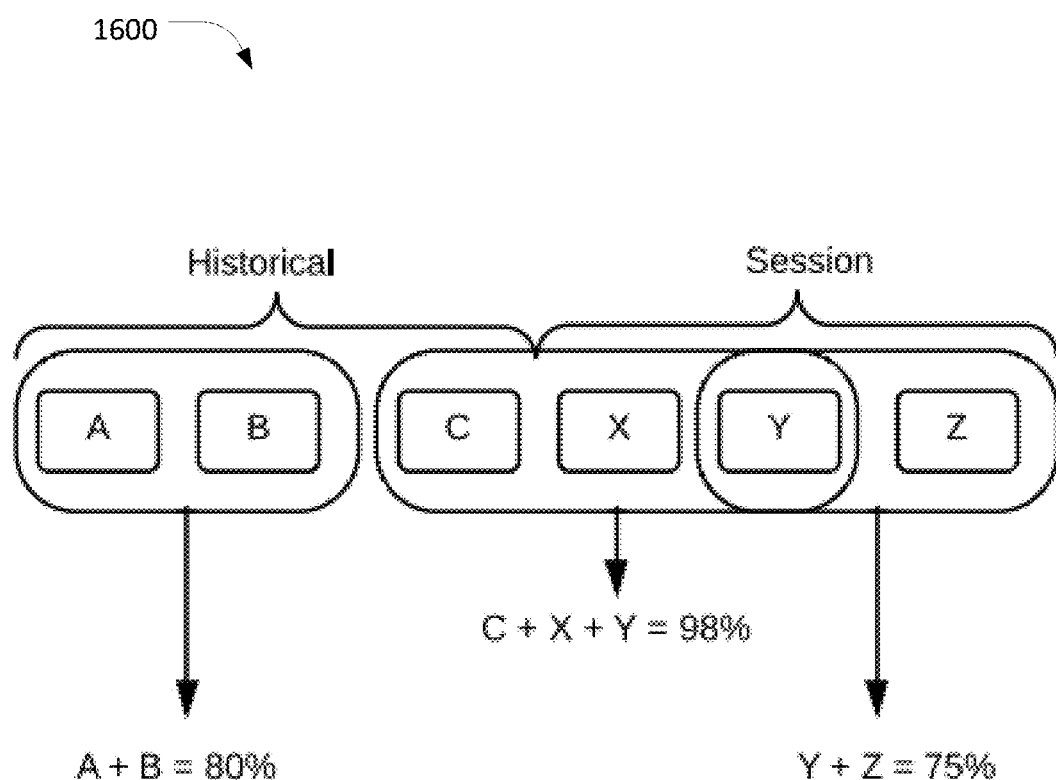
FIG. 16 shows an illustrative fuzzy profile 1600, in accordance with some embodiments.

FIG. 16 shows an illustrative fuzzy profile 1600, in accordance with some embodiments. In this example, the fuzzy profile 1600 includes six individual behaviors A, B, C, X, Y, and Z, where behaviors A, B, and C each include an observed historical pattern, and behaviors X, Y, and Z each include a behavior observed during a current digital interaction. If a digital interaction is associated with an anchor value (e.g., IP address, account ID, etc.) exhibiting both historical patterns A and B, there may be a high likelihood (e.g., 80%) that the digital interaction is part of an attack. As discussed above in connection with FIG. 13, such a likelihood may be determined based on a percentage of malicious digital interactions that are also associated with an anchor value exhibiting both historical patterns A and B.

If a digital interaction is associated with an anchor value (e.g., IP address, account ID, etc.) exhibiting historical patterns C, and if both behaviors X and Y are observed during the current digital interaction, there may be an even higher likelihood (e.g., 98%) that the digital interaction is part of an attack. If, on the other hand, only behaviors Y and Z are observed during the current digital interaction, there may be a lower likelihood (e.g., 75%) likelihood that the digital interaction is part of an attack.

In some embodiments, one or more behaviors observed in a new digital interaction may be checked against a fuzzy profile and a score may be computed that is indicative of a likelihood that the new digital interaction is part of an attack associated with the fuzzy profile. In this manner, an anchor value associated with the new digital interaction may be linked to a known malicious anchor value associated with the fuzzy profile.

The inventors have recognized and appreciated that the use of fuzzy profiles to link anchor values may be advantageous. For instance, fuzzy profiles may capture behavior characteristics that may be more difficult for an attacker to spoof, compared to other types of characteristics such as device characteristics. Moreover, in some embodiments, a fuzzy profile may be used across multiple web sites and/or applications. For example, when an attack occurs against a particular web site or application, a fuzzy profile may be created based on that attack (e.g., to identify linked anchor values) and may be used to detect similar attacks on a different web site or application. However, it should be appreciated that aspects of the present disclosure are not limited to the use of a fuzzy profile, as each of the techniques described herein may be used alone, or in combination with any one or more other techniques described herein.

Some retailers use Stock Keeping Units (SKUs) or other types of identifiers to identify products and/or services sold. This may allow analysis of sales data by product/service, for example, to identify historical purchase trends. In some embodiments, techniques are provided for identifying unexpected sale patterns. Although SKUs are used in some of the examples described herein, it should be appreciated that aspects of the present disclosure are not limited to the use of SKUs, as other types of identifiers for products and/or services may also be used.

The inventors have recognized and appreciated that a SKU may sometimes become incorrectly priced in a retailer's inventory management software. This may be the result of a glitch or bug in the software, or a human error. As one example, a product that normally sells for $1,200.00 may be incorrectly priced at $120.00, which may lead to a sharp increase in the number of purchases of that product. In an automated retail environment, such as e-commerce, the retailer may inadvertently allow transactions to complete and ship goods at a loss. Examples of other problems that may lead to anomalous sales data include, but are not limited to, consumers exploiting unexpected coupon code interactions, consumers violating sale policies (e.g., limit one item per customer at a discounted price), and commercial resellers attempting to take advantage of consumer-only pricing.

Accordingly, in some embodiments, techniques are provided for detecting unexpected sale patterns and notifying retailers so that any underlying problems may be corrected. For example, a security system may be programmed to monitor purchase activity (e.g., per SKU or group of SKUs) and raise an alert when significant deviation from an expected baseline is observed. The security system may use any suitable technique for detecting unexpected sale patterns, including, but not limited, using a fuzzy profile as described herein.

The inventors have recognized and appreciated that some systems only analyze historical sales data (e.g., sale patterns for previous month or year). As a result, retailers may not be able to discover issues such as those discussed above until the damage has been done (e.g., goods shipped and transactions closed). Accordingly, in some embodiments, techniques are provided for analyzing sales data and alerting retailers in real time (e.g., before sending confirmations to consumers, when payments are still being processed, before goods are shipped, before goods are received by consumers, before transactions are marked closed, etc.).

In some embodiments, one or more automated countermeasures may be implemented in response to an alert. For example, a retailer may automatically freeze sales transactions that are in progress, and/or remove a SKU from the website, until an investigation is conducted. Additionally, or alternatively, one or more recommendations may be made to a retailer (e.g., based on profit/loss calculations), so that the retailer may decide to allow or block certain activities depending on projected financial impact.

In some embodiments, data relating to sales activities may be collected and stored in a database. One or more metrics may then be derived from the stored data. Examples of metrics that may be computed for a particular SKU or group of SKUs include, but are not limited to, proportion of transactions including that SKU or group of SKUs (e.g., out of all transactions at a website or group of websites), average number of items of that SKU or group of SKUs purchased in a single transaction or over a certain period of time by a single buyer, etc.

In some embodiments, one or more metrics derived from current sales activities may be compared against historical data. For example, JavaScript code running on a website may monitor one or more sales activities and compare one or more current metrics against historical data. However, it should be appreciated that aspects of the present disclosure are not limited to the use of JavaScript, as any suitable client-side and/or server-side programs written in any suitable language may be used to implement any one or more of the functionalities described herein.

In some embodiments, an alert may be raised if one or more current metrics represent a significant deviation from one or more historically observed baselines. The one or more metrics may be derived in any suitable manner. For instance, in some embodiments, a metric may pertain to all transaction conducted over a web site or group of web sites, or may be specific to a certain anchor value such as a certain IP address or a certain user account. Additionally, or alternatively, a metric may be per SKU or group of SKUs.

As a non-limiting example, an electronics retailer may sell a particular model of television for $1,200.00. Historical sales data may indicate one or more of the following:
- a small percentage (e.g., 1% of) transactions site-wide include this particular model of television;
- a large percentage (e.g., 99%) of transactions including this model of television include only one television;
- on average the retailer sells a moderate number (e.g., 30) of televisions of this model per month;
- an average value of transactions including this model of television is $1,600.00 (or some other value close to the price of this model of television);
- sales of this model of television spike during one or more specific time periods, such as on or around Black Friday or Boxing Day;
- sales of this model of television drop during summer months;
- etc.

In some embodiments, a system may be provided that is programmed to use historical data (e.g., one or more of the observations noted above) as a baseline to intelligently detect notable deviations. For instance, with reference to the television example described above, if the retailer's stock keeping system incorrectly priced the $1,200.00 model of television at $120.00, one or more of the following may be observed:
- the proportion of transactions site-wide including this particular model of television increases sharply (e.g., from 1% to 4%);
- transactions including this model of television suddenly start including multiple televisions;
- the retailer has sold more televisions in the last 24 hours than the retailer does typically in one month;
- the average value of transactions including this model of television drops substantially;
- etc.

In some embodiments, alerts may be triggered based on observations such as those described above. As one example, any one of a designated set of observations may trigger an alert. As another example, a threshold number of observations (e.g., two, three, etc.) from a designated set of observations may trigger an alert. As yet another example, one or more specific combinations of observations may trigger an alert.

In some embodiments, when an alert is raised, a retailer may be notified in real time. In this manner, the retailer may be able to investigate and correct one or more errors that led to the anomalous sales activities, before significant damage is done to the retailer's business.

Although an example is described above relating to mispriced items, it should be appreciated that the techniques described herein may be used in other scenarios as well. For example, one or more of the techniques described herein may be used to detect abuse of sale prices, new customer loss-leader deals, programming errors relating to certain coupon codes, resellers buying out stock, etc. Any of these and/or other anomalies may be detected from a population of transactions.

In some embodiments, an online behavior scoring system may calculate a risk score for an anchor value, where the anchor value may be associated with an entity such as a human user or a bot. The risk score may indicate a perceived likelihood that the associated entity is malicious (e.g., being part of an attack). Risk scores may be calculated using any suitable combination of one or more techniques, including, but not limited to:
- Analyzing traffic volumes over one or more dimensions such as IP, UID stored in a cookie, device fingerprint, etc. Observations may be compared against a baseline, which may be derived from one or more legitimate samples.
- Analyzing historical access patterns. For example, a system may detect a new user ID and device association (e.g., a user logging in from a newly purchased mobile phone). The system may observe a rate at which requests associated with the user ID are received from the new device, and may compare the newly observed rate against a rate at which requests associated with the user ID were received from a previous device. Additionally, or alternatively, the system may observe whether requests are distributed in a similar manner throughout different times of day (e.g., whether more or fewer requests are received at a certain time of day).
- Checking reputation of origins, for example, using honeypots, IP blacklists, and/or TOR lists.
- Using one-time-use tokens to detect replays of old communication.
- Altering forms to detect GUI replay or screen macro agents, for example, by adding or removing fields, altering x/y coordinates of fields, etc.

The inventors have recognized and appreciated that a sophisticated attacker may be able to detect when some of the above-described techniques are deployed, and to react accordingly to avoid appearing suspicious. Accordingly, in some embodiments, techniques are provided for monitoring online behavior in a manner that is transparent to entities being monitored.

In some embodiments, one or more security probes may be deployed dynamically to obtain information regarding an entity. For instance, a security probe may be deploy only when a security system determines that there is sufficient value in doing so (e.g., using an understanding of user behavior). As an example, a security probe may be deployed when a level of suspicion associated with the entity is sufficiently high to warrant an investigation (e.g., when recent activities of an entity represent a significant deviation from an activity pattern observed in the past for that entity). The inventors have recognized and appreciated that by reducing a rate of deployment of security probes for surveillance, it may be more difficult for an attacker to detect the surveillance and/or to discover how the surveillance is conducted. As a result, the attacker may not be able to evade the surveillance effectively.

Figure 17:
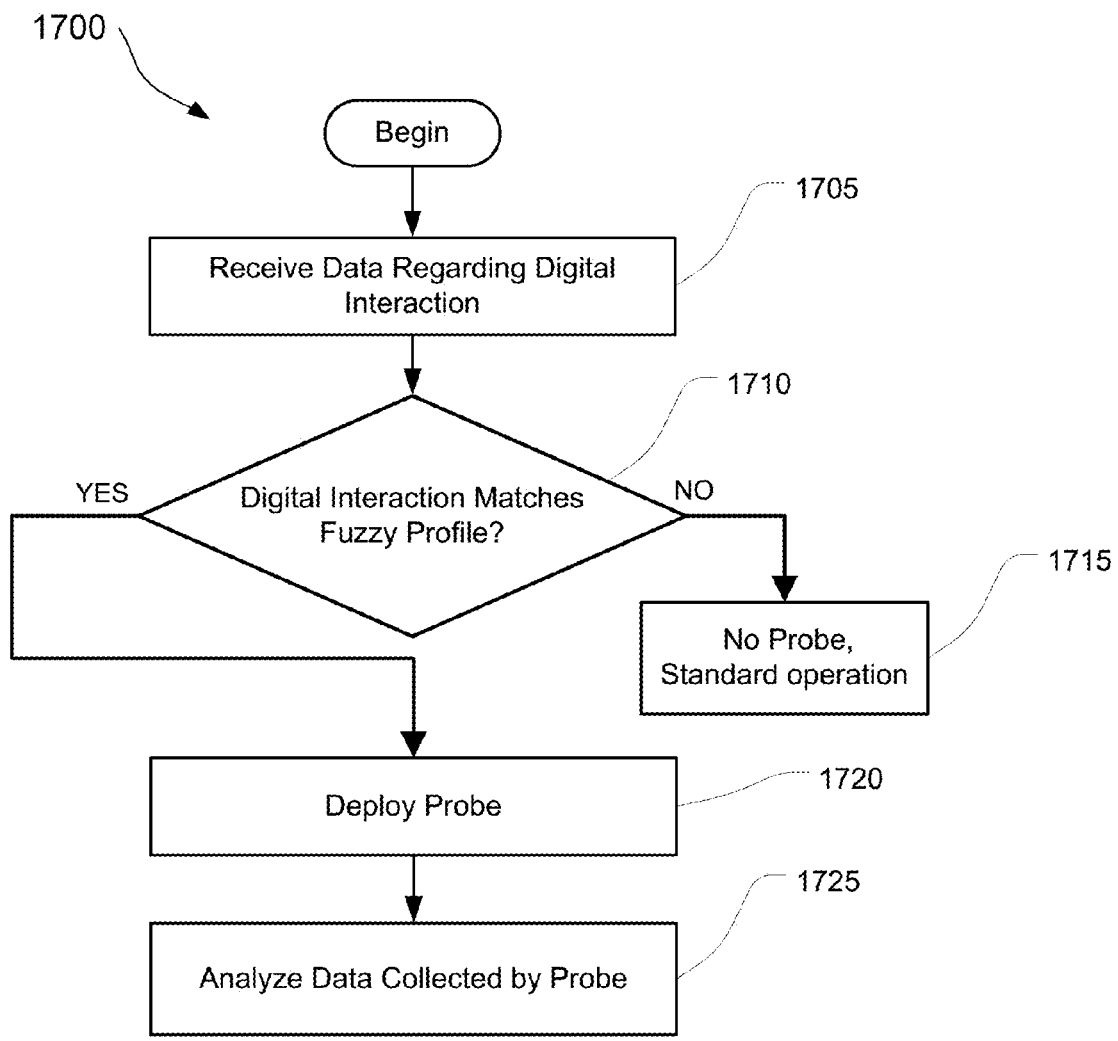
FIG. 17 shows an illustrative process 1700 for dynamic security probe deployment, in accordance with some embodiments.

FIG. 17 shows an illustrative process 1700 for dynamic security probe deployment, in accordance with some embodiments. For instance, the process 1700 may be performed by a security system (e.g., the illustrative security system 14 shown in FIG. 1B) to determine if and when to deploy one or more security probes.

At act 1705, the security system may receive data regarding a digital interaction. For instance, as discussed in connection with FIG. 1B, the security system may receive log files comprising data recorded from digital interactions. The security system may process the received data and store salient information into an appropriate data structure, such as the illustrative data structure 220 shown in FIG. 2B. The stored information may be used, at act 1710, to determine if the digital interaction is suspicious.

Any suitable technique may be used to determine if the digital interaction is suspicious. For instance, the illustrative process 1400 shown in FIG. 14 may be used to determine if the digital interaction matches a fuzzy profile that stores anomalous attributes. If a resulting penalty score is below a selected threshold, the security system may proceed to act 1715 to perform standard operation. Otherwise, the security system may proceed to act 1720 to deploy a security probe, and data collected by the security probe from the digital interaction may be analyzed at act 1725 to determine if further action is appropriate.

The penalty score threshold may be chosen in any suitable manner. For instance, the inventors have recognized and appreciated that, while it may be desirable to collect more data from digital interactions, the security system may have limited resources such as network bandwidth and processing power. Therefore, to conserve resources, security probes should be deployed judiciously. Moreover, the inventors have recognized and appreciated that frequent deployment of probes may allow an attacker to study the probes and learn how to evade detection. Accordingly, in some embodiments, a penalty score threshold may be selected to provide a desired tradeoff.

It should be appreciated that aspects of the present disclosure are not limited to the use of a fuzzy profile to determine if and when to deploy a security probe. Additionally, or alternatively, a profile associated with an anchor value observed from the digital interaction may be used to determine if the digital interaction is sufficiently similar to prior digital interactions from which the anchor value was observed. If it is determined that the digital interaction is not sufficiently similar to prior digital interactions from which the anchor value was observed, one or more security probes may be deployed to gather additional information from the digital interaction.

In some embodiments, a security system may be configured to segment traffic over one or more dimensions, including, but not limited to, IP Address, XFF IP Address, C-Class IP Address, Input Signature, Account ID, Device ID, User Agent, etc. For instance, each digital interaction may be associated with one or more anchor values, where each anchor value may correspond to a dimension for segmentation. This may allow the security system to create segmented lists. As one example, a segmented list may be created that includes all traffic reporting Chrome as the user agent. Additionally, or alternatively, a segmented list may be created that includes all traffic reporting Chrome Version 36.0.1985.125 as the user agent. In this manner, segmented lists may be created at any suitable granularity. As another example, a segmented list may include all traffic reporting Mac OS X 10.9.2 as the operating system. Additionally, or alternatively, a segmented list may be created that includes all traffic reporting Chrome Version 36.0.1985.125 as the user agent and Mac OS X 10.9.2 as the operating system. In this manner, segmented lists may be created with any suitable combination of one or more anchor values.

In some embodiments, one or more metrics may be collected and stored for a segmented list. For instance, a segmented list (e.g., all traffic associated with a particular IP address or block of IP addresses) may be associated with a segment identifier, and one or more metrics collected for that segmented list may be stored in association with the segment identifier. Examples of metrics that may be collected include, but are not limited to, average risk score, minimum risk score, maximum risk score, number of accesses with some window of time (e.g., the last 5 minutes, 10 minutes, 15 minutes, 30 minutes, 45 minutes, hour, 2 hours, 3 hours, 6 hours, 12 hours, 24 hours, day, 2 days, 3 days, 7 days, two weeks, etc.), geographic data, etc.

In some embodiments, a security system may use one or more metrics stored for a segmented list to determine whether a security probe should be deployed. For example, a security probe may be deployed when one or more metrics exceed corresponding thresholds. The security system may select one or more probes based on a number of different factors, such as which one or more metrics have exceeded the corresponding thresholds, by how much the one or more metrics have exceeded the corresponding thresholds, and/or which segmented list is implicated.

Thresholds for metrics may be determined in any suitable manner. For instance, in some embodiments, one or more human analysts may examine historical data (e.g., general population data, data relating to traffic that turned out to be associated with an attack, data relating to traffic that was not identified as being associated with an attack, etc.), and may select the thresholds based on the historical data (e.g., to achieve a desire tradeoff between false positive errors and false negative errors). Additionally, or alternatively, one or more techniques described below in connection with threshold-type sensors may be used to select thresholds automatically.

The inventors have recognized and appreciated that some online behavior scoring systems use client-side checks to collect information. In some instances, such checks are enabled in a client during many interactions, which may give an attacker clear visibility into how the online behavior scoring system works (e.g., what information is collected, what tests are performed, etc.). As a result, an attacker may be able to adapt and evade detection. Accordingly, in some embodiments, techniques are provided for obfuscating client-side functionalities. Used alone or in combination with dynamic probe deployment (which may reduce a number of probes deployed to, for example, one in hundreds of thousands of interactions), client-side functionality obfuscation may reduce a likelihood of malicious entities detecting surveillance and/or discovering how the surveillance is conducted. For instance, client-side functionality obfuscation may make it difficult for a malicious entity to test a probe's behavior in a consistent environment.

Figure 18:
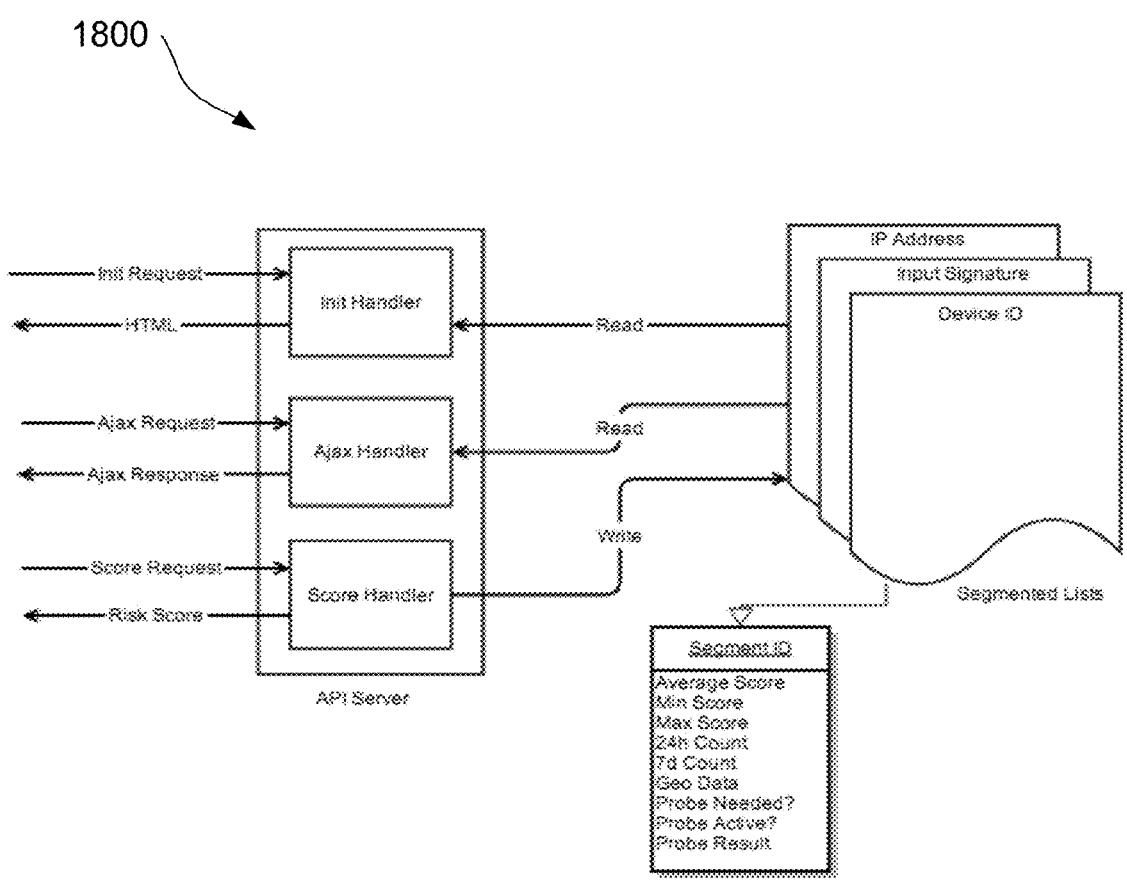
FIG. 18 shows an illustrative cycle 1800 for updating one or more segmented lists, in accordance with some embodiments.

FIG. 18 shows an illustrative cycle 1800 for updating one or more segmented lists, in accordance with some embodiments. In this example, one or more handlers may be programmed to read from a segmented list (e.g., by reading one or more metrics associated with the segmented list) and determine whether and/or how a probe should be deployed. Examples of handlers include, but are not limited to, an initialization handler programmed to handle initialization requests and return HTML code, and/or an Ajax (asynchronous JavaScript and XML) handler programmed to respond to Ajax requests. Additionally, or alternatively, one or more handlers (e.g., a score handler programmed to calculate risk scores) may be programmed to write to a segmented list (e.g., by updating one or more metrics associated with the segmented list, such as average, minimum, and/or maximum risk scores). However, aspects of the present disclosure are not limited to the use of handlers, as other types of programs may also be used to implement any of the functionalities described herein.

In some embodiments, a write to a segmented list may trigger one or more reads from the segmented list. For example, whenever a score handler updates a risk score metric, a cycle may be started and an initialization handler and/or Ajax handler may read one or more segmented lists affected by the update. In this manner, whenever a new event takes place that affects a metric, a fresh determination may be made as to whether to deploy one or more probes.

However, aspects of the present disclosure are not limited to the implementation of such cycles, as in some embodiments a segmented list may be read periodically, regardless of observations from new events.

In some embodiments, a probe may be deployed to one or more selected interactions only, as opposed to all interactions in a segmented list. For example, a probe may be deployed only to one or more suspected members in a segmented list (e.g., a member for which one or more measurements are at or above certain alert levels). Once a result is received from the probe, the result may be stored in association with the member and/or the segmented list, and the probe may not be sent again. In this manner, a probe may be deployed only a limited number of times, which may make it difficult for an attacker to detect what information the probe is collecting, or even the fact that a probe has been deployed. However, it should be appreciated that aspects of the present disclosure are not limited to such targeted deployment of probes, as in some embodiments a probe may be deployed to every interaction, or one or more probes may be deployed in a targeted fashion, while one or more other probes may be deployed to every interaction.

In some embodiments, a probe may use markup (e.g., image tag) already present on a web page to perform one or more functions. For example, any markup that requires a user agent to perform a computational action may be used as a probe. Additionally, or alternatively, a probe may include additional markup, JavaScript, and/or Ajax calls to a server. Some non-limiting examples of probes are described below.

IsRealJavaScript
    One or more JavaScript statements to perform a function may be included on a web page, where a result of executing the function is to be sent back to a server. If the result is not received or is received but not correct, it may be determined that the client is not running a real JavaScript engine.

IsRunningHeadlessBrowser
    A widget may be programmed to request graphics card information, viewport information, and/or window information (e.g. window.innerHeight, document.body.clientWidth, etc.). Additionally, or alternatively, the widget may be programmed to watch for mouse movement inside a form. If one or more results are missing or anomalous, it may be determined that the client is running a headless browser.

IsCookieEnabled
    One or more cookies with selected names and values may be set in a user's browser, where the one or more values are to be sent back to a server. If the one or more values are not received, it may be determined that the browser is not allowing cookies.

IsUASpoofing
    One or more JavaScript statements that behave in a certain recognizable manner for a purported browser type and/or version may be included. If the expected anomalous behavior is not seen, it may be determined that the user agent is being spoofed.

IsDeviceIDSpoofing
    The inventors have recognized and appreciated that a device ID may be a dynamic combination of certain elements (e.g., relating to browser and/or hardware characteristics). A formula for deriving the device ID may be altered during a probe (e.g., increasing/decreasing length, and/or adding/omitting one or more elements). If the newly derived device ID is not as expected, it may be determined that the device ID is being spoofed.

IsReadingIDs
    One or more values may be modified one or more times during a digital interaction. For example, one or more system form IDs may be modified before being delivered as HTML, and again after associated JavaScript code loads. Depending on which version of the one or more IDs is obtained by an attacker, a security system may deduce when in a transaction cycle the attacker is reading the one or more IDs.

IsFabricatingInputBehavior
    Software code for a widget may be randomly modified to use different symbols for key and/or mouse events. If one or more symbols do not match, it may be determined that the input data has been fabricated.

IsReferencingSystemJS
    One or more system JavaScript functions may be duplicated and hidden, and one or more alarms may be added to one or more original system functions. If an alarm is triggered, it may be determined that a third party is invoking a system function.

IsReplayingGUIMouseEvents
    An Ajax response may be altered to include a Document Object Model (DOM) manipulation instruction to manipulate a GUI field or object. As one example, the DOM manipulation instruction may move a GUI field (e.g., a required field such as a submit button) to a different location in a GUI, and place an invisible yet fully functional field (e.g., another submit button) at the original location. If a form is submitted using the invisible field, it may be determined that the GUI events are a result of a replay or macro. As another example, the GUI field may be moved, but there may be no replacement field at the original location. If a "click" event nonetheless occurs at the original location, it may be determined that the GUI events are a result of a replay or macro. As yet another example, the DOM manipulation instruction may replace a first GUI field (e.g., a "Submit" button) with a second GUI field of the same type (e.g., a "Submit1 " button). A human user completing the form legitimately may click the second GUI field, which is visible. A bot completing the form using a replay script may instead "click" the first GUI field, which is invisible.

IsReplayingGUIKeyEvents
    Similar to IsReplayingGUIMouseEvents, this probe may hide a text input field, and place a differently named field at the original location. If the invisible field receives a key event, it may be determined that the event is a replay.

IsReplayingRecordedAjaxCalls
    This probe may change an endpoint address of an Ajax call. If an old address is used for an Ajax call, it may be determined that the Ajax call is a replay.

IsAssumingAjaxBehavior
    This probe may instruct a client to make multiple Ajax calls and/or one or more delayed Ajax calls. If an unexpected Ajax behavior pattern is observed, it may be determined that an attacker is fabricating an Ajax behavior pattern.

Although several examples of probes are discussed above, it should be appreciated that aspects of the present disclosure are not limited to the use of any one probe or combination of probes, or any probe at all. For instance, in some embodiments, a probe may be deployed and one or more results of the probe may be logged (e.g., in association with a segment identifier and/or alongside one or more metrics associated with the segment identifier). Such a result may be used to determine if a subsequent probe is to be deployed. Additionally, or alternatively, such a result may be used to facilitate scoring and/or classifying future digital interactions.

In one example, a same form of input pattern may be observed several times in a short window of time, which may represent an anomalously high rate. Additionally, it may be observed that a same user agent is involved in all or a significant portion of the digital interactions exhibiting the suspicious input pattern. This may indicate a potential high volume automated attack, and may cause one or more probes to be deployed to obtain more information about a potential automation method.

In some embodiments, multiple security probes may be deployed, where each probe may be designed to discover different information. For example, information collected by a probe may be used by a security system to inform the decision of which one or more other probes to deploy next. In this manner, the security system may be able to gain an in-depth understanding into network traffic (e.g., website and/or application traffic). For instance, the security system may be able to classify traffic in ways that facilitate identification of malicious traffic, define with precision what type of attack is being observed, and/or discover that some suspect behavior is actually legitimate. These results may indicate not only a likelihood that certain traffic is malicious, but also a likely type of malicious traffic. Therefore, such results may be more meaningful than just a numeric score. For instance, if multiple probe results indicate a digital interaction is legitimate, a determination may be made that an initial identification of the digital interaction as being suspicious may be a false positive identification.

Figure 19:
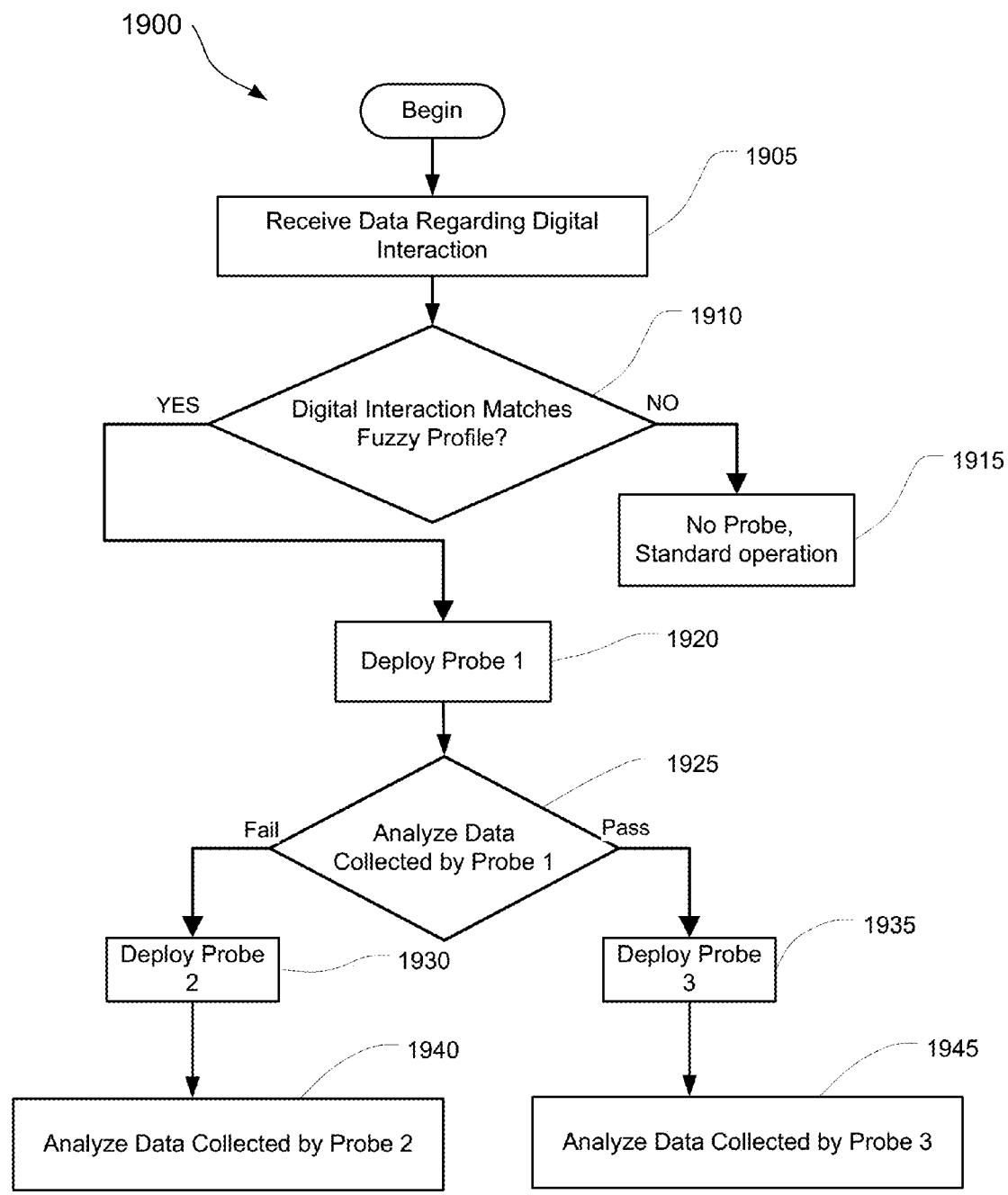
FIG. 19 shows an illustrative process 1900 for dynamically deploying multiple security probes, in accordance with some embodiments.

FIG. 19 shows an illustrative process 1900 for dynamically deploying multiple security probes, in accordance with some embodiments. Like the illustrative process 1700 of FIG. 17, the process 1900 may be performed by a security system (e.g., the illustrative security system 14 shown in FIG. 1B) to determine if and when to deploy one or more security probes.

Acts 1905, 1910, 1915, and 1920 of the process 1900 may be similar to acts 1705, 1710, 1715, and 1720 of the process 1700, respectively. At act 1925, the security system may analyze data collected by a probe of a first type (e.g., Probe 1) deployed at act 1720 to determine what type of probe to further deploy to the digital interaction. For example, if a result of Probe 1 is positive (e.g., a suspicious pattern is identified), a probe of a second type (e.g., Probe 2) may be deployed at act 1930 to further investigate the digital interaction. At act 1940, the security system may analyze data collected by Probe 2 to determine what, if any, action may be appropriate.

If instead the result of Probe 1 is negative (e.g., no suspicious pattern identified) at act 1925, a probe of a third type (e.g., Probe 3) may be deployed at act 1935 to further investigate the digital interaction. At act 1945, the security system may analyze data collected by Probe 3 to determine what, if any, action may be appropriate.

As an example, a first probe may be deployed to verify if the client is running JavaScript. This probe may include a JavaScript snippet, and may be deployed only in one or a small number of suspicious interactions, to make it more difficult for an attacker to detect the probe. If a result of the first probe indicates that the client is running JavaScript, the security system may determine that an attacker may be employing some type of GUI macro, and a subsequent probe may be sent to confirm this hypothesis (e.g., by altering a layout of a form). If a result of the first probe indicates that the client is not running JavaScript, the security system may determine that an attacker may be employing some type of CLI script, and a subsequent probe may be sent to further discover one or more script capabilities and/or methods used to spoof form input. This decision-making pattern may be repeated until all desired information has been collected about the potential attack.

Figure 20:
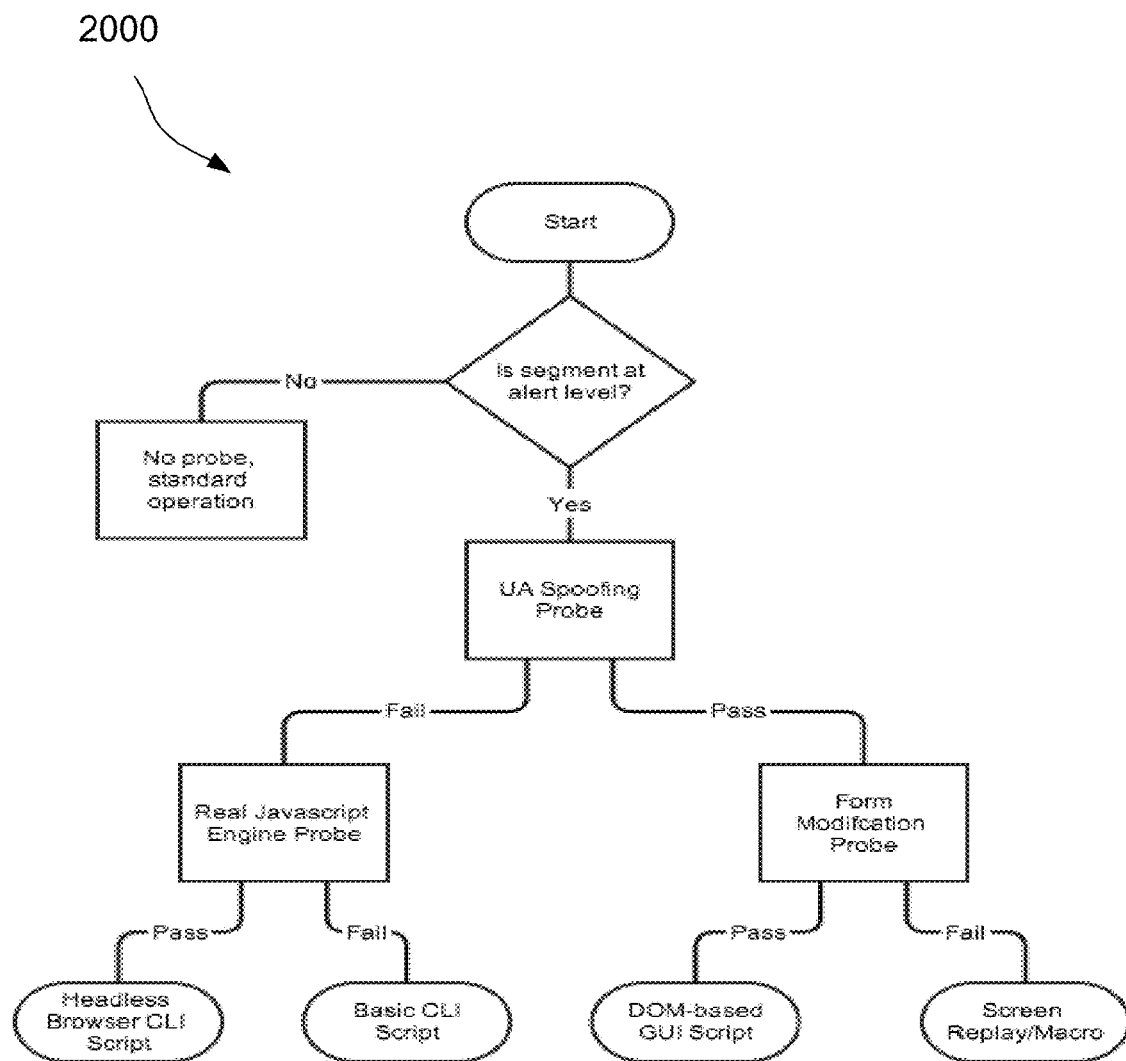
FIG. 20 shows an example of a decision tree 2000 that may be used by a security system to determine whether to deploy a probe and/or which one or more probes are to be deployed, in accordance with some embodiments.

It should be appreciated that aspects of the present disclosure are not limited to the use of the illustrative decision process described above. For instance, FIG. 20 shows an example of a decision tree that may be used by a security system to determine whether to deploy a probe and/or which one or more probes are to be deployed, in accordance with some embodiments.

In some embodiments, some or all JavaScript code may be obfuscated before being sent to a client. For instance, one or more obfuscation techniques may be used to hide logic for one or more probes. Examples of such techniques include, but are not limited to, symbol renaming and/or re-ordering, code minimization, logic shuffling, and fabrication of meaningless logic (e.g., additional decision and control statements that are not required for the probe to function as intended). The inventors have recognized and appreciated that one or more of these and/or other techniques may be applied so that a total amount of code (e.g., in terms of number of statements and/or number of characters) does not increase significantly despite the inclusion of one or more probes, which may reduce the likelihood of an attacker discovering a probe. However, it should be appreciated that aspects of the present disclosure are not limited to the use of any probe obfuscation technique.

Some security systems use threshold-type sensors to trigger actions. For instance, a sensor may be set up to monitor one or more attributes of an entity and raise an alert when a value of an attribute falls above or below an expected threshold. Similarly, an expected range may be used, and an alert may be raised when the value of the attribute falls outside the expected range. The threshold or range may be determined manually by one or more data scientists, for example, by analyzing a historical data set to identify a set of acceptable values and setting the threshold or range based on the acceptable values.

The inventors have recognized and appreciated some disadvantages of the above-described approach for tuning sensors. For example:
  The above-described approach assumes that a historical data set already exists or will be collected. Depending on the volume of digital interactions, it may take a month or more to collect a data set of an appropriate sample size.
  In some instances, significant processing and modeling may be performed on the dataset, which may take more than one week.
  The analysis of the historical data set may require a significant amount of human involvement.

Accordingly, in some embodiments, a security system is provided that is programed to monitor one or more digital interactions and tune a sensor based on data collected from the digital interactions. Such monitoring and tuning may be performed with or without human involvement. In some embodiments, the monitoring and tuning may be performed in real time, which may allow the security system to react to an attack as soon as the attack is suspected, rather than waiting for data to be accumulated and analyzed over several weeks. In this manner, one or more actions may be taken while the attack is still on-going to stop the attack and/or control damages. However, it should be appreciated that real time tuning is not required, as data may alternatively, or additionally, be accumulated and analyzed after the attack.

In some embodiments, a security system may be configured to use one or more sensors to collect data from one or more digital interactions. The system may analyze the collected data to identify a baseline of expected behavior, and then use the identified baseline to tune the one or more sensors, thereby providing a feedback loop. For example, in some embodiments, the system may accumulate the data collected by the one or more sensors over time and use the accumulated data to build a model of baseline behavior.

In some embodiments, data collected by one or more sensors may be segmented. The inventors have recognized and appreciated that segmentation may allow a security system to deal with large amounts of data more efficiently. For instance, the security system may group observed entities and/or digital interactions into buckets based on certain shared characteristics. As one example, each entity or digital interaction may be associated with one of several buckets based on a typing speed detected for the entity or digital interaction. The buckets may be chosen in any suitable manner. For instance, more buckets may be used when finer-grained distinctions are desirable. In one example, an entity or digital interaction may be associated with one of four different buckets based on typing speed: 0-30 words per minute, 31-60 words per minute, 61-90 words per minute, and 90+ words per minute. Other configurations of buckets are also possible, as aspects of the present disclosure are not limited to the use of any particular configuration. Also, it should be appreciated that segmentation may be performed on any type of measurements, including, but not limited to, typing speed, geo-location, user agent, and/or device ID.

In some embodiments, data collected by one or more sensors may be quantized to reduce the number of possible values for a particular attribute, which may allow a security system to analyze the data more efficiently. In some embodiments, quantization may be performed using a hash-modding process, which may involve hashing an input value and performing a modulo operation on the resulting hash value. However, it should be appreciated that aspects of the present disclosure are not limited to the use of hash-modding, as other quantization methods may also be suitable.

In some embodiments, a hashing technique may be used that produces a same hash value every time given a same input value, and the hash value may be such that it is difficult to reconstruct the input from the hash value alone. Such a hash function may allow comparison of attribute values without exposing actual data. For example, a security system may hash a credit card number to produce an alphanumeric string such as the following:

12KAY8XOOW0881PWBM81KJCUYP0XHG

If hashed again in the future, the same credit card number may produce the same hash value. Furthermore, the hash function may be selected such that so that no two inputs are mapped to the same hash value, or the number of such pairs is small. As a result, the likelihood of two different credit card numbers producing the same hash value may be low, and the security system may be able to verify if a newly submitted credit card number is the same as a previously submitted credit card number by simply computing a hash value of newly submitted credit card number and comparing the computed hash value against a stored hash value of the previously submitted credit card number, without having to store the previously submitted credit card number.

The inventors have recognized and appreciated that a hash function may be used to convert input data (including non-numerical input data) into numerical values, while preserving a distribution of the input data. For example, a distribution of output hash values may approximate the distribution of the input data.

In some embodiments, a modulo operation (e.g., mod M, where M is a large number) may be applied to a numerical value resulting from hashing or otherwise converting an input value. This may reduce a number of possible output values (e.g., to M, if the modulo operation is mod M). Some information on the distribution of the input data may be lost, as multiple input values may be mapped to the same number under the modulo operation. However, the inventors have recognized and appreciated that sufficient information may be retained for purposes of detecting anomalies.

In some embodiments, a hash-modding process may be applied in analyzing network addresses. The addresses may be physical addresses and/or logical addresses, as aspects of the present disclosure are not limited to the use of hash-modding to analyze any particular type of input data. The inventors have recognized and appreciated that some network addresses are long. For example, an Internet Protocol version 4 (IPv4) address may include 32 bits, while an Internet Protocol version 6 (IPv6) address may include 128 bits (e.g., eight groups of four hexadecimal digits). The inventors have recognized and appreciated that comparing such addresses against each other (e.g., comparing a currently observed address against a set of previously observed addresses) may require a significant amount of time and/or processing power. Therefore, it may be beneficial to reduce the length of each piece of data to be compared, while preserving the salient information contained in the data.

In one illustrative example, the following IP addresses may be observed.

22.231.113.64
194.66.82.11

These addresses may be hashed to produce the following values, respectively.

9678a5bc1599cb7c9ca7174accb6dc93
6afd70b94d389a30cb34fb7f884e9941

In some embodiments, instead of comparing the input IP addresses against each other, or the hash values against each other, a security system may only compare portions of the hash values. For instance, a security system may extract one or more digits from each hash value, such as one or more least significant digits (e.g., one, two, three, four, five, six, seven, eight, nine, ten, etc.), and compare the extracted digits. In the above example, two least significant digits may be extracted from each hash value, resulting in the values 93 and 41, respectively. It may be more efficient to compare 93 against 41, as opposed to comparing 22.231.113.64 against 194.66.82.11.

The extraction of one or more least significant digits may be equivalent to a modulo operation. For example, extracting one least significant hexadecimal digit may be equivalent to mod 16, extracting two least significant hexadecimal digits may be equivalent to mod 256, etc. However, it should be appreciated that aspects of the present disclosure are not limited to the use of base-16 numbers, as one or more other numeral systems (e.g., base 2, base 8, base 10, base 64, etc.) may be used instead of, or in addition to, base 16.

The inventors have recognized and appreciated that, if the extracted digits for two input IP addresses are different, the security system may infer, with 100% confidence, that the two input IP addresses are different. Thus, hash-modding may provide an efficient way to confirm that two input IP addresses are different. The inventors have further recognized and appreciated that, if the extracted digits for two input IP addresses are same, the security system may infer, with some level of confidence, that the two input IP addresses are the same.

In some embodiments, a level of confidence that two input IP addresses are the same may be increased by extracting and comparing more digits. For instance, in response to determining that the extracted digits for two input IP addresses are same, two more digits may be extracted from each input IP address and compared. This may be repeated until a suitable stopping condition is reached, for example, if the newly extracted digits are different, or some threshold number of digits have been extracted. The threshold number may be selected to provide a desired level of confidence that the two input IP addresses are the same. In this manner, additional processing to extract and compare more digits may be performed only if the processing that has been done does not yield a definitive answer. This may provide improved efficiency. However, it should be appreciated that aspects of the present disclosure are not limited to extracting and comparing digits in two-digit increments, as in some embodiments extraction and comparison may be performed in one-digit increments, three-digit increments, four-digit increments, etc., or in some non-uniform manner. Furthermore, in some embodiments, all digits may be extracted and compared at once, with no incremental processing.

The inventors have recognized and appreciated that observed IP addresses may cluster around certain points. For instance, a collection of IP address may share a certain prefix. An example of clustered addresses is shown below:
1.22.231.113.64
1.22.231.113.15
1.22.231.113.80
1.22.231.113.80
1.22.231.113.52

The inventors have further recognized and appreciated that, by hashing IP addresses, the observations may be spread more evenly across a number line. For example, the following three addresses may be spread out after hashing, even though they share nine out of eleven digits.
1.22.231.113.64
1.22.231.113.15
1.22.231.113.52

On the other hand, the following two addresses may be hashed to the same value because they are identical, and that hash value may be spaced apart from the hash values for the above three addresses.
1.22.231.113.80
1.22.231.113.80

In some embodiments, IP addresses may be hashed into a larger space, for example, to spread out the addresses more evenly, and/or to decrease the likelihood of collisions. For instance, a 32-bit IPv4 address may be hashed into a 192-bit value, and likewise for a 128-bit IPv6 address. However, it should be appreciated that aspects of the present disclosure are not limited to the use of 192-bit hash values. Moreover, any suitable hash function may be used, including, but not limited to, MD5, MD6, SHA-1, SHA-2, SHA-3, etc.

In some embodiments, hash-modding may be used to analyze any suitable type of input data, in addition to, or instead of, IP addresses. The inventors have recognized and appreciated that hash-modding may provide a variable resolution with variable accuracy, which may allow storage requirement and/or efficiency to be managed. For instance, in some embodiments, a higher resolution (e.g., extracting and comparing more digits) may provide more certainty about an observed behavior, but even a lower resolution may provide sufficient information to label the observed behavior. For example, even with a relatively low resolution of 10 bits (and thus $2^{10}=1024$ possible output values), a security system may be able to differentiate, with a reasonable level of certainty, whether a user is typing the same password 10 times, or trying 10 different passwords, because the likelihood of 10 randomly chosen passwords all having the same last 10 bits after hash-modding may be sufficiently low.

Although various techniques are described above for modeling any type of input data as a numerical data set, it should be appreciated that such examples are provided solely for purposes of illustration, and that other implementations may be possible. For instance, although a hash function may be used advantageously to anonymize input data, one or more other functions (e.g., a one-to-one function with numerical output values) may, alternatively, or additionally, be used to convert input data. Moreover, in some embodiments, a modulo operation may be performed directly on an input, without first hashing the input (e.g., where the input is already a numerical value). However, it should be appreciated that aspects of the present disclosure are not limited to the use of a modulo operation. One or more other techniques for dividing numerical values into buckets may be used instead of, or in addition to, a modulo operation.

In some embodiments, a security system may create a feedback loop to gain greater insight into historical trends. For example, the system may adapt a baseline for expected behavior and/or anomalous behavior (e.g., thresholds for expected and/or anomalous values) based on current population data and/or historical data. Thus, a feedback loop may allow the system to "teach" itself what an anomaly is by analyzing historical data.

As one example, a system may determine from historical data that a particular user agent is associated with a higher risk for fraud, and that the user agent makes up only a small percentage (e.g., 1%) of total traffic. If the system detects a dramatic increase in the percentage of traffic involving that user agent in a real-time data stream, the system may determine that a large-scale fraud attack is taking place. The system may continually update an expected percentage of traffic involving the user agent based on what the system observes over time. This may help to avoid false positives (e.g., resulting from the user agent becoming more common among legitimate digital interactions) and/or false negatives (e.g., resulting from the user agent becoming less common among legitimate digital interactions).

As another example, the system may determine from historical data that a vast majority of legitimate digital interactions have a recorded typing speed between 30 and 80 words per minute. If the system detects that a large number of present digital interactions have an improbably high typing speed, the system may determine that a large-scale fraud attack is taking place. The system may continually update an expected range of typing speed based on what the system observes over time. For example, at any given point in time, the expected range may be determined as a range that is centered at an average (e.g., mean, median, or mode) and just large enough to capture a certain percentage of all observations (e.g., 95%, 98%, 99%, etc.). Other techniques for determining an expected range may also be used, as aspects of the present disclosure are not limited to any particular manner of implementation.

It should be appreciated that a historical baseline may change for any number of legitimate reasons. For instance, the release of a new browser version may change the distribution of user agents Likewise, a shift in site demographics or username/password requirements may change the mean typing speed. By continually analyzing incoming observations, the system may be able to redraw the historical baseline to reflect any "new normal." In this manner, the system may be able to adapt itself automatically and with greater accuracy and speed than a human analyst.

Figure 21:
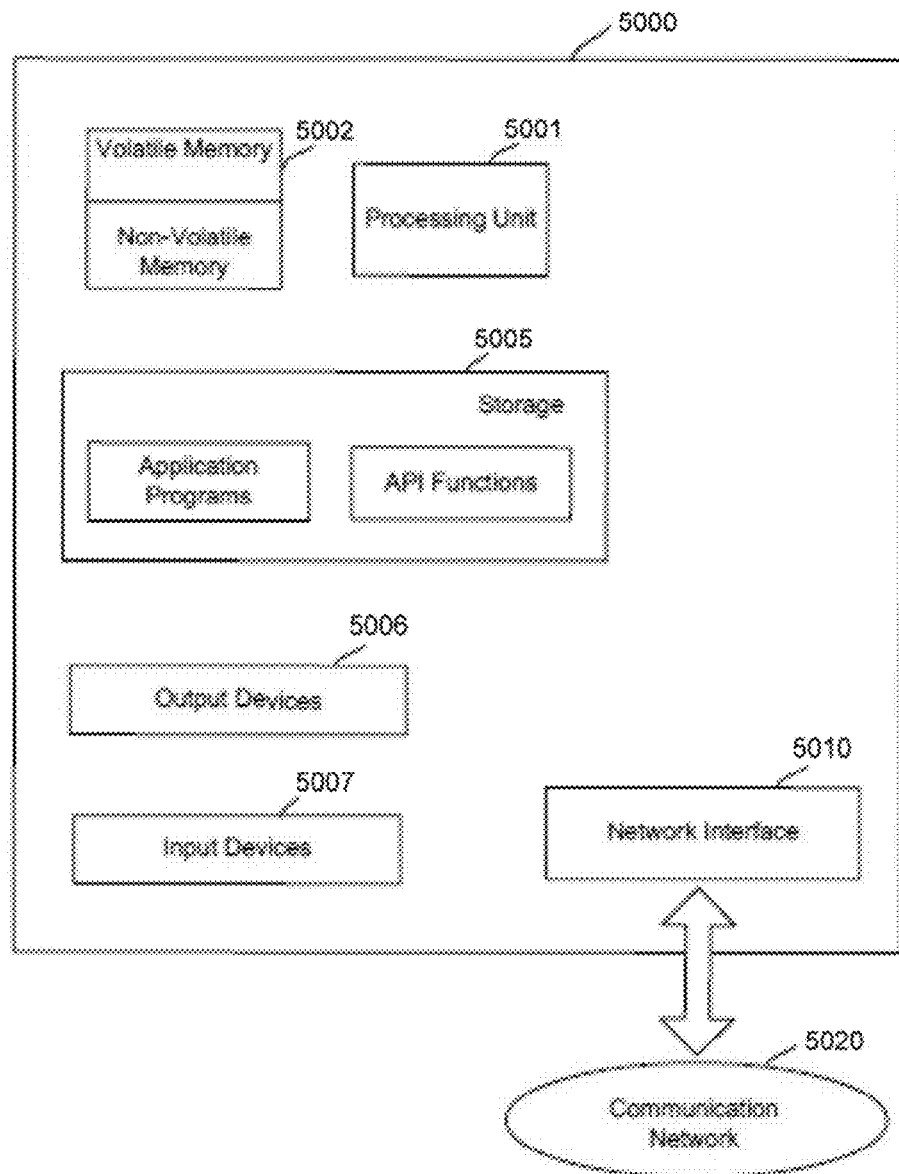
FIG. 21 shows, schematically, an illustrative computer 5000 on which any aspect of the present disclosure may be implemented.

FIG. 21 shows, schematically, an illustrative computer 5000 on which any aspect of the present disclosure may be implemented. In the embodiment shown in FIG. 21, the computer 5000 includes a processing unit 5001 having one or more processors and a non-transitory computer-readable storage medium 5002 that may include, for example, volatile and/or non-volatile memory. The memory 5002 may store one or more instructions to program the processing unit 5001 to perform any of the functions described herein. The computer 5000 may also include other types of non-transitory computer-readable medium, such as storage 5005 (e.g., one or more disk drives) in addition to the system memory 5002. The storage 5005 may also store one or more application programs and/or external components used by application programs (e.g., software libraries), which may be loaded into the memory 5002.

The computer 5000 may have one or more input devices and/or output devices, such as devices 5006 and 5007 illustrated in FIG. 21. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 5007 may include a microphone for capturing audio signals, and the output devices 5006 may include a display screen for visually rendering, and/or a speaker for audibly rendering, recognized text.

As shown in FIG. 21, the computer 5000 may also comprise one or more network interfaces (e.g., the network interface 5010) to enable communication via various networks (e.g., the network 5020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A computer-implemented method for analyzing a web site or mobile device app interaction, the method comprising acts of:
    identifying a plurality of attributes from a web site or mobile device app profile;
    for each attribute of the plurality of attributes, determining whether the web site or mobile device app interaction matches the profile with respect to the attribute, comprising:
        identifying, from the profile, at least one bucket of possible values of the attribute, the at least one bucket being indicative of anomalous behavior;
        identifying, from the web site or mobile device app interaction, a value of the attribute; and
        determining whether the value identified from the web site or mobile device app interaction falls into the at least one bucket, wherein the web site or mobile device app interaction is determined to match the profile with respect to the attribute if it is determined that the value identified from the web site or mobile device app interaction falls into the at least one bucket, and wherein, for at least one attribute of the plurality of attributes:
            the value identified from the web site or mobile device app interaction comprises a time measurement between a first user activity and a second user activity recorded from the web site or mobile device app interaction; and
            the at least one bucket of possible values of the at least one attribute comprises a range of time measurements;
    determining a penalty score based at least in part on a count of attributes with respect to which the web site or mobile device app interaction matches the profile; and
    displaying, via a backend user interface, a risk assessment report to an operator of a web site or mobile device app via which the web site or mobile device app interaction is conducted, wherein the risk assessment report is based on the penalty score for the web site or mobile device app interaction.

2. The method of claim 1, wherein the at least one attribute comprises at least one first attribute, and wherein, for at least one second attribute:
    the act of determining whether the value identified from the web site or mobile device app interaction falls into the at least one bucket comprises applying a hash-modding operation to the value identified from the web site or mobile device app interaction; and
    the at least one bucket corresponds to a residue of the hash-modding operation.

3. The method of claim 2, wherein the act of identifying, from the web site or mobile device app interaction, a value of the at least one second attribute comprises:
    recording, from the web site or mobile device app interaction, an observation with respect to the at least one second attribute; and
    deriving the value of the at least one second attribute based on the observation recorded from the web site or mobile device app interaction.

4. The method of claim 3, wherein the act of deriving the value of the at least one second attribute based on the observation recorded from the web site or mobile device app interaction comprises:
    discarding at least one first portion of the observation recorded from the web site or mobile device app interaction, while retaining at least one second portion of the observation recorded from the web site or mobile device app interaction, the at least one first portion being less relevant for a certain type of security risk than the at least one second portion.

5. The method of claim 1, wherein the penalty score is determined based at least in part on a ratio between the count of attributes with respect to which the web site or mobile device app interaction matches the profile, and a total count of the plurality of attributes identified from the profile.

6. The method of claim 1, wherein the web site or mobile device app interaction is a first web site or mobile device app interaction, and wherein the method further comprises:
    identifying a plurality of values of an attribute with respect to which the first web site or mobile device app interaction matches the profile, each value of the plurality of values corresponding respectively to a second web site or mobile device app interaction of a plurality of second web site or mobile device app interactions;
    dividing the plurality of values into a plurality of buckets, the plurality of buckets comprising the at least one bucket into which the value of the attribute identified from the first web site or mobile device app interaction falls;
    determining a count of values from the plurality of values that fall within the at least one bucket; and
    determining an extent to which the count of values from the plurality of values that fall within the at least one bucket deviates from an expected count for the at least one bucket, wherein the penalty score is determined based at least in part on the extent to which the count of values from the plurality of values that fall within the at least one bucket deviates from the expected count for the at least one bucket.

7. A system comprising at least one processor and at least one computer-readable storage medium having stored thereon instructions which, when executed, program the at least one processor to perform a method for analyzing a web site or mobile device app interaction, the method comprising acts of:
    identifying a plurality of attributes from a web site or mobile device app profile;
    for each attribute of the plurality of attributes, determining whether the web site or mobile device app interaction matches the profile with respect to the attribute, comprising:
        identifying, from the profile, at least one bucket of possible values of the attribute, the at least one bucket being indicative of anomalous behavior;

identifying, from the web site or mobile device app interaction, a value of the attribute; and determining whether the value identified from the web site or mobile device app interaction falls into the at least one bucket, wherein the web site or mobile device app interaction is determined to match the profile with respect to the attribute if it is determined that the value identified from the web site or mobile device app interaction falls into the at least one bucket, and wherein, for at least one attribute of the plurality of attributes:

the value identified from the web site or mobile device app interaction comprises a time measurement between a first user activity and a second user activity recorded from the web site or mobile device app interaction; and the at least one bucket of possible values of the at least one attribute comprises a range of time measurements;

determining a penalty score based at least in part on a count of attributes with respect to which the web site or mobile device app interaction matches the profile; and displaying, via a backend user interface, a risk assessment report to an operator of a web site or mobile device app via which the web site or mobile device app interaction is conducted, wherein the risk assessment report is based on the penalty score for the web site or mobile device app interaction.

8. The system of claim 7, wherein the at least one attribute comprises at least one first attribute, and wherein, for at least one second attribute:

the act of determining whether the value identified from the web site or mobile device app interaction falls into the at least one bucket comprises applying a hash-modding operation to the value identified from the web site or mobile device app interaction; and the at least one bucket corresponds to a residue of the hash-modding operation.

9. The system of claim 8, wherein the act of identifying, from the web site or mobile device app interaction, a value of the at least one second attribute comprises:

recording, from the web site or mobile device app interaction, an observation with respect to the at least one second attribute; and deriving the value of the at least one second attribute based on the observation recorded from the web site or mobile device app interaction.

10. The system of claim 9, wherein the act of deriving the value of the at least one second attribute based on the observation recorded from the web site or mobile device app interaction comprises:

discarding at least one first portion of the observation recorded from the web site or mobile device app interaction, while retaining at least one second portion of the observation recorded from the web site or mobile device app interaction, the at least one first portion being less relevant for a certain type of security risk than the at least one second portion.

11. The system of claim 7, wherein the penalty score is determined based at least in part on a ratio between the count of attributes with respect to which the web site or mobile device app interaction matches the profile, and a total count of the plurality of attributes identified from the profile.

12. The system of claim 7, wherein the web site or mobile device app interaction is a first web site or mobile device app interaction, and wherein the method further comprises:

identifying a plurality of values of an attribute with respect to which the first web site or mobile device app interaction matches the profile, each value of the plurality of values corresponding respectively to a second web site or mobile device app interaction of a plurality of second web site or mobile device app interactions;

dividing the plurality of values into a plurality of buckets, the plurality of buckets comprising the at least one bucket into which the value of the attribute identified from the first web site or mobile device app interaction falls;

determining a count of values from the plurality of values that fall within the at least one bucket; and determining an extent to which the count of values from the plurality of values that fall within the at least one bucket deviates from an expected count for the at least one bucket, wherein the penalty score is determined based at least in part on the extent to which the count of values from the plurality of values that fall within the at least one bucket deviates from the expected count for the at least one bucket.

13. At least one non-transitory computer-readable storage medium having stored thereon instructions which, when executed, program at least one processor to perform a method for analyzing a web site or mobile device app interaction, the method comprising acts of:

identifying a plurality of attributes from a web site or mobile device app profile;

for each attribute of the plurality of attributes, determining whether the web site or mobile device app interaction matches the profile with respect to the attribute, comprising:

identifying, from the profile, at least one bucket of possible values of the attribute, the at least one bucket being indicative of anomalous behavior;

identifying, from the web site or mobile device app interaction, a value of the attribute; and determining whether the value identified from the web site or mobile device app interaction falls into the at least one bucket, wherein the web site or mobile device app interaction is determined to match the profile with respect to the attribute if it is determined that the value identified from the web site or mobile device app interaction falls into the at least one bucket, and wherein, for at least one attribute of the plurality of attributes:

the value identified from the web site or mobile device app interaction comprises a time measurement between a first user activity and a second user activity recorded from the web site or mobile device app interaction; and the at least one bucket of possible values of the at least one attribute comprises a range of time measurements;

determining a penalty score based at least in part on a count of attributes with respect to which the web site or mobile device app interaction matches the profile; and displaying, via a backend user interface, a risk assessment report to an operator of a web site or mobile device app via which the web site or mobile device app interaction is conducted, wherein the risk assessment report is based on the penalty score for the web site or mobile device app interaction.

14. The at least one non-transitory computer-readable storage medium of claim 13, wherein the at least one attribute comprises at least one first attribute, and wherein, for at least one second attribute:

the act of determining whether the value identified from the web site or mobile device app interaction falls into the at least one bucket comprises applying a hash-modding operation to the value identified from the web site or mobile device app interaction; and the at least one bucket corresponds to a residue of the hash-modding operation.

15. The at least one non-transitory computer-readable storage medium of claim 14, wherein the act of identifying, from the web site or mobile device app interaction, a value of the at least one second attribute comprises:

recording, from the web site or mobile device app interaction, an observation with respect to the at least one second attribute; and deriving the value of the at least one second attribute based on the observation recorded from the web site or mobile device app interaction.

16. The at least one non-transitory computer-readable storage medium of claim 15, wherein the act of deriving the value of the at least one second attribute based on the observation recorded from the web site or mobile device app interaction comprises:

discarding at least one first portion of the observation recorded from the web site or mobile device app interaction, while retaining at least one second portion of the observation recorded from the web site or mobile device app interaction, the at least one first portion being less relevant for a certain type of security risk than the at least one second portion.

17. The at least one non-transitory computer-readable storage medium of claim 13, wherein the penalty score is determined based at least in part on a ratio between the count of attributes with respect to which the web site or mobile device app interaction matches the profile, and a total count of the plurality of attributes identified from the profile.

18. The at least one non-transitory computer-readable storage medium of claim 13, wherein the web site or mobile device app interaction is a first web site or mobile device app interaction, and wherein the method further comprises:

identifying a plurality of values of an attribute with respect to which the first web site or mobile device app interaction matches the profile, each value of the plurality of values corresponding respectively to a second web site or mobile device app interaction of a plurality of second web site or mobile device app interactions;

dividing the plurality of values into a plurality of buckets, the plurality of buckets comprising the at least one bucket into which the value of the attribute identified from the first web site or mobile device app interaction falls;

determining a count of values from the plurality of values that fall within the at least one bucket; and determining an extent to which the count of values from the plurality of values that fall within the at least one bucket deviates from an expected count for the at least one bucket, wherein the penalty score is determined based at least in part on the extent to which the count of values from the plurality of values that fall within the at least one bucket deviates from the expected count for the at least one bucket.

\* \* \* \* \*